US007120582B1

(12) United States Patent
Young et al.

(10) Patent No.: US 7,120,582 B1
(45) Date of Patent: Oct. 10, 2006

(54) EXPANDING AN EFFECTIVE VOCABULARY OF A SPEECH RECOGNITION SYSTEM

(75) Inventors: Jonathan H. Young, Newton, MA (US); Haakon L. Chevalier, Cambridge, MA (US); Laurence S. Gillick, Newton, MA (US); Toffee A. Albina, Cambridge, MA (US); Marlboro B. Moore, III, Jamaica Plain, MA (US); Paul E. Rensing, W. Newton, MA (US); Jonathan P. Yamron, Sudbury, MA (US)

(73) Assignee: Dragon Systems, Inc., Newtonville, MA (US)

( * ) Notice: Subject to any disclaimer, the term of this patent is extended or adjusted under 35 U.S.C. 154(b) by 0 days.

(21) Appl. No.: 09/390,370

(22) Filed: Sep. 7, 1999

(51) Int. Cl.
*G10L 15/00* (2006.01)
*G10L 15/06* (2006.01)

(52) U.S. Cl. ....................... 704/255; 704/243

(58) Field of Classification Search ........ 704/243–245, 704/255–257, 4, 9–10
See application file for complete search history.

(56) References Cited

U.S. PATENT DOCUMENTS

| 4,181,821 A | 1/1980 | Pirz et al. |
| 4,227,176 A | 10/1980 | Moshier |
| 4,481,593 A | 11/1984 | Bahler |
| 4,489,435 A | 12/1984 | Moshier |
| 4,783,803 A | 11/1988 | Baker et al. |
| 4,805,218 A | 2/1989 | Bamberg et al. |
| 4,805,219 A | 2/1989 | Baker et al. |
| 4,829,576 A | 5/1989 | Porter |
| 4,837,831 A | 6/1989 | Gillick et al. |

(Continued)

FOREIGN PATENT DOCUMENTS

DE      195 10 083 A     9/1996

(Continued)

OTHER PUBLICATIONS

SYSTRAN® Personal for Windows 95 or NT (Version 1.0.2); http://www.systransoft.com/personal.html, pp. 1-2, May 6, 1998.

(Continued)

*Primary Examiner*—Angela Armstrong
(74) *Attorney, Agent, or Firm*—Fish & Richardson P.C.

(57) ABSTRACT

The invention provides techniques for creating and using fragmented word models to increase the effective size of an active vocabulary of a speech recognition system. The active vocabulary represents all words and word fragments that the speech recognition system is able to recognize. Each word may be represented by a combination of acoustic models. As such, the active vocabulary represents the combinations of acoustic models that the speech recognition system may compare to a user's speech to identify acoustic models that best match the user's speech. The effective size of the active vocabulary may be increased by dividing words into constituent components or fragments (for example, prefixes, suffixes, separators, infixes, and roots) and including each component as a separate entry in the active vocabulary. Thus, for example, a list of words and their plural forms (for example, "book, books, cook, cooks, hook, hooks, look and looks") may be represented in the active vocabulary using the words (for example, "book, cook, hook and look") and an entry representing the suffix that makes the words plural (for example, "+s", where the "+" preceding the "s" indicates that "+s" is a suffix). For a large list of words, and ignoring the entry associated with the suffix, this technique may reduce the number of vocabulary entries needed to represent the list of words considerably.

43 Claims, 31 Drawing Sheets

U.S. PATENT DOCUMENTS

| | | | |
|---|---|---|---|
| 4,903,305 | A | 2/1990 | Gillick et al. |
| 5,027,406 | A | 6/1991 | Roberts et al. |
| 5,202,952 | A | 4/1993 | Gillick et al. |
| 5,233,681 | A | 8/1993 | Bahl et al. |
| 5,267,345 | A | 11/1993 | Brown et al. |
| 5,428,707 | A | 6/1995 | Gould et al. |
| 5,526,463 | A | 6/1996 | Gillick et al. |
| 5,680,511 | A | 10/1997 | Baker et al. |
| 5,754,972 | A | 5/1998 | Baker et al. |
| 5,765,132 | A * | 6/1998 | Roberts ........................ 704/254 |
| 5,797,122 | A | 8/1998 | Spies |
| 5,835,888 | A * | 11/1998 | Kanevsky et al. .............. 704/9 |
| 6,092,044 | A * | 7/2000 | Baker et al. ................. 704/254 |
| 6,212,498 | B1 * | 4/2001 | Sherwood et al. ........... 704/244 |

FOREIGN PATENT DOCUMENTS

| | | |
|---|---|---|
| EP | 0 982 712 A2 | 3/2000 |
| EP | 0 992 979 A2 | 4/2000 |

OTHER PUBLICATIONS

SYSTRAN® PROfessional for Windows (Version 2.0); http://www.systransoft.com/pro.html, pp. 1-4, Nov. 13, 1997.

SYSTRAN® Classic for Windows (Version 1.6.2); http://www.systransoft.com/clas.html, pp. 1-3, Nov. 12, 1997.

SYSTRAN® PROfessional Client/Server (Version 1.6.2); http://www.systransoft.com/cliser.html, pp. 1-3, Nov. 12, 1997.

SYSTRAN's MT Architecture, http://www.systransoft.com/how-works.html, pp. 1-3, Nov. 19, 1997.

Langenscheidt's T1, "The translator for translators", http://www.gmsmuc.de/english/tl.html, pp. 1-2, 1997.

Langenscheidt's T1 Plus, http://www.gmsmuc.de/english/tlplus.html, p. 1, 1997.

Langenscheidt's T1, "Professional—Setting New Standards in Machine Translation", http://www.gmsmuc.de/english/tlprofi.html, pp. 1-2, 1997.

Langenscheidt's T1Translation Memory, http://www.gmsmuc.de/english/memory.html, p. 1, 1997.

Langenscheidt's T1 Hotline Support, , http://www.gmsmuc.de/english/hotline.html, p. 1-2, 1997.

GLOBALINK® Power Translator 6.0, http://www.globalink.com/pages/product-pwtrans6.html, p. 1.

Comprende—Real Time Internet Translation Services, http://www.globalink.com/pages/product-comprende.html, p. 1.

Intranet Translator—Real Time Intranet Translation Services, http://www.globalink.com/pages/product-intranet-translator.html, p. 1.

Web Translator, http://www.globalink.com/pages/product-web-translator.html, pp. 1-2.

Talk to Me, http://www.globalink.com/pages/product-talktome.html, p. 1.

Language Assistance Series, http://www.globalink.com/pages/product-language-assistant.html, p. 1.

Subject Dictionaries, http://www.globalink.com/pages/product-subject-dictionaries.html, p. 1.

E-mail Translator Plug-In for Eudora, http://www.globalink.com/pages/product-plugins.html, p. 1.

Frisch et al., "Spelling Assistance for Compound Words", IBM Journal of Research & Development; vol. 32, No. 2, Mar. 1, 1988, pp. 197-198.

Marcus Spies; "A Language Model for Compound Words in Speech Recognition", European Conference on Speech Communication and Technology, Sep. 1995, pp. 1767-1770.

Bandara et al., "Handling German Compound Words in an Isolated-Word Speech Recognizer", IEEE Workshop on Speech Recognition, Harriman, NY, Dec. 15-18, 1992, pp. 1-3.

Steeneken et al., "Multi-Lingual Assessment of Independent Large Vocabulary Speech-Recognition Systems: The Sqale-Project", European Conference on Speech Communication and Technology, Sep. 1995, pp. 1271-1274.

Dugast et al., "The Philips Large-Vocabulary Recognition System for Americal English, French and German", European Conference on Speech Communication and Technology, Sep. 1995, pp. 197-200.

Pye, et al., "Large Vocabulary Multilingual Speech Recognition Using HTK", European Conference on Speech Communication and Technology, Sep. 1995, pp. 181-184.

Lamel et al., "Issues in Large Vocabulary, Multilingual Speech Recognition", European Conference on Speech Communication and Technology, Sep. 1995, pp. 185-188.

Barnett et al., Comparative Performance in Large-Vocabulary Isolated-Word Recognition in Five European Languages, European Conference on Speech Communication and Technology, Sep. 1995, pp. 189-192.

Geutner, P.; "Using Morphology Towards Better Large-Vocabulary Speech Recognition Systems"; *Proceedings of the International Conference on Acoustics, Speech and Signal Processing (ICASSP)*; pp. 445-448; May 9, 1995; XP 000658026.

Hwang, "Vocabulary Optimization Based on Perplexity"; *IEEE International Conference on Acoustics, Speech and Signal Processing (CASSP)*; pp. 1419-1422; Apr. 21, 1997; XP000822723.

Berton et al., "Compound Words in Large-Vocabulary German Speech Recognition Systems"; *Proceedings of the International Conference on Spoken Language Processing*, vol. 2; pp. 1165-1168; Oct. 3, 1996; XP002142831.

Wothke, K.; "Morphologically based automatic phonetic transcription"; *IBM Systems Journal*, vol. 32(3); pp. 486-511; 1993.

* cited by examiner

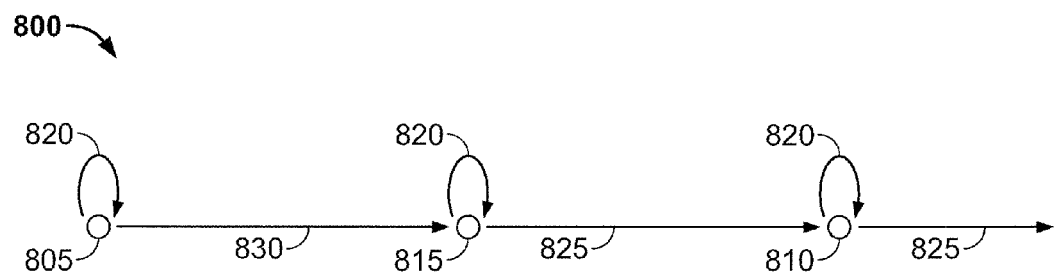
FIG. 8A
(Prior Art)
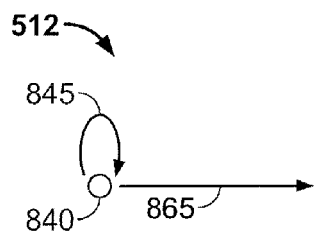 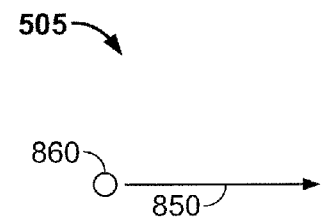
FIG. 8B
(Prior Art)
FIG. 8C
(Prior Art)

FIG. 9 (Prior Art)

| Frame | 840 ("A") | 805 ("B") | 810 ("C") | 815 ("D") | Next Node ("N") |
|---|---|---|---|---|---|
| 0 | 0 | --- | --- | --- | --- |
| 1 | $S_{A1}=A_{A1}$ | $S_{B1}=A_{B1}$ | --- | --- | --- |
| 2 | $S_{A2}=S_{A1}+A_{A2}$ | $S_{B2}=\min(S_{B1}+stay_B, S_{A1})+A_{B2}$ | $S_{C2}=S_{B1}+leave_B+A_{C2}$ | --- | --- |
| 3 | $S_{A3}=S_{A2}+A_{A3}$ | $S_{B3}=\min(S_{B2}+stay_B, S_{A2})+A_{B3}$ | $S_{C3}=\min(S_{C2}+stay_C, S_{B2}+leave_B)+A_{C3}$ | $S_{D3}=S_{C2}+leave_C+A_{D3}$ | --- |
| 4 | $S_{A4}=S_{A3}+A_{A4}$ | $S_{B4}=\min(S_{B3}+stay_B, S_{A3})+A_{B4}$ | $S_{C4}=\min(S_{C3}+stay_C, S_{B3}+leave_B)+A_{C4}$ | $S_{D4}=\min(S_{D3}+stay_D, S_{C3}+leave_C)+A_{D4}$ | $S_{N4}=S_{D2}+leave_D+A_{D4}$ |
| ... | | | | | |
| n | $S_{An}=S_{An-1}+A_{An}$ | $S_{Bn}=\min(S_{Bn-1}+stay_B, S_{An-1})+A_{Bn}$ | $S_{Cn}=\min(S_{Cn-1}+stay_C, S_{Bn-1}+leave_B)+A_{Cn}$ | $S_{Dn}=\min(S_{Dn-1}+stay_D, S_{Cn-1}+leave_C)+A_{Dn}$ | $S_{Nn}=\min(S_{Nn-1}+stay_M, S_{Mn-1}+leave_M)+A_{Nm}$ |

FIG. 10 (Prior Art)

| Frame | 810 ("A") | 805 ("B") | 810 ("C") | 815 ("D") | Next Node ("N") |
|---|---|---|---|---|---|
| 0 | $S_{A0}=0$ | --- | --- | --- | --- |
| 1 | $S_{A1}=f(S_{A0},A_{A1})$ | $S_{B1}=f(S_{A0},A_{B1})$ | --- | --- | --- |
| 2 | $S_{A2}=f(S_{A1},A_{A2})$ | $S_{B2}=f(S_{B1},stay_B, S_{A1},A_{B2})$ | $S_{C2}=f(S_{B1},leave_B,A_{C2})$ | --- | --- |
| 3 | $S_{A3}=f(S_{A2},A_{A3})$ | $S_{B3}=f(S_{B2},stay_B, S_{A2},A_{B3})$ | $S_{C3}=f(S_{C2},stay_C,S_{B2}, leave_B,A_{C3})$ | $S_{D3}=f(S_{C2},leave_C,A_{D3})$ | --- |
| 4 | $S_{A4}=f(S_{A3},A_{A4})$ | $S_{B4}=f(S_{B3},stay_B, S_{A3},A_{B4})$ | $S_{C4}=f(S_{C3},stay_C,S_{B3}, leave_B,A_{C4})$ | $S_{D4}=f(S_{D3},stay_D,S_{C3}, leave_C,A_{D4})$ | $S_{n4}=f(S_{D3},leave_D,A_{D3})$ |
| ... | | | | | |
| n | $S_{An}=f(S_{An-1},A_{An})$ | $S_{Bn}=f(S_{Bn-1},stay_B, S_{An-1},A_{Bn})$ | $S_{Cn}=f(S_{Cn-1},stay_C, S_{Bn-1},leave_B,A_{Cn})$ | $S_{Dn}=f(S_{Dn-1},stay_D, S_{Cn-1},leave_C,A_{Dn})$ | $S_{Nn}=f(S_{Dn-1},leave_N, A_{Nn})$ |

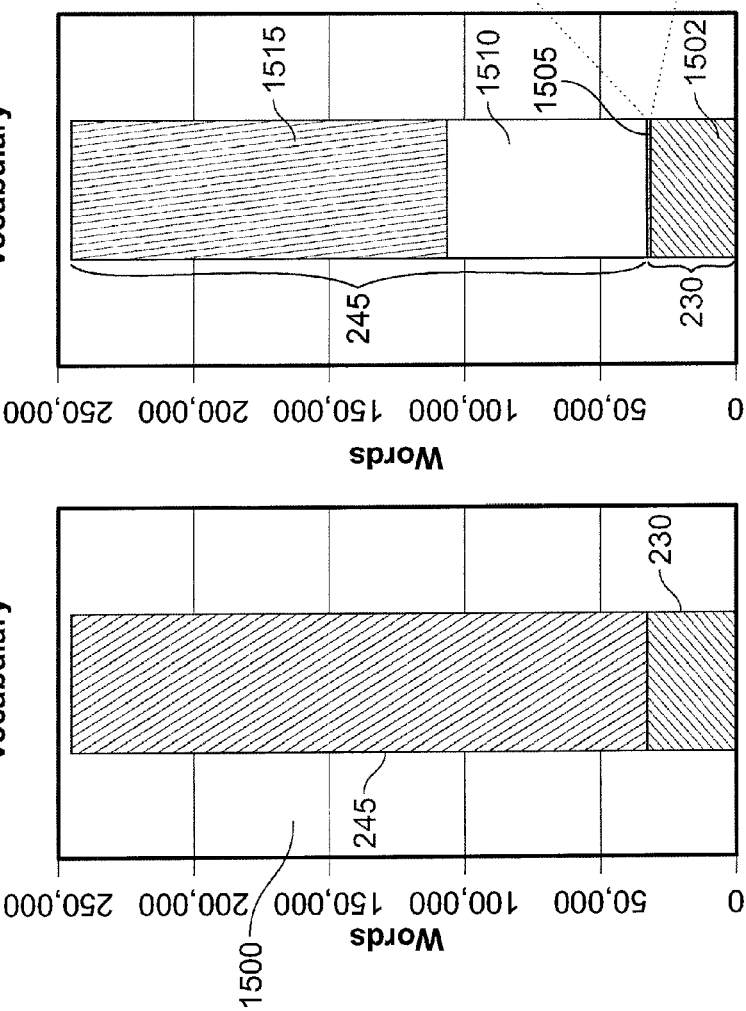
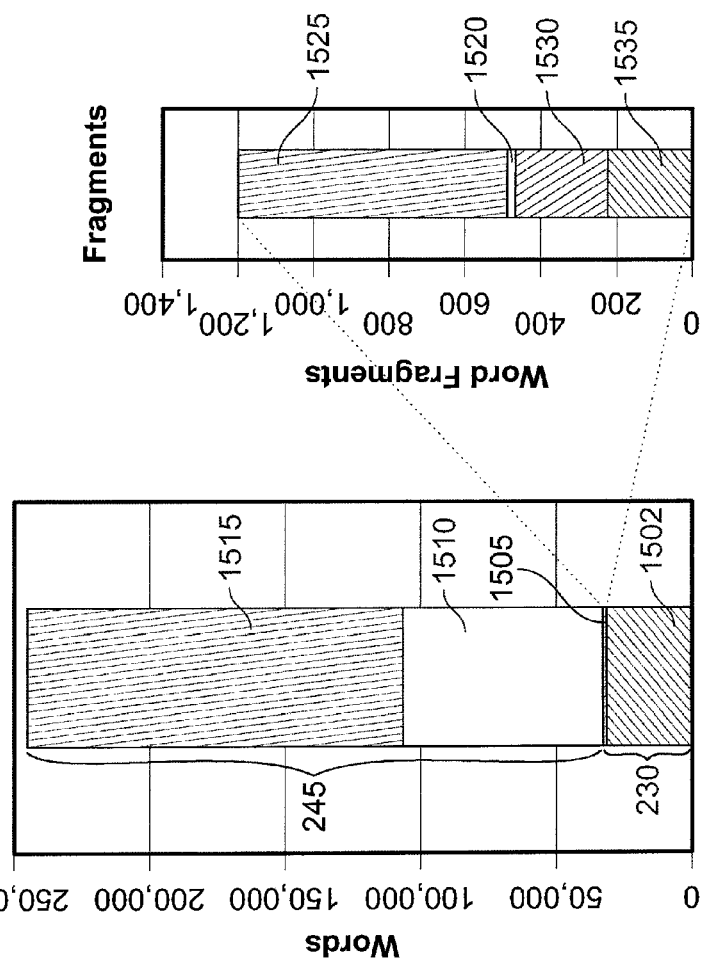
FIG. 15A
FIG. 15B
FIG. 15C

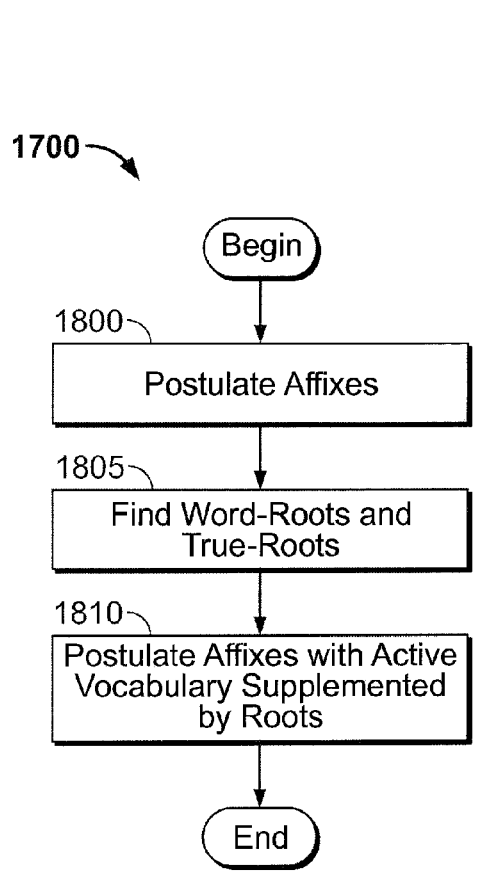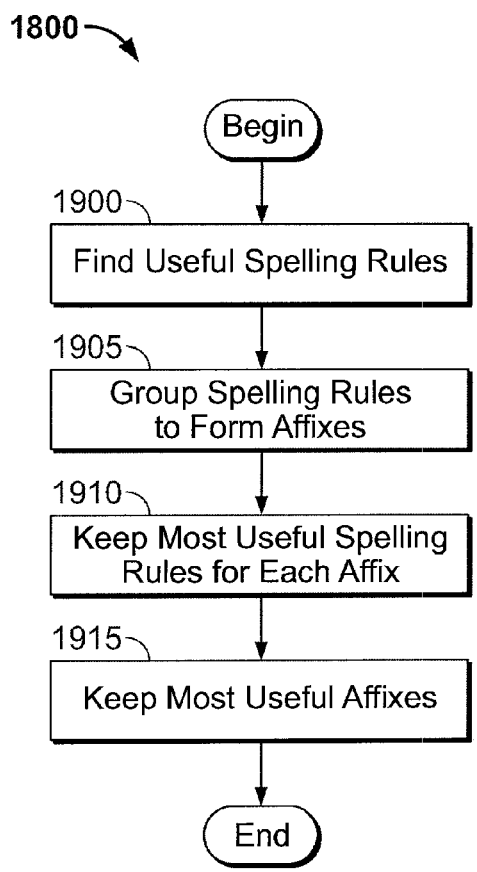
FIG. 18
FIG. 19

Collection of Text

Whenever I find myself growing grim about the mouth; whenever it is a damp, drizzly November in my soul; whenever I find myself involuntarily pausing before coffin warehouses, and bringing up the rear of every funeral I meet; and especially whenever my hypos get such an upper hand of me, that it requires a strong moral principle to prevent me from deliberately stepping into the street, and methodically knocking people's hats off- then, I account it high time to get to sea as soon as I can.

Modified Collection of Text

When +ever I find my +self grow +ing grim about the mouth; when +ever it is a damp, drizzle +ly November in my soul; when +ever I find my +self in+ voluntarily pause +ing before coffin ware +house +es, and bring +ing up the rear of every funeral I meet; and e+ special +ly when +ever my hypos get such an up +er hand of me, that it require +s a strong moral principle to pre+ vent me from deliberate +ly step +ing into the street, and methodical +ly knock +ing people's hats off- then, I account it high time to get to sea as soon as I can.

FIG. 28E

2880

| Active Vocabulary Element | Unigram Frequency |
|---|---|
| when | 4 |
| +ever | 4 |
| I | 5 |
| find | 2 |
| my | 4 |
| self | 2 |
| grow | 1 |
| +ing | 5 |
| drizzle | 1 |
| +ly | 4 |
| method | 1 |
| ⋮ | ⋮ |

FIG. 28F

EXPANDING AN EFFECTIVE VOCABULARY OF A SPEECH RECOGNITION SYSTEM

BACKGROUND

The invention relates to expanding an effective vocabulary of a speech recognition system.

A speech recognition system analyzes a user's speech to determine what the user said. Most speech recognition systems are frame-based. In a frame-based system, a processor divides a signal descriptive of the speech to be recognized into a series of digital frames, each of which corresponds to a small time increment of the speech.

A speech recognition system may be a "discrete" system that recognizes discrete words or phrases but which requires the user to pause briefly between each discrete word or phrase. Alternatively, a speech recognition system may be a "continuous" system that can recognize spoken words or phrases regardless of whether the user pauses between them. Continuous speech recognition systems typically have a higher incidence of recognition errors in comparison to discrete recognition systems due to complexities of recognizing continuous speech. A detailed description of continuous speech recognition is provided in U.S. Pat. No. 5,202,952, entitled "LARGE-VOCABULARY CONTINUOUS SPEECH PREFILTERING AND PROCESSING SYSTEM," which is incorporated by reference.

In general, the processor of a continuous speech recognition system analyzes "utterances" of speech. An utterance includes a variable number of frames and corresponds, for example, to a period of speech followed by a pause of at least a predetermined duration.

The processor determines what the user said by finding acoustic models that best match the digital frames of an utterance, and by identifying text that corresponds to those acoustic models. An acoustic model may correspond to a word, phrase or command from a vocabulary. An acoustic model also may represent a sound, or phoneme, that corresponds to a portion of a word. Collectively, the constituent phonemes for a word represent the phonetic spelling of the word. Acoustic models also may represent silence and various types of environmental noise. In general, the processor may identify text that corresponds to the best-matching acoustic models by reference to phonetic word models in an active vocabulary of words and phrases.

The words or phrases corresponding to the best matching acoustic models are referred to as recognition candidates. The processor may produce a single recognition candidate for an utterance, or may produce a list of recognition candidates.

SUMMARY

The invention provides techniques for creating and using fragmented word models to increase the effective size of an active vocabulary of a speech recognition system. The active vocabulary represents all words and word fragments that the speech recognition system is able to recognize. Each word may be represented by a combination of acoustic models. As such, the active vocabulary represents the combinations of acoustic models that the speech recognition system may compare to a user's speech to identify acoustic models that best match the user's speech.

Memory and processing speed requirements tend to increase with the number of entries in the active vocabulary. As such, the size of the active vocabulary that may be processed in an allotted time by a particular processor using an available amount of memory is limited. Since the recognizer does not recognize words that are not included in the active vocabulary, the ability of the recognizer to recognize less-frequently-used words may be improved by increasing the size of the active vocabulary.

The effective size of the active vocabulary may be increased by dividing words into constituent components or fragments (for example, prefixes, suffixes, separators, infixes, and roots) and including each component as a separate entry in the active vocabulary. Thus, for example, a list of words and their plural forms (for example, "book, books, cook, cooks, hook, hooks, look and looks") may be represented in the active vocabulary using the words (for example, "book, cook, hook and look") and an entry representing the suffix that makes the words plural (for example, "+s", where the "+" preceding the "s" indicates that "+s" is a suffix). For a large list of words, and ignoring the entry associated with the suffix, this technique may reduce the number of vocabulary entries needed to represent the list of words considerably.

The invention provides a method of expanding an effective active vocabulary of a speech recognition system that uses a speech recognizer. The speech recognizer perform speech recognition on a user utterance to produce one or more recognition candidates. Speech recognition includes comparing digital values representative of the user utterance to a set of acoustic models representative of an active vocabulary of the system. The set of acoustic models includes models of words and models of word fragments.

The method further includes receiving the recognition candidates from the speech recognizer. When a received recognition candidate includes a word fragment, the method includes determining whether the word fragment may be combined with one or more adjacent word fragments or words to form a proposed word included in a backup dictionary of the speech recognition system.

Furthermore, if the word fragment may be combined with one or more adjacent word fragments or words to form a proposed word included in a backup dictionary of the speech recognition system, the method includes modifying the recognition candidate to substitute the proposed word for the word fragment and the one or more adjacent word fragments or words used to form the proposed word.

Moreover, if the word fragment may not be combined with one or more adjacent word fragments or words to form a proposed word included in a backup dictionary of the speech recognition system, the method includes discarding the recognition candidate.

Embodiments may include one or more of the following features. For example, the expanded effective vocabulary may include words from the backup dictionary that are formed from a combination of words and word fragments or word fragments and word fragments from an active vocabulary that includes words and word fragments, and words from the active vocabulary.

The word fragments may include suffixes, prefixes, and roots that are not words. Additionally, one or more spelling rules may be associated with each prefix and each suffix. Determining whether the word fragment may be combined with one or more adjacent word fragments or words to form a proposed word may include using a prefix or suffix as the particular word fragment and using an associated spelling rule in forming the proposed word. As a result of using the associated spelling rule, a spelling of the proposed word may differ from a spelling that would result from merely concatenating the particular word fragment with the one or more adjacent word fragments or words.

Determining whether the word fragment may be combined with one or more adjacent word fragments or words may include retrieving from the received recognition candidate a sequence that includes the particular word fragment and adjacent word fragments or words. Determining may further include determining if the sequence is a valid sequence.

A valid sequence may include only one or more allowed adjacent combinations of word fragments and words. Moreover, allowed adjacent combinations may include one or more prefixes, followed by a root or a word, followed by one or more suffixes. Other allowed adjacent combinations may include a root or a word followed by one or more suffixes, and one or more prefixes followed by a root or a word.

The method may further include combining the particular word fragment with the one or more adjacent word fragments or words to form a second proposed word that differs from the first proposed word by using a second associated spelling rule in forming the proposed word.

One or more spelling rules may be associated with a particular word fragment. And, combining the particular word fragment with one or more adjacent word fragments or words to form a proposed word may include using an associated spelling rule in forming the proposed word. As a result of using the associated spelling rule, a spelling of the proposed word may differ from a spelling that would result from merely concatenating the particular word fragment with the one or more adjacent word fragments or words.

Determining whether the word fragment may be combined with one or more adjacent word fragments or words to form a proposed word included in a backup dictionary of the speech recognition system may include searching the backup dictionary for the proposed word.

Modifying the recognition candidate may include forming a prospective recognition candidate, and if the prospective recognition candidate includes an additional word fragment, forming a final recognition candidate. The prospective recognition candidate may be formed by modifying the recognition candidate to substitute the proposed word for the word fragment and the one or more adjacent word fragments or words used to form the proposed word. Moreover, the prospective recognition candidate may be further processes to generate an additional word using the additional word fragment and one or more adjacent words or word fragments. The final recognition candidate may be formed by replacing the additional word fragment and the one or more adjacent words with the additional word.

A score may be associated with the received recognition candidate, such that the method further includes producing a score associated with the modified recognition candidate by rescoring the modified recognition candidate.

The score associated with the received recognition candidate may include an acoustic component and a language model component. Rescoring the modified recognition candidate may therefore include generating a language model score for the modified recognition candidate.

Producing the score associated with the modified recognition candidate may include combining the acoustic component of the score for the received recognition candidate with the language model score generated for the modified recognition candidate.

Rescoring the modified recognition candidate may include generating an acoustic model score for the modified recognition candidate. Furthermore, producing the score associated with the modified recognition candidate may include combining the acoustic model score generated for the modified recognition candidate with the language model score generated for the modified recognition candidate.

The score associated with the received recognition candidate may include an acoustic component and a language model component. Rescoring the modified recognition candidate may therefore include generating an acoustic score for the modified recognition candidate.

Producing the score associated with the modified recognition candidate may include combining the language model component of the score for the received recognition candidate with the acoustic score generated for the modified recognition candidate.

The method may include generating the acoustic model of a word fragment by initially comparing a word of the active vocabulary to a similar word of a backup dictionary to identify a word fragment that may be used to convert the word of the active vocabulary to the word of the backup dictionary. Then, the acoustic model of the word fragment may be generated using a portion of an acoustic model of the word of the backup dictionary that is not included in an acoustic model of the word of the active vocabulary.

Comparing a word of the active vocabulary to a similar word of a backup dictionary may include comparing spellings of the two words.

The method may include generating the acoustic models of word fragments by initially comparing words of the active vocabulary to similar words of a backup dictionary to identify spelling rules that may be used to convert the words of the active vocabulary to words of the backup dictionary. Then, the spelling rules may be employed in identifying word fragments.

Employing the spelling rules in identifying the word fragments may include grouping spelling rules together to form possible affixes, the affixes including prefixes and suffixes. Then, words of the backup dictionary may be analyzed using the affixes to identify roots that may be combined with the affixes to produce words of the backup dictionary.

Acoustic models for the roots may be generated using portions of acoustic models of the words of the backup dictionary that are not included in acoustic models of the affixes.

Affixes and roots may be added to the active vocabulary as word fragments. A set of spelling rules associated with an affix may be stored in the active vocabulary.

A language model associated with the active vocabulary may be created.

Creating the language model may include retrieving a training collection of text, the training collection of text including words from the backup dictionary and words from the active vocabulary. Creating the language model may then include modifying the training collection of text by replacing any splittable backup dictionary words with their corresponding words and word fragments. Then, language model scores for words and word fragments of the active vocabulary may be generated using the modified collection of text.

Creating the language model may include creating an N-gram language model that includes retrieving a training collection of text. The training collection of text includes words from the backup dictionary and words from the active vocabulary. Creating the N-gram language model may then include determining a frequency of each N-gram word sequence that appears in the training collection of text. Then, the N-gram word sequences may be modified by replacing any splittable backup dictionary words with their corresponding words and word fragments. Based on the N-gram word sequence frequencies, a frequency of each modified N-gram sequence that includes words, word fragments, or words and word fragments may be determined. Creating the N-gram language model may further include generating an N-gram language model for the words and word fragments of the active vocabulary based on the N-gram word and word fragment sequence frequencies.

Word fragments may include syllables. Each syllable may include a unit of spoken language. The unit of spoken language includes a single uninterrupted sound formed by a vowel or diphthong alone, of a syllabic consonant alone, or of either with one or more consonants. A syllable may include a vowel and one or more consonants clustered around the vowel.

Determining whether the word fragment may be combined with one or more adjacent word fragments or words to form a proposed word included in the backup dictionary may include searching the backup dictionary for the proposed word based on a pronunciation of the proposed word.

In an alternate embodiment, the invention provides a method of recognizing speech. The method includes using a speech recognizer to perform speech recognition on a user utterance to produce one or more recognition candidates. The speech recognition includes comparing digital values representative of the user utterance to a set of acoustic models representative of an active vocabulary of the system, the set of acoustic models including models of words, models of roots that are not words, and models of affixes that are not words, the affixes including prefixes and suffixes. The method further includes receiving the recognition candidates from the speech recognizer. When a received recognition candidate includes an affix, the method includes combining the affix with one or more adjacent words, roots, or other affixes to form a new word. Then, the recognition candidate is modified to substitute the new word for the affix and the one or more adjacent words, roots, or other affixes used to form the new word.

In another embodiment, the invention provides a method of generating an acoustic model of a word fragment. The method includes comparing a word of an active vocabulary to a similar word of a backup dictionary to identify a word fragment that may be used to convert the word of the active vocabulary to the word of the backup dictionary. The method further includes generating the acoustic model of the word fragment using a portion of an acoustic model of the word of the backup dictionary that is not included in an acoustic model of the word of the active vocabulary.

Embodiments may include one or more of the following features. For example, comparing a word of the active vocabulary to a similar word of a backup dictionary may include comparing spellings of the two words.

The invention provides a method of generating acoustic models of word fragments. The method includes comparing words of an active vocabulary to similar words of a backup dictionary to identify spelling rules that may be used to convert the words of the active vocabulary to words of the backup dictionary. Then, the method employs the spelling rules in identifying word fragments.

Embodiments may include one or more of the following features. For example, employing the spelling rules in identifying word fragments may include forming possible affixes, and analyzing words of the backup dictionary using the affixes to identify roots that may be combined with the affixes to produce words of the backup dictionary. Possible affixes are formed by grouping spelling rules together. Moreover, affixes include prefixes and suffixes.

The method may further include generating acoustic models for the roots using portions of acoustic models of the words of the backup dictionary that are not included in acoustic models of the affixes.

The method may include adding affixes and roots to the active vocabulary as word fragments. Likewise, a set of spelling rules associated with an affix may be stored in the active vocabulary.

A language model associated with the active vocabulary may be created. Creating the language model may include retrieving a training collection of text, the training collection of text including words from the backup dictionary and words from the active vocabulary. Creating the language model may further include modifying the training collection of text by replacing any splittable backup dictionary words with their corresponding words and word fragments. Then, language model scores for words and word fragments of the active vocabulary may be generated using the modified collection of text.

Creating the language model may include creating an N-gram language model by first retrieving a training collection of text. The training collection of text includes words from the backup dictionary and words from the active vocabulary. Creating the N-gram language model may then include determining a frequency of each N-gram word sequence that appears in the training collection of text. Then, the N-gram word sequences may be modified by replacing any splittable backup dictionary words with their corresponding words and word fragments. Based on the N-gram word sequence frequencies, a frequency of each modified N-gram sequence that includes words, word fragments, or words and word fragments may be determined. Creating the N-gram language model may further include generating an N-gram language model for the words and word fragments of the active vocabulary based on the N-gram word and word fragment sequence frequencies.

Other features and advantages will become apparent from the following description, including the drawings, and from the claims.

DESCRIPTION OF THE DRAWINGS

FIGS. 8A, 8B and 8C are state graphs representing nodes of the lexical tree of FIG. 5.

FIGS. 9 and 10 are charts of scores corresponding to the states of the state graphs of FIGS. 8A, 8B and 8C.

FIGS. 15A and 15B are block diagrams of a complete dictation vocabulary for the U.S. English language that does (FIG. 15B) and does not (FIG. 15A) include word fragments.

FIG. 15C is a block diagram of the word fragment component of the vocabulary of FIG. 15B.

FIG. 18 is a flow chart of a procedure for estimating word fragments as part of the procedure of FIG. 17.

FIG. 19 is a flow chart of a procedure for estimating affixes as part of the procedure of FIG. 18.

FIGS. 28C–28F show examples of building language model scores for unigram and bigram language models.

DESCRIPTION

A speech recognition system uses word fragments to expand the system's effective vocabulary. As background information for the discussion of using word fragments, a speech recognition system that does not use word fragments is discussed with reference to FIGS. 1–12.

Figure 1:
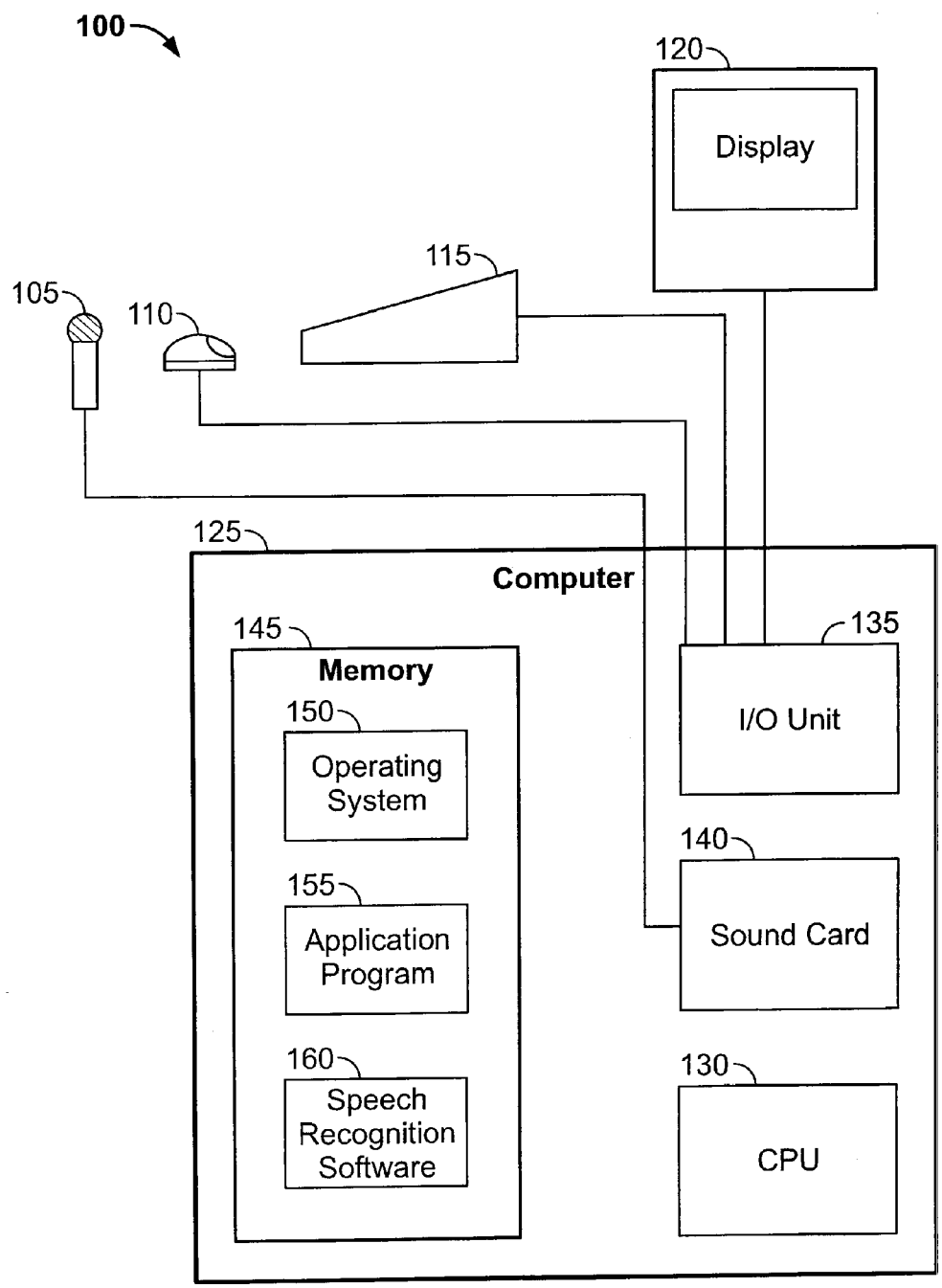
FIG. 1 is a block diagram of a speech recognition system.

FIG. 1 is a block diagram of a speech recognition system 100. The system includes input/output (I/O) devices (for example, microphone 105, mouse 110, keyboard 115, and display 120) and a general purpose computer 125 having a processor 130, an I/O unit 135 and a sound card 140. A memory 145 stores data and programs such as an operating system 150, an application program 155 (for example, a word processing program), and speech recognition software 160.

The microphone 105 receives the user's speech and conveys the speech, in the form of an analog signal, to the sound card 140, which in turn passes the signal through an analog-to-digital (A/D) converter to transform the analog signal into a set of digital samples. Under control of the operating system 150 and the speech recognition software 160, the processor 130 identifies utterances in the user's speech. Utterances are separated from one another by a pause having a sufficiently large, predetermined duration (for example, 160–250 milliseconds). Each utterance may include one or more words of the user's speech.

Figure 2:
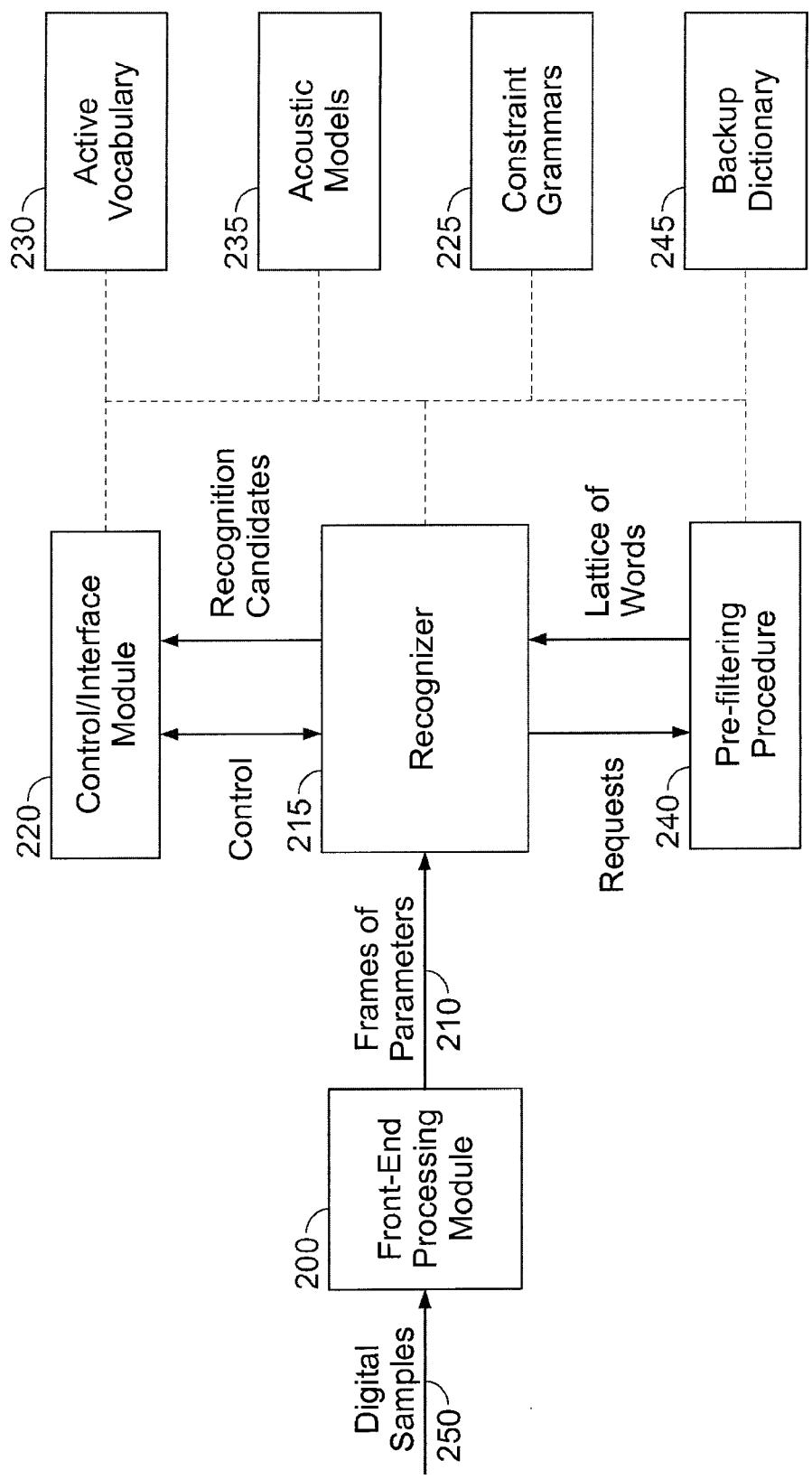
FIG. 2 is a block diagram of speech recognition software of the system of FIG. 1.

FIG. 2 illustrates components of the speech recognition software 160. For ease of discussion, the following description indicates that the components carry out operations to achieve specified results. However, it should be understood that each component actually causes the processor 130 to operate in the specified manner.

Initially, a front end processing module 200 converts the digital samples 205 from the sound card 140 into frames of parameters 210 that represent the frequency content of an utterance. Each frame includes 24 parameters and represents a short portion (for example, 10 milliseconds) of the utterance.

Figure 3:
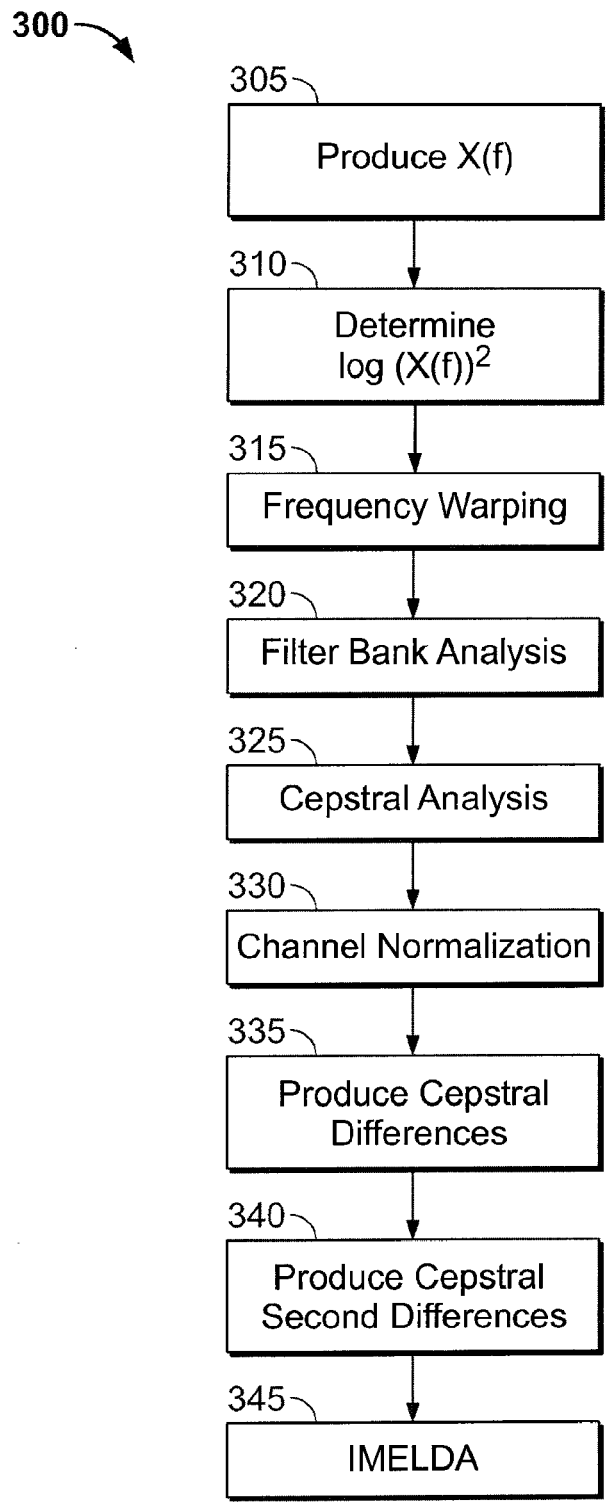
FIG. 3 is a flow chart of a signal processing procedure performed by the software of FIG. 2.

As shown in FIG. 3, the front end processing module 200 produces a frame from digital samples according to a procedure 300. The module first produces a frequency domain representation X(f) of the portion of the utterance by performing a Fast Fourier Transform (FFT) on the digital samples (step 305). Next, the module determines $\log(X(f))^2$ (step 310). The module then performs frequency warping (step 315) and a filter bank analysis (step 320) to achieve speaker normalization. See S. Wegmann et al., "Speaker Normalization on Conversational Speech," Proc. 1996 ICASSP, pp. I.339-I.341, which is incorporated by reference.

From the normalized results, the module performs cepstral analysis to produce twelve cepstral parameters (step 325). The module generates the cepstral parameters by performing an inverse cosine transformation on the logarithms of the frequency parameters. Cepstral parameters and cepstral differences have been found to emphasize information important to speech recognition more effectively than do the frequency parameters. After performing channel normalization of the cepstral parameters (step 330), the module produces twelve cepstral differences (that is, the differences between cepstral parameters in successive frames) (step 335) and twelve cepstral second differences (that is, the differences between cepstral differences in successive frames) (step 340). Finally, the module performs an IMELDA linear combination transformation to select the twenty four most useful parameters from the twelve cepstral parameters, the twelve cepstral differences, and the twelve cepstral second differences (step 345).

Referring again to FIG. 2, a recognizer 215 receives and processes the frames of an utterance to identify text corresponding to the utterance. The recognizer 215 entertains several hypotheses about the text and associates a score with each hypothesis. The score reflects the probability that a hypothesis corresponds to the user's speech. For ease of processing, scores are maintained as negative logarithmic values. Accordingly, a lower score indicates a better match (a high probability) while a higher score indicates a less likely match (a lower probability), with the likelihood of the match decreasing as the score increases. After processing the utterance, the recognizer 215 provides the best-scoring hypotheses to a control/interface module 220 as a list of recognition candidates, where each recognition candidate corresponds to a hypothesis and has an associated score. Some recognition candidates may correspond to text while other recognition candidates may correspond to commands. Commands may include words, phrases or sentences.

The recognizer 215 processes the frames 210 of an utterance in view of one or more constraint grammars 225. A constraint grammar, which also may be referred to as a template or restriction rule, may be a limitation on the words that may correspond to an utterance, a limitation on the order or grammatical form of the words, or both. For example, a constraint grammar for menu-manipulation commands may include only entries from the menu (for example, "file", "edit") or command words for navigating through the menu (for example, "up", "down", "top", "bottom"). Different constraint grammars may be active at different times. For example, a constraint grammar may be associated with a particular application program 155 and may be activated when the user opens the application program and deactivated when the user closes the application program. The recognizer 215 discards any hypothesis that does not comply with an active constraint grammar. In addition, the recognizer 215 may adjust the score of a hypothesis associated with a particular constraint grammar based on characteristics of the constraint grammar.

Figure 4A:
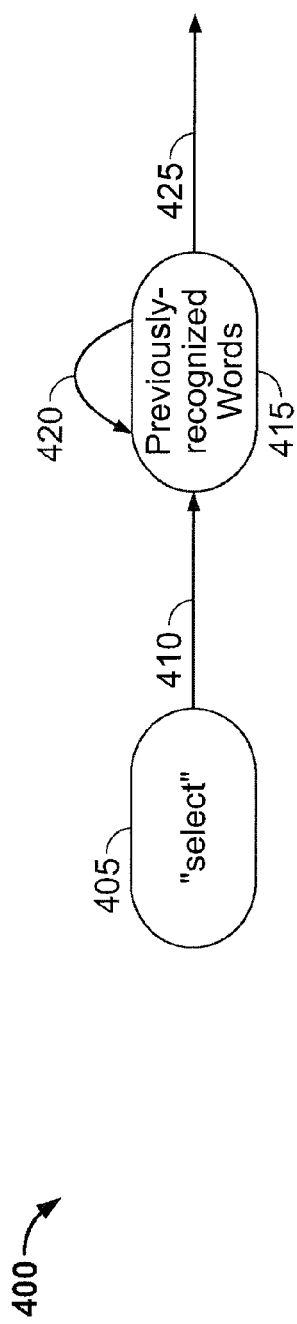
FIGS. 4A and 4B are state diagrams of a constraint grammar.
Figure 4B:
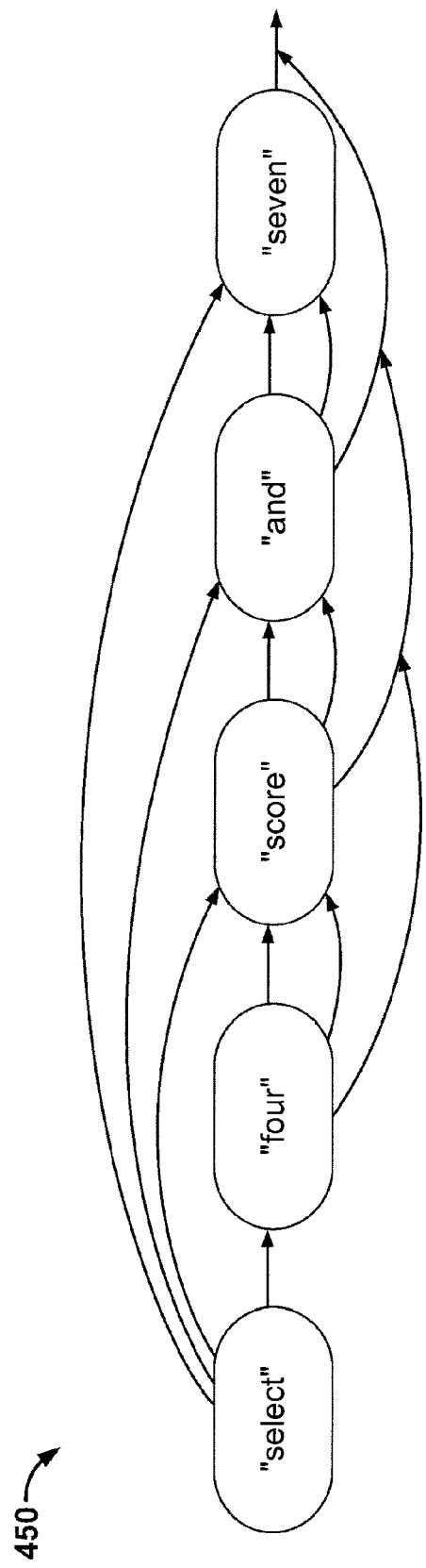

As shown in FIG. 4A, which illustrates the constraint grammar for a "select" command used to select previously recognized text, a constraint grammar may be illustrated as a state diagram 400. The "select" command includes the word "select" followed by one more previously-recognized words, with the words being in the order in which they were previously recognized. The first state 405 of the constraint grammar indicates that the first word of the select command must be "select". After the word "select"[1], the constraint grammar permits a transition along a path 410 to a second state 415 that requires the next word in the command to be a previously-recognized word. A path 420, which returns to the second state 415, indicates that the command may include additional previously-recognized words. A path 425, which exits the second state 415 and completes the command, indicates that the command may include only previously-recognized words. FIG. 4B illustrates the state diagram 450 of the constraint grammar for the select command when a previously-recognized utterance is "four score and seven". This state diagram could be expanded to include words from additional utterances.

The constraint grammar also may be expressed in Backus-Naur Form (BNF) or Extended BNF (EBNF). In EBNF, the grammar for the "Select" command is:

<recognition result> ::=Select <word>, where
<word> :: [PRW$^1$ [PRW$^2$ [PRW$^3$ . . PRW$_n$]]] |
[PRW$^2$ [PRW$^3$ . . PRW"]] | . . PRW'",
"PRW'" is the previously-recognized word i,
[ ] means optional,
< > means a rule,
| means an OR function, and
::=means "is defined as" or "is".

As illustrated in FIGS. 4A and 4B, this notation indicates that "select" may be followed by any ordered sequence of previously-recognized words. This grammar does not permit optional or alternate words. In some instances, the grammar may be modified to permit optional words (for example, an optional "and" to permit "four score and seven" or "four score seven") or alternate words or phrases (for example, "four score and seven" or "eighty seven").

One constraint grammar 225 that may be used by the speech recognition software 160 is a large vocabulary dictation grammar. The large vocabulary dictation grammar, which also may be referred to as a language model, identifies words included in the active vocabulary 230, which is the vocabulary of words known to the software. The large vocabulary dictation grammar also indicates the frequency with which words occur. The language model may be a unigram model that indicates the frequency with which a word occurs independently of context, or a bigram model that indicates the frequency with which a word occurs in the context of a preceding word. For example, a bigram model may indicate that a noun or adjective is more likely to follow the word "the" than is a verb or preposition. Other constraint grammars 225 include an in-line dictation macros grammar for dictation commands, such as "CAP" to capitalize a word and "New-Paragraph" to start a new paragraph; a select X Y Z grammar used in selecting text; an error correction commands grammar; a dictation editing grammar; an application command and control grammar that may be used to control a particular application program 155; a global command and control grammar that may be used to control the operating system 150 and the speech recognition software 160; a menu and dialog tracking grammar that may be used to manipulate menus; and a keyboard control grammar that permits the use of speech in place of input devices, such as the keyboard 115 or the mouse 110.

The active vocabulary 230 represents all combinations of acoustic models (that is, all words and commands) that the system may compare to a user's speech to identify the acoustic models and corresponding words that best match the user's speech. In general, memory and processing speed requirements increase with the number of entries in the active vocabulary 230. Accordingly, the size of the active vocabulary 230 that may be processed in an allotted time by a particular processor 130 using an available amount of memory is limited. In one configuration of the speech recognition software 160, the active vocabulary 230 may include up to 60,000 entries.

The active vocabulary 230 uses a pronunciation model in which each word or command is represented by a series of phonemes that correspond to the phonetic spelling of the word or command. Each phoneme is represented as a triphone that includes three nodes. A triphone is a context-dependent phoneme. For example, the triphone "abc" represents the phoneme "b" in the context of the phonemes "a" and "c", with the phoneme "b" being preceded by the phoneme "a" and followed by the phoneme "c".

One or more vocabulary files may be associated with each user. The vocabulary files contain all of the words, pronunciations and language model information for the user. Dictation and command grammars may be split among vocabulary files to optimize language model information and memory use, and to keep each single vocabulary file under the size limit for the active vocabulary. There also is a set of system vocabularies.

Each dictation topic (for example, "medical" or "legal") may have its own vocabulary file. This allows each dictation topic to have its own language model. A dictation topic includes a set of words associated with the topic. There may be about 30,000 words in each topic.

Separate acoustic models 235 are provided for each user of the system. Initially, speaker-independent acoustic models of male or female speech are adapted to a particular user's speech using an enrollment program. The acoustic models 235 may be further adapted as the system is used. The acoustic models 235 are maintained in a file separate from the active vocabulary 230.

The acoustic models 235 represent each triphone node as a mixture of Gaussian probability density functions ("PDFs"). For example, node "i" of a triphone "abc" may be represented as ab$^i$c:

$$ab^jc = \sum_k w_k N(\mu_k, C_k),$$

where each $w_k$ is a mixture weight, $$\sum_k w_k = 1,$$

$\mu_k$ is a mean vector for the probability density function ("PDF") $N_k$, and $c_k$ is the covariance matrix for the PDF $N_k$. Like the frames in the sequence of frames, the vectors $\mu_k$ each include 24 parameters. The matrices $c_k$ are twenty four by twenty four matrices. Each triphone node may be represented as a mixture of up to sixteen different PDFs.

A particular PDF may be used in the representation of multiple triphone nodes. Accordingly, the acoustic models 235 represent each triphone node as a collection of mixture weights $w_k$ associated with up to sixteen different PDFs $N_k$ and separately represent each PDF $N_K$ using a mean vector $\mu_k$ and a covariance matrix $c_k$.

The recognizer 215 operates in parallel with a pre-filtering procedure 240. When initiating processing of an utterance, the recognizer 215 requests from the pre-filtering procedure 240 a list of words that may have been spoken as the first word of the utterance (that is, words that may correspond to the first and subsequent frames of the utterance). The pre-filtering procedure 240 performs a coarse comparison of the sequence of frames with the active vocabulary 230 to identify a subset of the vocabulary for which a more extensive comparison using the recognizer 215 is justified.

Figure 5:
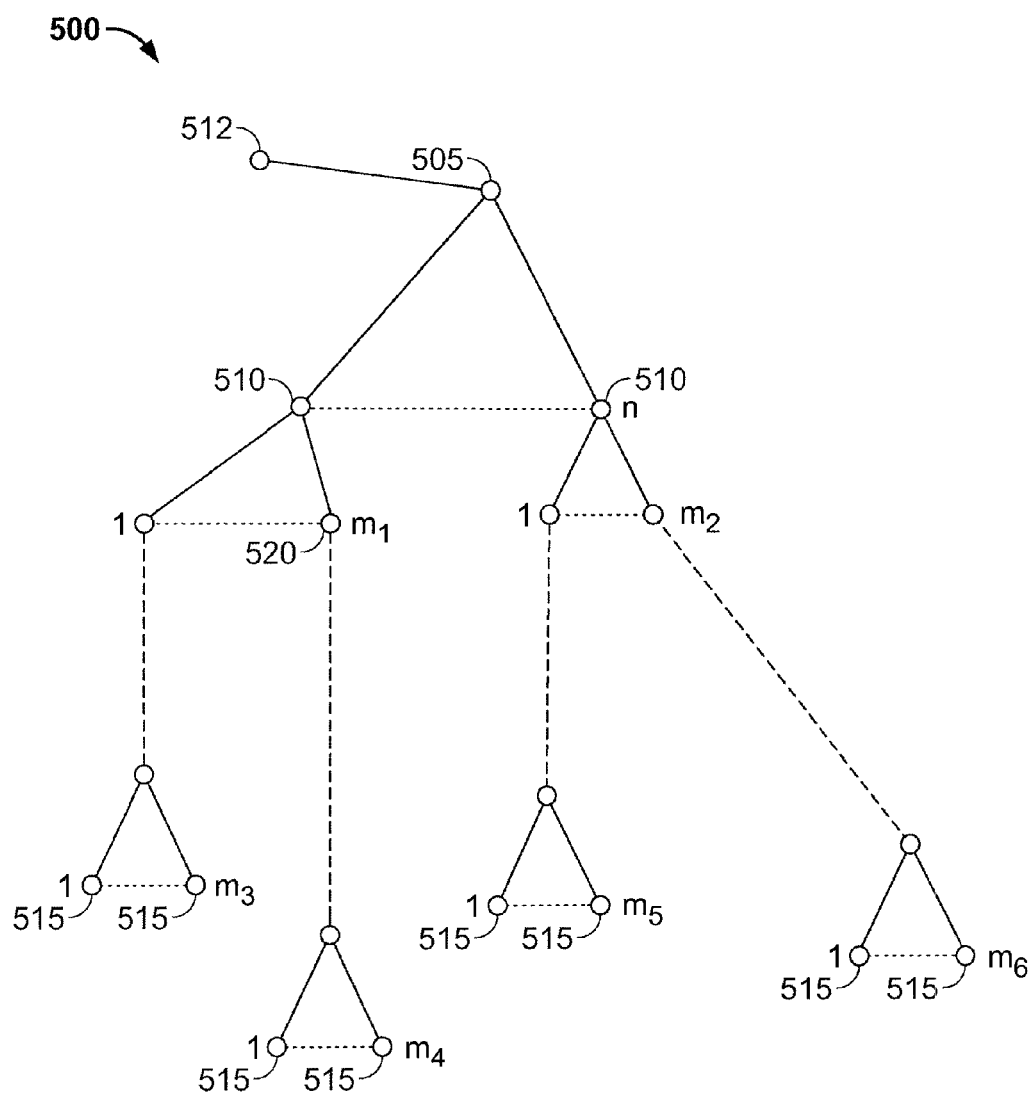
FIG. 5 is a graph of a lexical tree.
Figure 6:
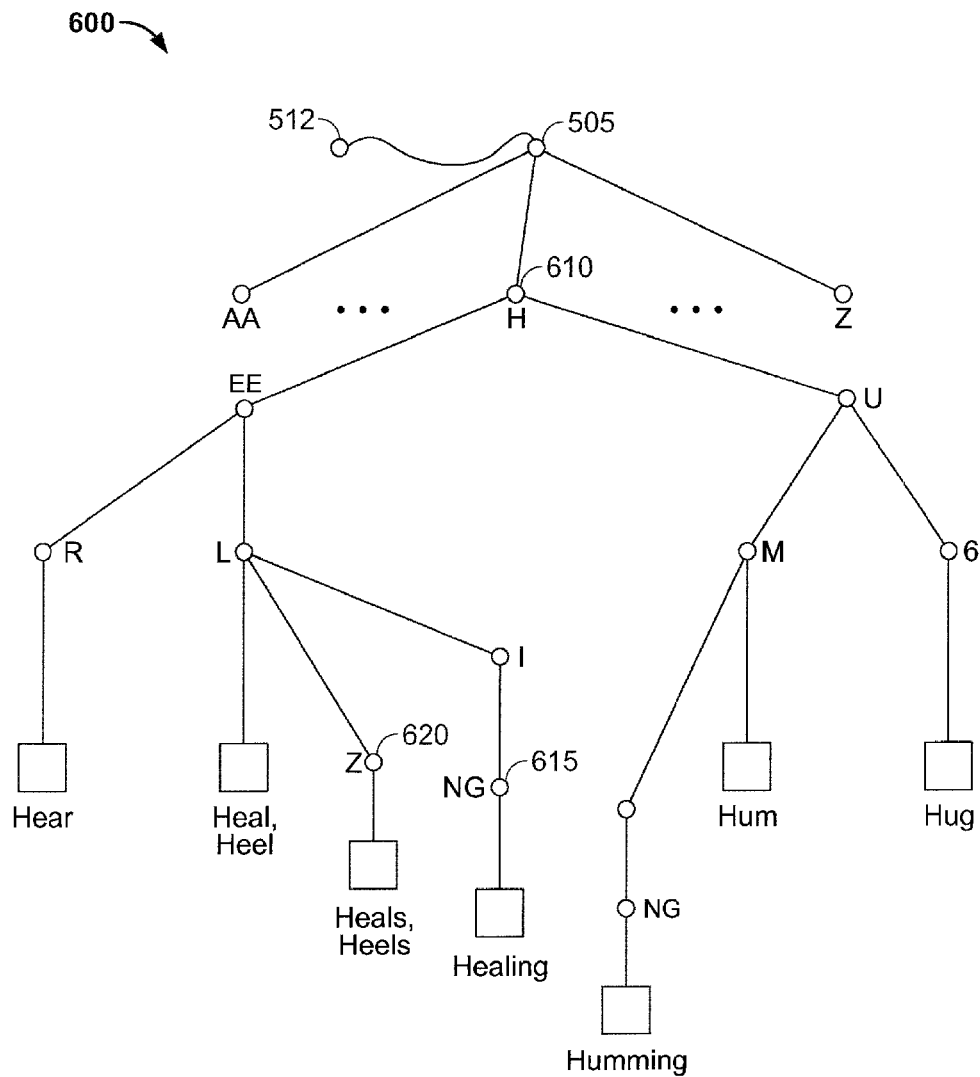
FIG. 6 is a graph of a portion of the lexical tree of FIG. 5.

Referring to FIGS. 5 and 6, the pre-filtering procedure 240 uses a lexical tree 500 that is initialized before processing begins. The lexical tree 500 represents the active vocabulary 230 based on the phonetic relationships between words in the vocabulary. The lexical tree includes a root node 505 that represents new words entering the lexical tree. From the root node 505, the tree expands to a group 510 of nodes that correspond to phonemes with which words start. A silence node 512 that represents silence also may be reached from the root node 505.

Each node in the group 510 represents a phoneme that appears at the beginning of one or more words. For example, in the portion 600 of the lexical tree 500 illustrated in FIG. 6, a node 610 corresponds to all words in the vocabulary that start with the phoneme "H". Together, the nodes in the group 510 include representations of the starting phoneme of every word in the vocabulary.

The lexical tree continues to expand until it reaches leaf nodes 515 that represent the actual words of the vocabulary. For example, as indicated by the square marker, leaf node 615 of FIG. 6 corresponds to the word "healing". An internal node of the tree also may represent a word of the vocabulary. For example, the node 520 might represent a particular vocabulary word in addition to representing the first two phonemes of other vocabulary words. Similarly, the leaf node 620 of FIG. 6 corresponds to the words "heal" and "heel" while also corresponding to the first three phonemes of the words "heals", "heels" and "healing". Node 620 also illustrates that, since multiple words may have the same phonetic spelling, a leaf node may correspond to more than one word. As illustrated in FIG. 6, leaf nodes may appear at different levels within the lexical tree. Leaf nodes also may correspond to commands. For example, a leaf node may correspond to the word "select" and to the command "SELECT". As noted above, commands may be associated with particular constraint grammars 225.

Figure 7:
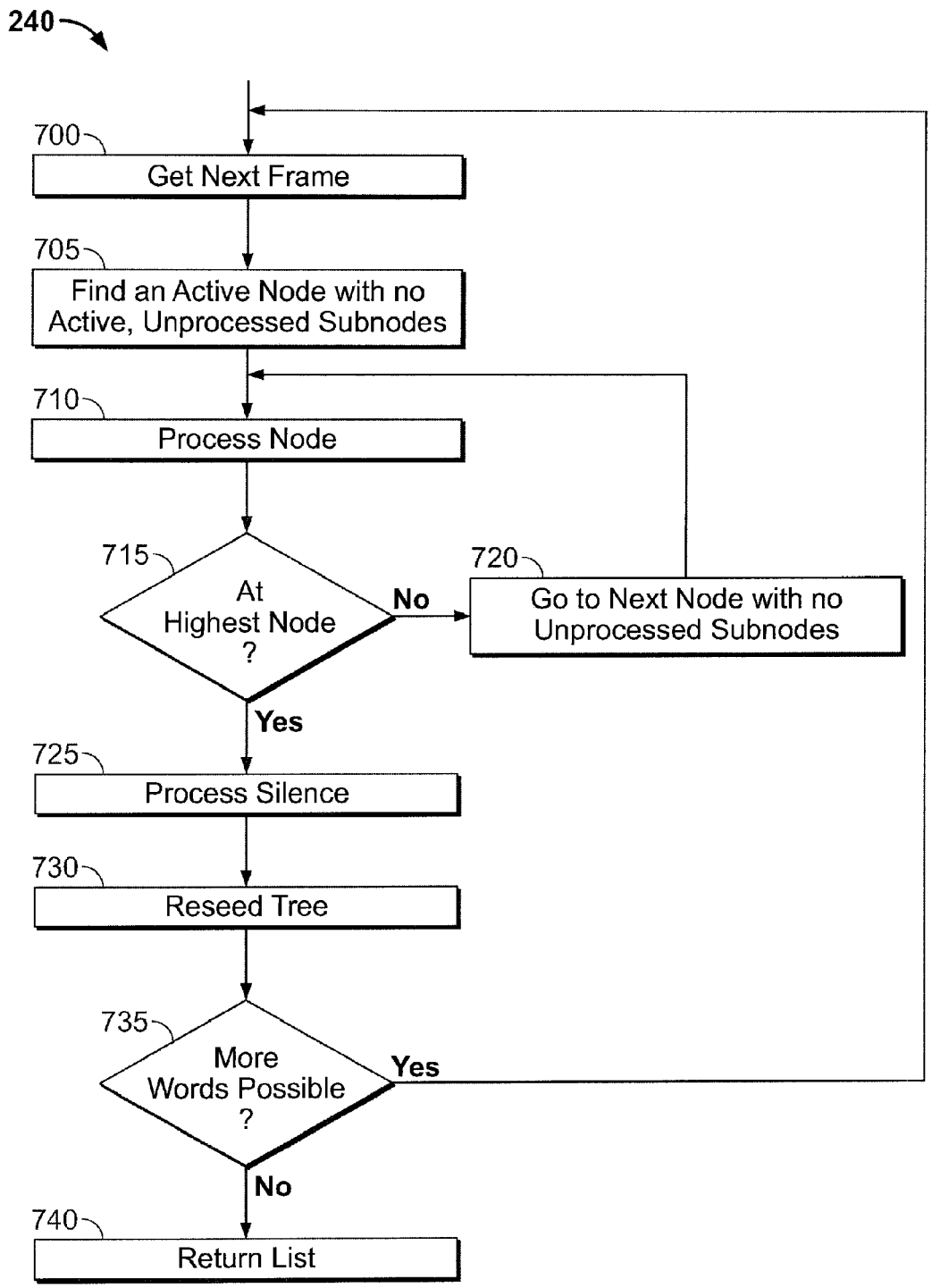
FIG. 7 is a flow chart of a pre-filtering procedure performed by the software of FIG. 2.

Operation of the pre-filtering procedure 240 is illustrated in FIG. 7. The pre-filtering procedure begins by retrieving the next frame of parameters for an utterance (step 700). Immediately after initialization, the next frame will be the first frame for the utterance. Thereafter, the next frame will be the frame following the last frame that was processed by the pre-filtering procedure when the pre-filtering procedure was last called. The pre-filtering procedure does not reinitialize the lexical tree between requests for list of words. Accordingly, the state of the lexical tree when a list of words is requested corresponds to the state of the lexical tree after a previous list of words was returned.

After retrieving a frame of data, the pre-filtering procedure 240 finds an active node in the tree with no unprocessed active successors (step 705). Successors of a node also may be referred to as subnodes of the node. When the lexical tree is initialized, the silence node 512 is the only active node.

Next, the pre-filtering procedure 240 processes the current node (step 710) according to a node-processing procedure 1100 that is discussed below with reference to FIG. 11. The node-processing procedure determines whether the node should spawn additional active nodes and whether the node should be rendered inactive. If the node is a leaf node, the node-processing procedure also determines whether the word corresponding to the node should be added to a word list for a time associated with the node.

After processing the node (step 710), the pre-filtering procedure 240 determines whether the node is the highest node in the tree (that is, the root node) (step 715). If the node is not the highest node, then the pre-filtering procedure 240 goes to the next node having no unprocessed active subnodes (step 720) and processes that node (step 710). When searching for the next node to process, the pre-filtering procedure 240 considers inactive nodes having active subnodes or active siblings.

If the processed node is the highest active node (step 715), then the pre-filtering procedure 240 processes the silence node 512 (step 725). In general, the silence node is processed by comparing a frame to a model for silence and adding the resulting score to the minimum of the current score for the silence node and the score for the root node 505.

Next, the pre-filtering procedure 240 reseeds the lexical tree 500 (step 730). The pre-filtering procedure 240 reseeds the tree whenever the silence node 512 is active or a word was produced by a leaf node of the lexical tree, regardless of whether the word was added to the list of words. The pre-filtering procedure reseeds the tree by replacing the score for the root node 505 with the minimum of the score for the silence node 512 and the scores for any words produced by leaf nodes of the lexical tree for the current frame. If the silence node is inactive and no leaf node has produced a word, then the pre-filtering procedure replaces the score for the root node 505 with a bad score (that is, a score having a value larger than a pruning threshold).

Next, the pre-filtering procedure 240 determines whether more words may be added to the word list for the requested time (step 735). If there are no active nodes in the lexical tree 500 corresponding to speech that started at, before, or slightly after the start time for which the list was requested, and if the last frame to be processed corresponds to a time that is slightly after the start time for which the list was requested, then no more words may be added to the word list. A word produced by the lexical tree is added to the list of words corresponding to the start time of the word and to lists of words corresponding to times that precede and follow the start time of the word. It is for this reason that the pre-filtering procedure waits until there are no active nodes in the tree corresponding to speech that started slightly after the start time for the list of words. If more words may be added, then the pre-filtering procedure 240 retrieves the next frame of parameters (step 700) and repeats the steps discussed above.

If words cannot be added to the word list (step 735), then the pre-filtering procedure 240 returns the word list (step 740) to the recognizer 215. If the word list includes more than a predefined number of words, then the pre-filtering procedure removes words from the list prior to returning the list. The pre-filtering procedure removes the words that are least likely to correspond to the user's speech and removes enough words to reduce the number of words on the list to the predefined number. The procedure 240 also deletes any lists of words for times prior to the requested start time.

Each node of the lexical tree 500 (FIG. 5) represents a sequence of states for a particular phoneme. For example, FIG. 8A illustrates a node 800 that includes a first state 805, a second state 810, and a third state 815. A comparison with a frame of parameters may cause the score in a particular state to remain in the state (through a path 820). A score remains in the state when the score, after being adjusted based on a comparison with a model for the state, is better than a score passed from a preceding state or node, or when no score is passed from a preceding state or node. The comparison also may cause the score to be passed to a subsequent state through a path 825. A score is passed to a subsequent state when the score, after being adjusted based on a comparison with a model for the subsequent state, is better than the score in the subsequent state, or when no score is associated with the subsequent state. The score for the third state 815 may be passed to one or more subsequent nodes through a path 830.

Referring to FIG. 8B, the node 512 that corresponds to silence is represented by a single state 840. Each comparison with a frame of parameters may cause a score in the node to remain in the state 840 (through the path 845) and also may cause the score to be passed to the root node 505 through a path 850.

Referring to FIG. 8C, the root node 505 is represented by a single state 860. Comparison with a frame causes the score in the node to be passed to one or more subsequent nodes (including the silence node 512) through a path 865.

Each state of a node may be represented by four values: a score, a starting time, a leaving penalty, and a staying penalty. The score represents the likelihood that a series of frames has placed the lexical tree in the state (that is, the probability that the series of frames corresponds to the word or portion of a word to which the state corresponds). The scores are maintained as negative logarithmic values.

The starting time identifies the hypothesized time at which the user began to speak the word or words represented by the state. In particular, the starting time identifies the time at which the score associated with the state entered the lexical tree (that is, the time at which the score was passed from the state 840 along the path 850).

The leaving and staying penalties are fixed values associated with the state. The staying penalty is added to any score that stays in the state. The staying penalty is related inversely to the length of the sound represented by the state and to the length of the phoneme represented by the node to which the state belongs. For example, the staying penalty could be proportional to $-\log(1-1/d_{avg})$, where $d_{avg}$ is the average duration, in frames, of the sound represented by the state. Thus, the staying penalty has a relatively large value when the sound corresponding to the state occurs for only a small amount of time and a relatively small value when the sound corresponding to the state occurs for a large amount of time.

The leaving penalty is added to any score that exits the state, and includes a duration component and a language model component. The duration component is related directly to the length of the sound represented by the state and to the length of the phoneme represented by the node to which the state belongs. For example, the duration component of the leaving penalty could be proportional to $-\log(1/d_{avg})$. Thus, the duration component of the leaving penalty has a relatively large value when the sound corresponding to the state occurs for a large amount of time and a relatively small value when the sound corresponding to the state occurs for a small amount of time.

The language model components of the leaving penalties for all states in a particular node together represent a language model score for the phoneme associated with that node. The language model score represents the likelihood that a word including the phoneme will occur in speech. The language model score included in the leaving penalties for a node is the increase in the best language model score for the branch of the lexical tree that begins with the node relative to the branch of the lexical tree that begins with the node's parent.

The following discussion assumes that there are no leaving or staying penalties associated with the state 840 or the state 860. The same result could be achieved by setting the leaving and staying penalties for states 840 and 860 equal to zero. The following discussion also assumes that the first frame is the first frame that may correspond to speech instead of silence.

FIG. 9 provides a simplified example of how scores propagate through the lexical tree 500. Before the first frame is retrieved (row 900), state 840 (which corresponds to silence) has a score of 0 and no other nodes are active. The score of 0 means that there is a one hundred percent probability that the system is starting from silence.

After the first frame is retrieved (row 905), the score for the state 840 ($S_{A1}$) is set equal to the acoustic score ($A_{A1}$) resulting from an acoustic match of the first frame with an acoustic model corresponding to the state 840 (that is, the acoustic model for silence). Thus, the score for the state 840 ($S_{A1}$) is set equal to the likelihood that the first frame corresponds to silence.

Retrieval of the first frame also causes the state 805 to become an active state. Assuming that the node 800 corresponds to a phoneme that starts a word, the score for the state 805 ($S_{B1}$) is set equal to the acoustic score ($A_{B1}$) resulting from an acoustic match of the first frame with the acoustic model corresponding to the state 805. Thus, the score for the state 805 ($S_{B1}$) is set equal to the likelihood that the first frame corresponds to the state 805. The starting time for the state 805 is set equal to the time associated with the first frame. This value for the starting time indicates that the score at state 805 represents a word that started at a time corresponding to the first frame. The starting time moves with the score as the score propagates through the lexical tree 500.

After the second frame is retrieved (row 910), the score for the state 840 ($S_{A2}$) is set equal to the sum of the previous score for the state ($S_{A1}$) and the acoustic score ($A_{A2}$)

resulting from an acoustic match of the second frame with the acoustic model for silence:

$$S_{A2}S_{A1}+A_{A2}=A_{A1}+A_{A2}.$$

As noted above, each of the scores corresponds to a negative logarithmic probability. Accordingly, adding scores together corresponds to multiplying the probabilities. Thus, the score for the state 840 ($S_{A2}$) equals the likelihood that both of the first and second frames correspond to silence. This process is repeated for subsequent frames (for example, lines 915 and 920) so that the score for the state 840 at a frame "n" ($S_{An}$) equals:

$$S_{An} = S_{An-1} + A_{An} = \sum_{m=1}^{n} A_{Am}.$$

This expression assumes that the silence node 512 is not reseeded from the root node 505. If reseeding occurs at a frame n, then the value of $S_{An-1}$ would be replaced by the score in the root node 505 for the frame n−1.

After the second frame is retrieved, the score for the state 805 ($S_{B2}$) is set equal to:

$$S_{B2}=\min(S_{B1}+\text{stay}_B, S_{A1})+A_{B2},$$

where $A_{B2}$ is the acoustic score resulting from an acoustic match of the second frame with the acoustic model corresponding to state 805 and $\text{stay}_B$ is the staying penalty for state 805. The score for state 805 ($S_{B2}$) corresponds to the more likely of two alternatives: (1) the first frame was silence and the second frame was the sound represented by the state 805 or (2) both of the first and second frames were the sound represented by the state 805. The first alternative corresponds to a transition from state 840 to state 805 along the path 850. The second alternative corresponds to a transition from state 805 back to state 805 along path 820. When the first alternative is the more likely, the starting time corresponding to the first frame that was stored previously for the state 805 is replaced by a value corresponding to the second frame. This value indicates that the score at state 805 represents a word that started with the second frame.

After the second frame is retrieved, the state 810 becomes an active state. The score for the state 810 ($S_{C2}$) is set equal to:

$$S_{C2}=S_{B1}+\text{leave}_B+A_{C2},$$

where $A_{C2}$ is the acoustic score resulting from an acoustic match of the second frame with the acoustic model corresponding to state 810 and $\text{leave}_B$ is the leaving penalty for the state 805. Similarly, $\text{leave}_C$ and $\text{leave}_D$ are leaving penalties for, respectively, states 810 and 815. The sum of language model components of $\text{leave}_B$, $\text{leave}_C$ and $\text{leave}_D$ represents the language model score for the phoneme represented by the node 800.

The methodology for determining state scores for states other than the silence state can be expressed more generally as:

$$S_{i,j}=\min(S_{i,j-1}+\text{stay}_i, S_{i-1,j-1}+\text{leave}_{j-1})+A_{i,j}.$$

for i greater than zero (where i equals zero corresponds to silence), and with the boundary condition that the score for an inactive state equals infinity or some sufficiently large value. The starting time for the state may be represented as:

$$t_{i,j}=t_{i,j-1} \text{ for } S_{i,j-1}+\text{stay}_i \leq S_{i-1,j-1}+\text{leave}_{j-1},$$

or $$t_{i,j}=t_{i-1,j-1} \text{ for } S_{i,j-1}+\text{stay}_i > S_{i-1,j-1}+\text{leave}_{j-1},$$

for i and j greater than zero and with the boundary condition that the time value for a newly active state represents the frame at which the state became active. As previously noted, state scores for the silence state may be determined as:

$$S_{0,j} = S_{0,j-1} + A_{0,j} = \sum_{m=1}^{j} A_{0,m}.$$

with the boundary condition that $S_{0,0}$ equals zero. An even more general form, in which the scores are expressed as functions of the various parameters, is illustrated in FIG. 10.

Figure 11:
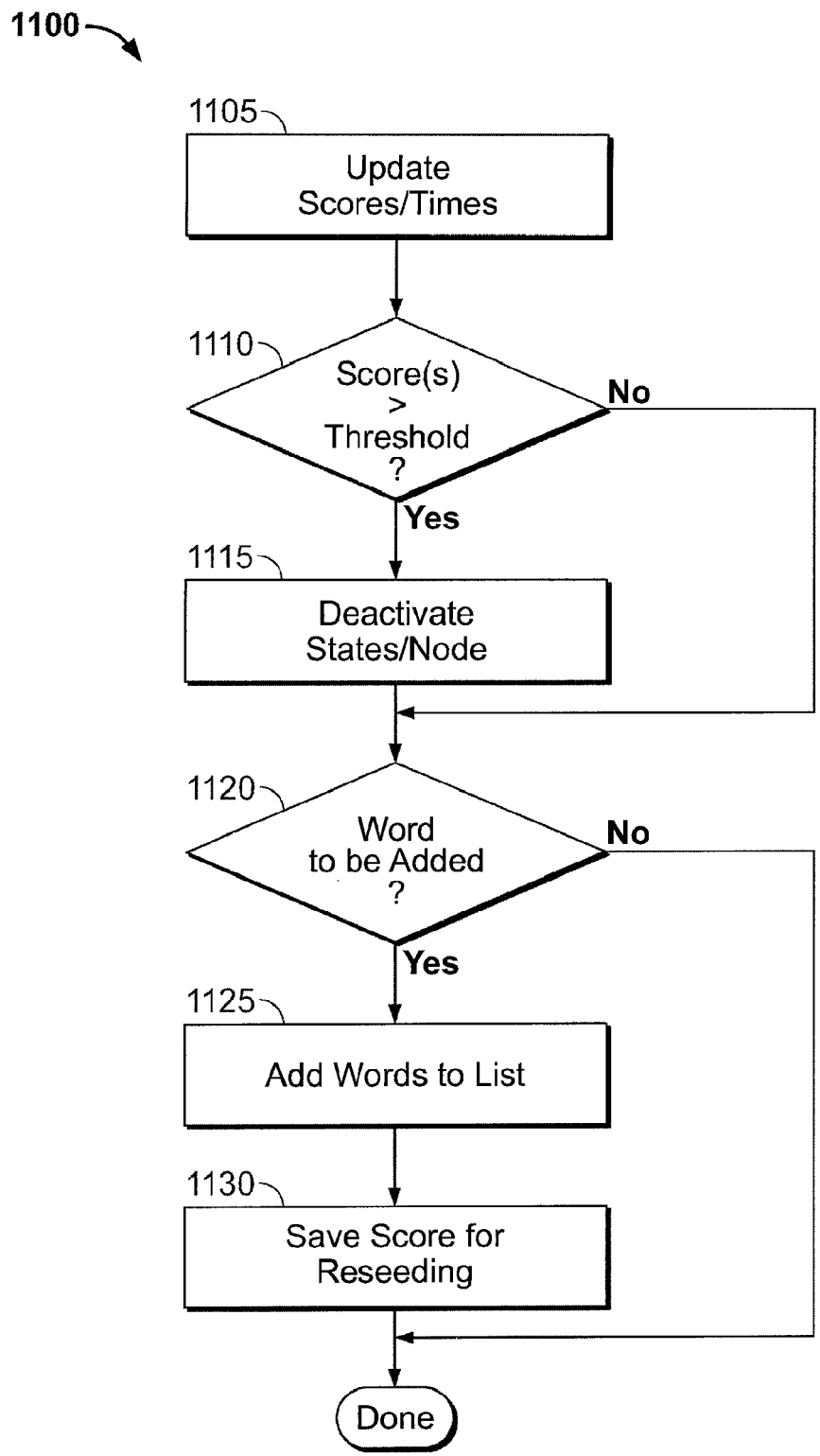
FIG. 11 is a flow chart of a procedure for processing nodes of a lexical tree.

Referring to FIG. 11, a node may be processed according to a node-processing procedure 1100. Initially, the node-processing procedure updates the scores and time values for each state of the node (step 1105). The node-processing procedure updates the scores and time values by generating acoustic scores and using the equations discussed above.

When the last state of the node was active prior to updating the scores for the node, the node-processing procedure 1100 uses the score for the last state to generate scores for any inactive subnodes of the node. If the generated score for a subnode does not exceed a pruning threshold, then the node-processing procedure activates that subnode and provides the subnode with the generated score.

Next, the node-processing procedure 1100 determines whether the score of any state of the node exceeds the pruning threshold (step 1110). When a score exceeds the pruning threshold, the likelihood that the word represented by the score was spoken is deemed to be too small to merit further consideration. For this reason, the procedure prunes the lexical tree by deactivating any state having a score that exceeds the pruning threshold (step 1115). If every state of the node is deactivated, then the node-processing procedure also deactivates the node. The node-processing procedure may deactivate a node or state by deleting a record associated with the node or state, or by indicating in the record that the node or state is inactive. Similarly, the node-processing procedure 1100 may activate a node or state by creating a record and associating the record with the node or state, or by indicating in an existing record that the node or state is active. The procedure 1100 may use a dynamic pruning threshold that accounts for variations in the average or best score in the lexical tree at any given time.

Next, the node-processing procedure 1100 determines whether a word is to be added to a list of words (step 1120). A word is added to the list of words when the node being processed corresponds to the last phoneme of a word, a score has been propagated out of the last state of the node, and the score is less than a list threshold. Before comparing the score to the list threshold, the node-processing procedure 1100 adds a language model score to the score. The language model score corresponds to the difference between the language model score for the word and the incremental language model score that is already included in the score. In general, the list threshold has a lower value than the pruning threshold. If the node being processed corresponds to the last phoneme of multiple words having the same phonetic spelling, then all of the words to which the node corresponds are added to the list of words.

If the noted conditions are met, the node-processing procedure 1100 adds the word or words to the list (step 1125). A word is stored in the list of words along with the score propagated out of the last state. If the word is on the list already, then the node-processing procedure 1100 stores with the list the better of the score already stored with the list or the score propagated out of the last state. The scores for words in a list of words are returned along with the list of words. The recognizer 215 uses these scores in making the detailed match.

The node-processing procedure 1100 also adds the word to lists of words for times that precede or follow the starting time to account for possible inaccuracies in the starting time of the word that may result from selecting the better of a score that remains in a state or a score propagated from a prior state. Spreading the word across multiple lists ensures that these inaccuracies will not impinge on the accuracy of the speech recognition system. The node-processing procedure 1100 spreads the word across multiple lists based on the length of the word.

After adding a word to the list of words (step 1125), the node-processing procedure 1100 saves the score associated with the word as a reseeding score for use in reseeding the tree (step 1130). Production of a word by the lexical tree 500 means that the current frame may correspond to the last frame of the word (with the probability of such a correspondence being reflected by the score associated with the word). This means that the next frame may correspond to the beginning of a word or to silence resulting from a pause between words. The pre-filtering procedure 240 reseeds the tree (step 730 of FIG. 7) to account for this possibility.

For a given frame, multiple nodes may produce words. However, the tree only needs to be reseeded once. To account for this, the node-processing procedure 1100 only saves the score associated with a word ($S_w$) as the reseeding score ($S_{RS}$) if the word is the first word to be generated by the tree 500 for the current frame of if the word score is less than the score for all other words generated by previously-processed nodes for the current frame ($S_{RS}'$):

$$S_{RS} = \min(S_W, S_{RS}').$$

Saving only the lowest score (that is, the score indicating the highest probability that the current frame was the last frame of a word) ensures that the tree will be reseeded using the highest probability that the next frame is the first frame of a new word.

To reseed the tree (step 730 of FIG. 7), the pre-filtering procedure 240 activates the root node 505 and associates the minimum of the reseeding score ($S_{RS}$) and the score for the silence node 512 with the root node. During processing of the next frame, the active root node 505 may be used to activate nodes in the group 510 or to activate the silence node 512. Processing of the node is complete after the node-processing procedure 1100 saves a score for use in reseeding the tree (step 1130), or if no word is to be added to the list of words (step 1120).

Referring again to FIG. 2, after the pre-filtering procedure 240 responds with the requested list of words, the recognizer 215 initiates a hypothesis for each word from the list and compares acoustic models for the word to the frames of parameters representing the utterance. The recognizer 215 uses the results of these comparisons to generate scores for the hypotheses. Hypotheses having excessive scores are eliminated from further consideration. As noted above, hypotheses that comply with no active constraint grammar also are eliminated.

When the recognizer 215 determines that a word of a hypothesis has ended, the recognizer 215 requests from the pre-filtering procedure 240 a list of words that may have been spoken just after the ending-time of the word. The recognizer 215 then generates a new hypotheses for each word on the list, where the new hypothesis includes the words of the old hypothesis plus the new word.

In generating the score for a hypothesis, the recognizer 215 uses acoustic scores for words of the hypothesis, a language model score that indicates the likelihood that words of the hypothesis are used together, and scores provided for each word of the hypothesis by the pre-filtering procedure 240. The scores provided by the pre-filtering procedure 240 include components corresponding to a crude acoustic comparison and a language model score indicative of the likelihood that a word is used, independently of context. The recognizer 215 may eliminate any hypothesis that is associated with a constraint grammar 225 (for example, a command hypothesis), but does not comply with the constraint grammar.

Figure 12:
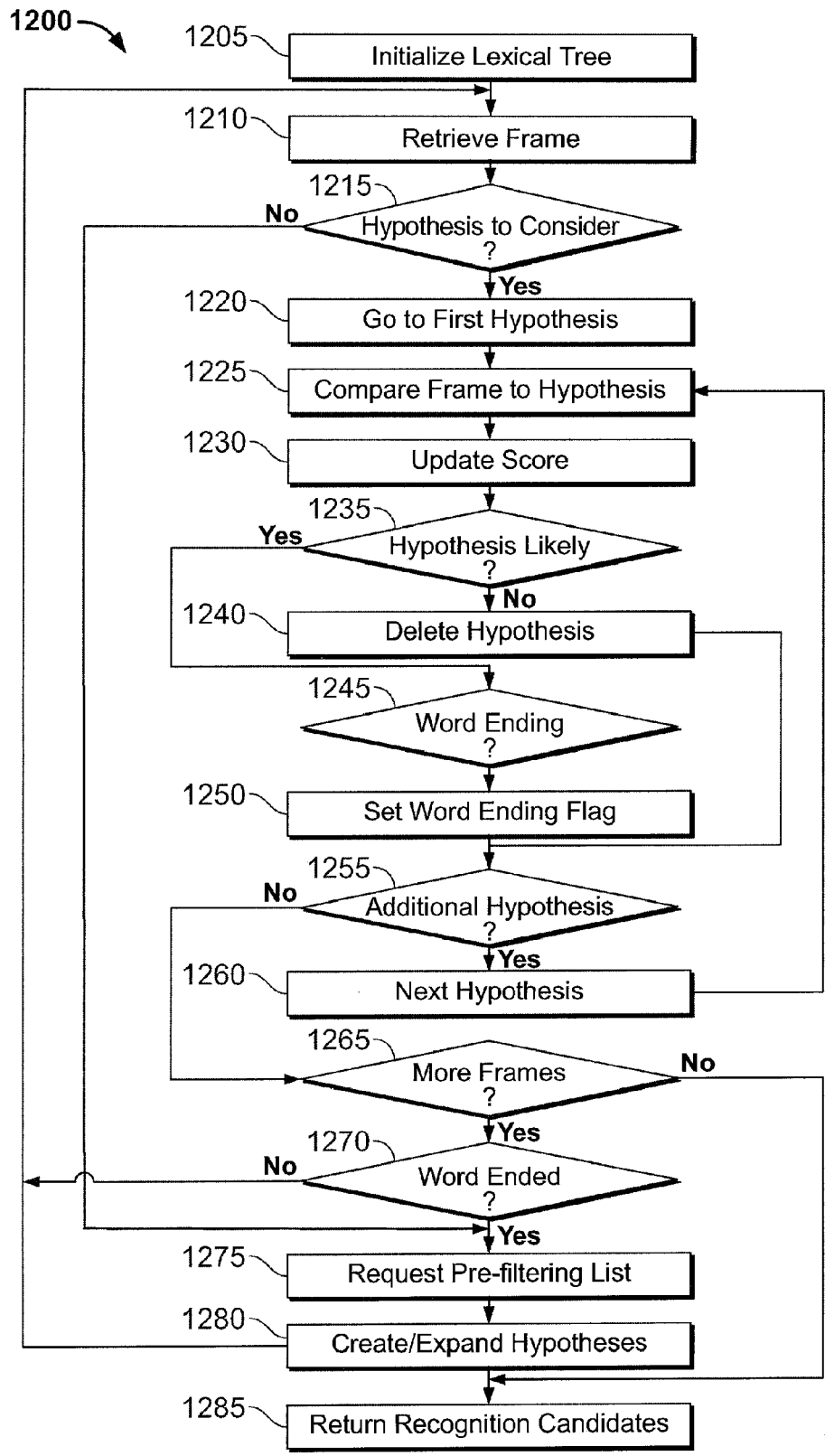
FIG. 12 is a flow chart of a speech recognition procedure.

Referring to FIG. 12, the recognizer 215 operates according to a procedure 1200. First, prior to processing, the recognizer 215 initializes the lexical tree 500 as described above (step 1205). The recognizer 215 then retrieves a frame of parameters (step 1210) and determines whether there are hypotheses to be considered for the frame (step 1215). The first frame always corresponds to silence so that there are no hypotheses to be considered for the first frame.

If hypotheses need to be considered for the frame (step 1215), then the recognizer 215 goes to the first hypothesis (step 1220). The recognizer then compares the frame to acoustic models 235 for the last word of the hypothesis (step 1225) and, based on the comparison, updates a score associated with the hypothesis (step 1230).

After updating the score (step 1230), the recognizer 215 determines whether the user was likely to have spoken the word or words corresponding to the hypothesis (step 1235). The recognizer 215 makes this determination by comparing the current score for the hypothesis to a threshold value. If the score exceeds the threshold value, then the recognizer 215 determines that the hypothesis is too unlikely to merit further consideration and deletes the hypothesis (step 1240).

If the recognizer 215 determines that the word or words corresponding to the hypothesis were likely to have been spoken by the user, then the recognizer 215 determines whether the last word of the hypothesis is ending (step 1245). The recognizer 215 determines that a word is ending when the frame corresponds to the last component of the model for the word. If the recognizer 215 determines that a word is ending (step 1245), the recognizer sets a flag that indicates that the next frame may correspond to the beginning of a word (step 1250).

If there are additional hypotheses to be considered for the frame (step 1255), then the recognizer 215 selects the next hypothesis (step 1260) and repeats the comparison (step 1225) and other steps. If there are no more hypotheses to be considered for the frame (step 1255), then the recognizer determines whether there are more frames to be considered for the utterance (step 1265). The recognizer 215 determines that there are more frames to be considered when two conditions are met. First, more frames must be available. Second, the best scoring node for the current frame or for one or more of a predetermined number of immediately preceding frames must have been a node other than the silence node (that is, the utterance has ended when the silence node is the best scoring node for the current frame and for a predetermined number of consecutive preceding frames).

If there are more frames to be considered (step 1265) and the flag indicating that a word has ended is set (step 1270), or if there were no hypotheses to be considered for the frame (step 1215), then the recognizer 215 requests from the pre-filtering procedure 240 a list of words that may start with the next frame (step 1275).

Upon receiving the list of words from the pre-filtering procedure 240, the recognizer 215 uses the list of words to create hypotheses or to expand any hypothesis for which a word has ended (step 1280). Each word in the list of words has an associated score. Prior to adding a list word to a hypothesis, the recognizer 215 modifies the list score ($S_L$) for the word to produce a modified list score ($S_{ML}$) as:

$$S_{ML}=S_L+L_C-L_L,$$

where $L_C$ is a language model score that represents the frequency with which the pair of words that includes the list word and the immediately preceding word in the hypothesis are used together in speech, and $L_L$ is a language model score included in the list score and corresponds to the frequency with which the list word is used in speech, without reference to context. The recognizer 215 then adds the modified list score to the score for the hypothesis and compares the result to a threshold value. If the result is less than the threshold value, then the recognizer maintains the hypothesis. Otherwise, the recognizer determines that the hypothesis does not merit further consideration and abandons the hypothesis. As an additional part of creating or expanding the hypotheses, the recognizer 215 compares the hypotheses to the active constraint grammars 225 and abandons any hypothesis that corresponds to no active constraint grammar. The recognizer 215 then retrieves the next frame (step 1210) and repeats the procedure.

If there are no more speech frames to process, then the recognizer 215 provides the most likely hypotheses to the control/interface module 220 as recognition candidates (step 1285).

Referring again to FIG. 2, the control/interface module 220 controls operation of the speech recognition software 160 and provides an interface to other software or to the user. The control/interface module 220 receives the list of recognition candidates for each utterance from the recognizer 215. Recognition candidates may correspond to dictated text, speech recognition commands, or external commands. When the best-scoring recognition candidate corresponds to dictated text, the control/interface module 220 provides the text to an active application, such as a word processor. The control/interface module 220 also may display the best-scoring recognition candidate to the user through a graphical user interface. When the best-scoring recognition candidate is a command, the control/interface module 220 implements the command. For example, the control/interface module may control operation of the speech recognition software 160 in response to speech recognition commands and may forward other commands to the appropriate software.

The control/interface module 220 also controls the active vocabulary 230, acoustic models 235, and constraint grammars 225 that are used by the recognizer 215. For example, when the speech recognition software 160 is being used in conjunction with a particular application (for example, Microsoft Word), the control/interface module 220 updates the active vocabulary 230 to include command words associated with that application and activates constraint grammars 225 associated with the application.

Other functions provided by the control/interface module 220 include an enrollment program, a vocabulary customizer, and a vocabulary manager. The enrollment program collects acoustic information from a user and trains or adapts a user's models based on that information. The vocabulary customizer optimizes the language model of a specific topic by scanning user supplied text. The vocabulary manager is a developer tool which is used to browse and manipulate vocabularies, grammars and macros. Each function of the control/interface module 220 may be implemented as an executable program that is separate from the main speech recognition software.

Figures 13A, 13B:
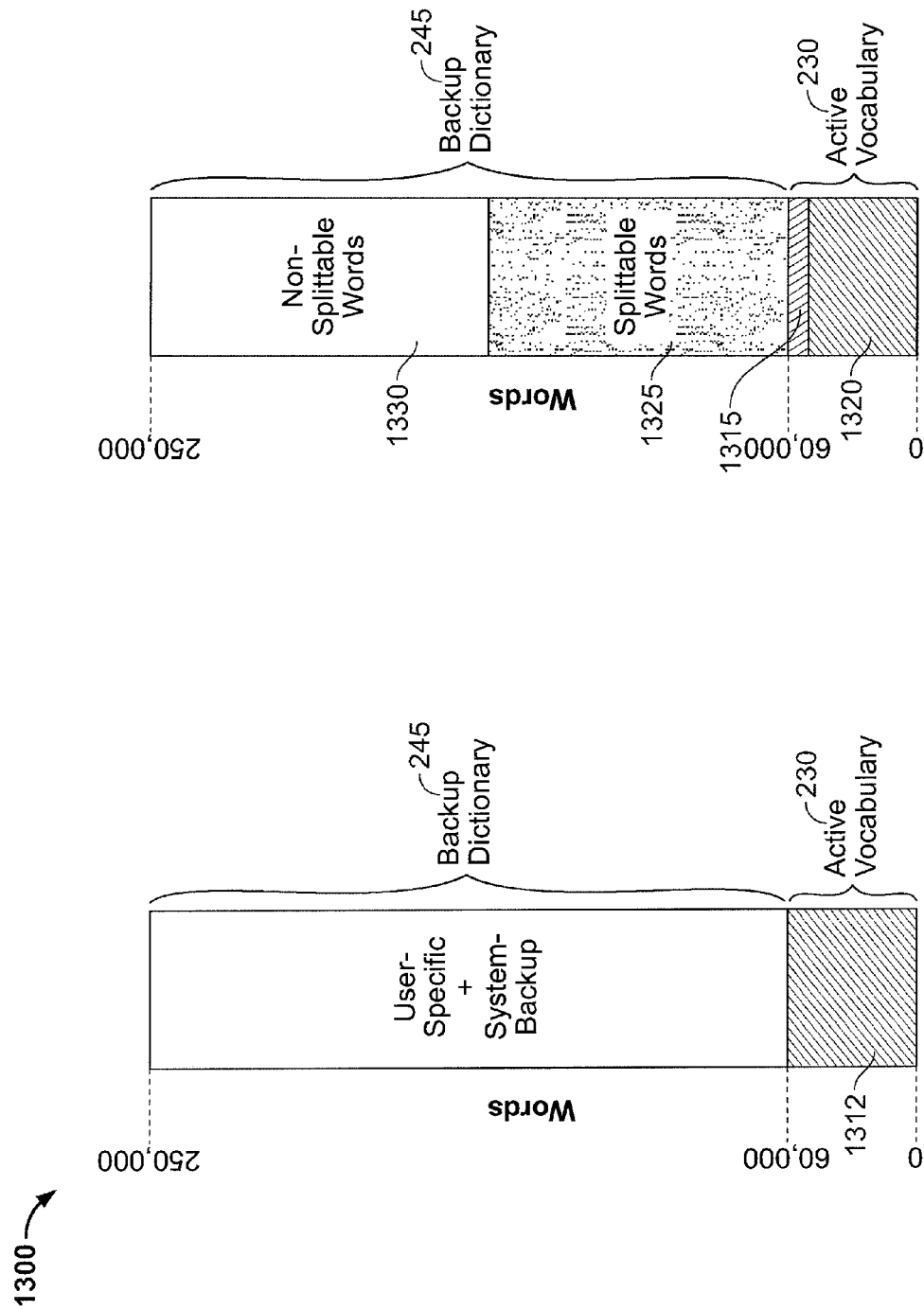
FIGS. 13A and 13B are block diagrams of a complete dictation vocabulary that does (FIG. 13B) and does not (FIG. 13A) include word fragments.

Referring also to FIG. 13A, a complete dictation vocabulary 1300 includes the active vocabulary 230 plus a backup dictionary 245. The backup dictionary 245 may include user-specific backup vocabulary words and system-wide backup vocabulary words. User-specific backup vocabulary words include words that a user has added while using the speech recognition software. In one implementation, there is a limit of 64,000 user-specific words. User-specific words are stored in vocabulary files for the user and for the dictation topic used during their addition, and are available as part of the backup dictionary for the dictation topic regardless of the user, and to the user regardless of the dictation topic. For example, if a user using a medical topic adds the word "ganglion" to the dictation vocabulary 1300, any other user of the medical topic will have immediate access to the word "ganglion". In addition, the word will be written into the user-specific backup vocabulary, so that, if the user later says "ganglion" while using a legal topic, the word "ganglion" will be available. The system-wide backup vocabulary words include all other non-active words known to the system.

The control/interface module 220 implements error correction procedures of the speech recognition software 160. When the speech recognition system 100 makes a recognition error, the user may invoke an appropriate correction command to remedy the error. During error correction, word searches of the backup dictionary 245 start with the user-specific backup dictionary and then check the system-wide backup dictionary. The backup dictionary 245 also is searched when there are new words in text that a user has typed.

In general, the backup dictionary 245 includes substantially more words than are included in the active vocabulary 230. For example, when the active vocabulary 230 has 60,000 or so entries, the backup dictionary 245 may have roughly 190,000 entries. The active vocabulary 230 is a dynamic vocabulary in that entries may be added or subtracted from the active vocabulary over time. For example, when the user indicates that an error has been made and the control/interface module 220 uses the backup dictionary 245 to correct the error, a new word from the backup dictionary 245 may be added to the active vocabulary 230 to reduce the likelihood that the error will be repeated.

Referring also to FIG. 13B, the effective size of the active vocabulary 230 may be increased by dividing words into constituent components or word fragments 1315. Word fragments include prefixes and suffixes which are collectively known as affixes. A prefix is any word fragment that precedes another word fragment or word and therefore may be represented as "prefix+". For example, a common prefix used in the English language is "re+". In contrast to a prefix, a suffix is any word fragment that follows another word fragment or word. A suffix may be represented as "+suffix". For example, a common suffix used in the English language is "+ed".

Word fragments also include roots that can join with a prefix or a suffix. A root may be a true root, in which case it is not a complete word when used alone and therefore may be represented as "+root+". An example of a true root is "+crimin+" which may form the word "decriminalize" when preceded by prefix "de+" and followed by the suffixes, in succession, "+al" and "+ize". A root also may be a word root that is a word when used alone. For example, the word root "look" may be used as the word "look" or may be joined with other word fragments to form another word such as "looked".

Word fragments may also include separators, such as the "s" used in the German language to join words together or the hyphen which is frequently used in the English language, and infixes, which are word fragments positioned in the interior of a word in such languages as Hungarian Mon-Khmer. For example, in the language Tagalog "tawa" means "laugh," but "t-um-awa" means "to laugh". Thus, -um- could represent an infix in the Tagalog language. As another example, in the Thai language, "pak" means "rest", however "p-n-ak" means "a support" such as a chair. Thus, -n- could represent an infix in the Thai language. Infixes are rare in the English language. An example of an informal infix used in English might be -bloody- as in "fan-bloody-tastic".

Each word fragment 1315 is included as a separate entry in the active vocabulary 230 along with a set of active words 1320 that typically includes a large portion of the previously active words 1312. The word fragments 1315 increase the effective size of the active vocabulary to include words that may be in the backup dictionary 245, designated as splittable words 1325, that may be formed from combinations of word fragments with other word fragments or with active words. The words of the backup dictionary that may not be formed from these combinations are designated as non-splittable words 1330.

When the recognizer 215 detects a word fragment 1315 in an utterance, the system combines the word fragment with one or more other word fragments or words to produce a new word, and then searches the backup dictionary 245 or applies rules to confirm that the new word is a valid word. Thus, the speech recognition system 100 is able to tap into the backup dictionary 245 without requiring the recognizer to process words of the backup dictionary 245. By increasing the effective size of the active vocabulary 230, without increasing its real size, the recognition coverage of the speech recognition system 100 is expanded without significantly increasing the required memory capacity or processing time.

The backup dictionary 245 may include words that are not recognized as a concatenation of a sequence that includes words and word fragments. For example, many proper names may be included in the backup dictionary. The name "Scarlotti" is one example of a proper name that may not be splittable.

Figures 14A, 14B, 14C:
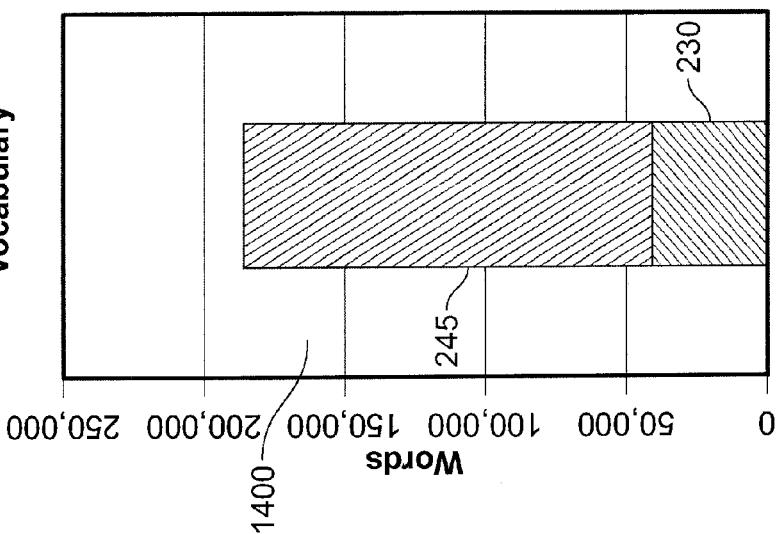
FIGS. 14A and 14B are block diagrams of a complete dictation vocabulary for the French language that does (FIG. 14B) and does not (FIG. 14A) include word fragments.
FIG. 14C is a block diagram of the word fragment component of the vocabulary of FIG. 14B.

FIGS. 14A and 15A show examples of the size of the complete dictation vocabulary 1300 of one implementation for, respectively, the French language and the U.S. version of the English language, without the use of word fragments. In this implementation, the complete French dictation vocabulary 1400 includes about 180,000 words with about 40,000 of those words being in the French active vocabulary 230. By contrast, in this implementation, the complete U.S. English dictation vocabulary 1500 includes about 240,000 words with about 30,000 of those words being in the U.S. English active vocabulary 230.

Referring to FIG. 14B, word fragments may be used to increase the effective size of the French active vocabulary 230, while keeping the complete dictation vocabulary 1400 near about 180,000 words and the active vocabulary 230 near 40,000 elements. With word fragments, the active vocabulary 230 includes about 36,700 active French words 1402 and about 3,300 French word fragments 1405, such that the word fragments 1405 total about 8% of the total active vocabulary 230. As shown, in this implementation, a substantial portion of the backup dictionary constitutes splittable words 1410 that may be accessed from the active vocabulary 230, while a much smaller portion constitutes non-splittable words 1415. Referring also to FIG. 14C, the French word fragments 1405 include mostly French true roots 1420 (that is, roots that are not words), while French word roots 1425 (that is, roots that are also words), French suffixes 1430, and French prefixes 1435 constitute a small segment of the French word fragments 1405.

Referring to FIG. 15B, word fragments also may be used to increase the effective size of the U.S. English active vocabulary 230, while keeping the complete dictation vocabulary 1500 near about 240,000 words and the active vocabulary 230 at 30,000 elements. The active vocabulary 230 includes about 28,800 active U.S. English words 1502 and about 1,200 U.S. English word fragments 1505, such that the word fragments 1505 total about 4% of the total active vocabulary 230. As shown, a smaller portion of the backup dictionary constitutes splittable words 1510 that may be accessed from the active vocabulary 230, while a larger portion constitutes non-splittable words 1515. Referring also to FIG. 15C, the set of U.S. English word fragments 1505, in contrast to the French word fragments 1405, includes quite a small percentage of U.S. English true roots 1520 in this particular implementation, while U.S. word roots 1525 constitute the largest segment of U.S. word fragments 1505. In this implementation, U.S. English suffixes 1530 and prefixes 1535 constitute about one third of the U.S. English word fragments 1505, a substantially larger portion than the true roots. In another more recent implementation, the set of U.S. English word fragments 1505 may be larger or may include a larger percentage of true roots.

Generation of Word Fragments (Procedure 1600)

Figure 16A:
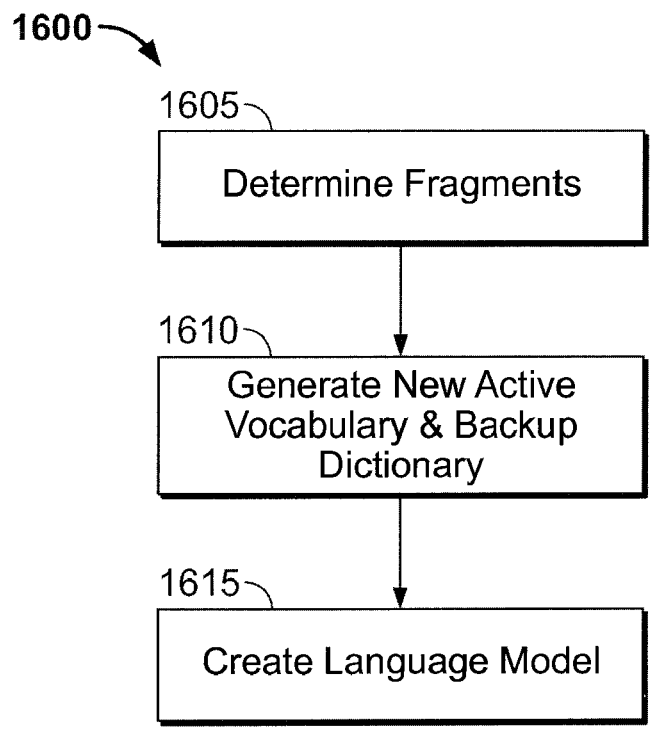
FIG. 16A is a flow chart of a procedure for generating word fragments that will be used in a speech recognition system.

Referring to FIG. 16A, word fragments may be generated in the speech recognition system 100 through a procedure 1600. This procedure 1600 is implemented "offline"; that is before the speech recognition software 160 is sold and installed. The procedure is performed by a system other than the speech recognition system 100.

During the off-line procedure 1600, word fragments 1315 are identified (step 1605). Then, using the word fragments 1315, a new active vocabulary 230 and a new backup dictionary 245 are generated (step 1610).

In one implementation, the new active vocabulary is constrained to be the same size as the old active vocabulary, such that the word fragments 1315 replace the least frequently used words of the active vocabulary. For example, in the implementation shown in FIG. 14B, the new French active vocabulary 230 has the same total number of elements (that is, 40,000) as the old French active vocabulary shown in FIG. 14A, but now includes word fragments 1405 and a corresponding reduction in the number of active words.

In other implementations, the new active vocabulary may be larger or smaller in size than the old active vocabulary.

After the new backup dictionary and the new active vocabulary are built, the language model is created (step 1615). This permits the speech recognition system 100 to use the created language model to recognize both word fragments and words, and, in particular, to recognize word fragments in the context of surrounding word fragments and words.

Using Word Fragments (Procedure 1650)

Figure 16B:
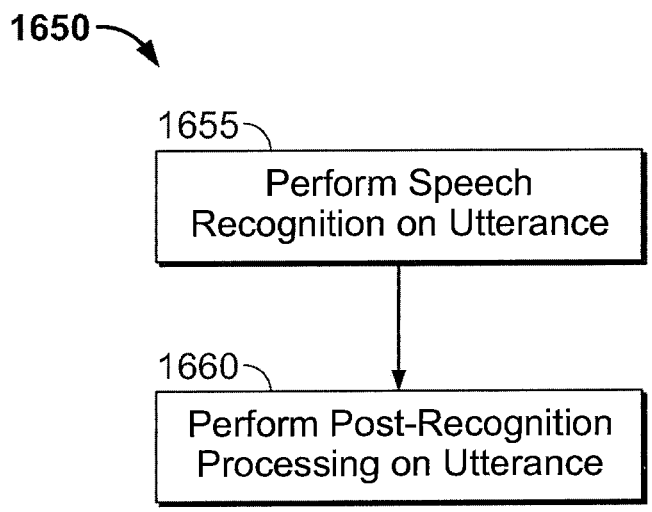
FIG. 16B is a flow chart of a procedure for using generated word fragments in the speech recognition system.

Referring also to FIG. 16B, once the off-line procedure 1600 is completed, the speech recognition system 100 is ready to perform speech recognition using the updated language model and the new active vocabulary according to an "on-line" procedure 1650. To this end, the system 100 performs speech recognition on an utterance to generate a list of candidates (step 1655). During speech recognition, the recognizer 215 operates according to the procedure 1200 shown in FIG. 12, with the exception that the recognizer 215 is able to detect word fragments 1315 as well as words.

After the recognizer 215 generates the list of candidates for an utterance, the system 100 performs a post-recognition procedure (step 1660). During the post-recognition procedure, the system 100 combines any word fragments 1315 that may be included in a recognition candidate to form a word and looks up the word in the backup dictionary 245 or applies rules to verify that it is a valid word. Candidates that include word fragments which form invalid words are discarded.

In the following discussing, the off-line procedure 1600 is explained with respect to FIGS. 17–28. Following that explanation, the on-line procedure 1650 is explained with reference to FIGS. 12, 29 and 30.

Identify Fragments (Step 1605)

Figure 17:
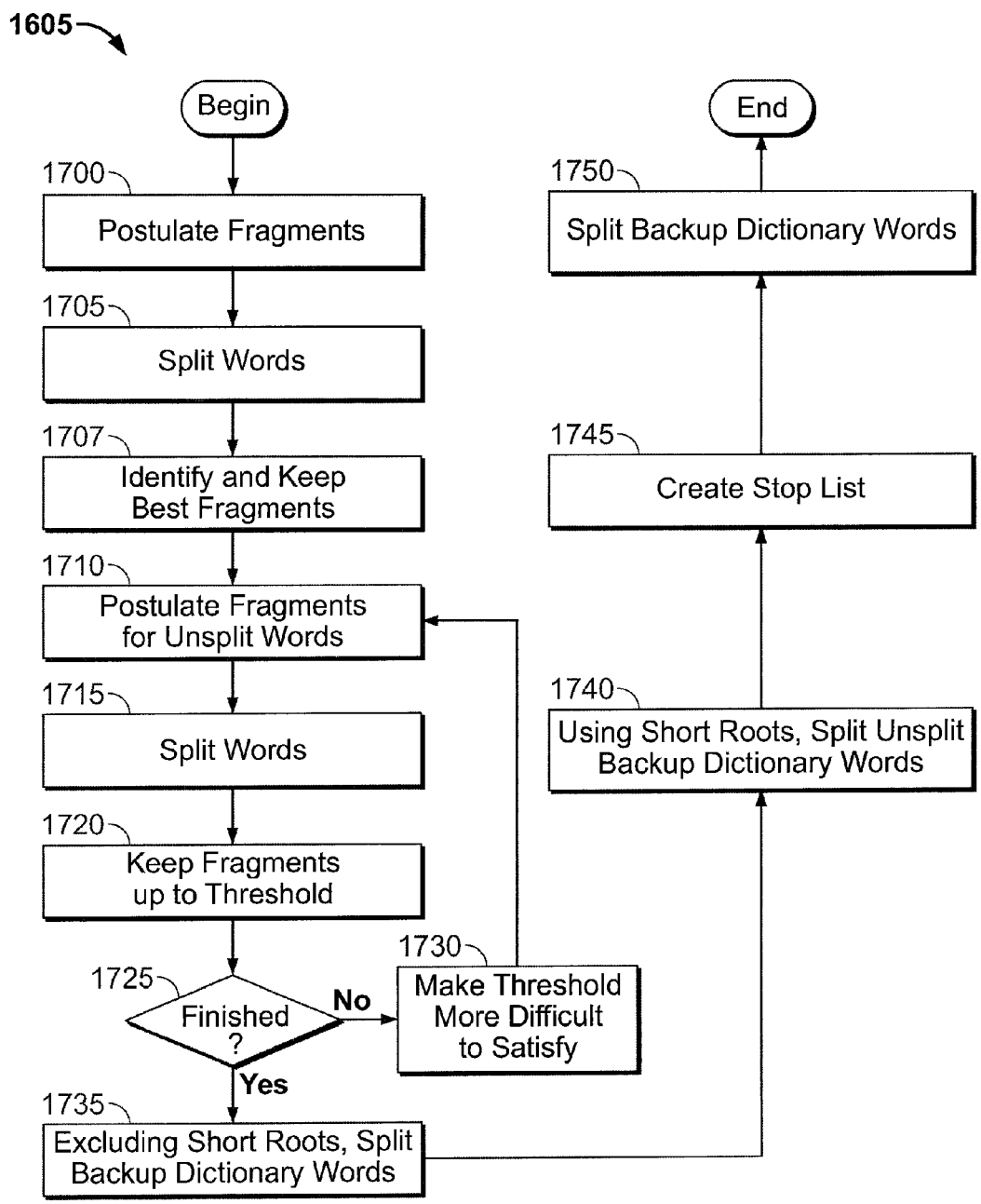
FIG. 17 is a flow chart of a procedure for determining word fragments as part of the procedure of FIG. 16.

Referring to FIG. 17, word fragments 1315 that will be included in the new active vocabulary 230 are identified according to a computer-implemented procedure 1605. First, and as discussed below with reference to FIG. 18, the computer postulates an initial set of word fragments (step 1700). As shown in FIGS. 14C and 15C and discussed above, word fragments 1315 may include affixes (that is, prefixes and suffixes), roots (both true roots and word roots), separators (useful, for instance, in Germanic languages), and infixes. However, the described implementation postulates only roots, prefixes, and suffixes. Each prefix or suffix includes a list of one or more spelling rules that define how the prefix or suffix may be combined with a root or word to form another word.

Once the word fragments 1315 are postulated, the computer uses the word fragments 1315 to split words from the backup dictionary 245 (step 1705). For each word of the backup dictionary, the computer determines whether the word can be generated using a sequence of zero or more prefixes, a root or a word from the active vocabulary, and a sequence of zero or more suffixes, and employing the spelling rules associated with the prefixes and suffixes. Other implementations may permit compound words, such that the sequence may include multiple roots or words from the active vocabulary. The computer does not necessarily monitor whether words from the active vocabulary 230 may be split at this stage because most of the words in the old active vocabulary will remain in the new active vocabulary, and because the purpose of adding the word fragments to the active vocabulary is to form words that are not found in the active vocabulary, but should be found in the backup dictionary 245.

The computer then identifies and keeps the best roots and affixes, while discarding the others (step 1707). Identification of the best or most useful word fragments may be based on a number of occurrences of the word fragments in words of the backup dictionary, the relative frequency of words of the backup dictionary in which the word fragments occur, or some other appropriate criterion. In general, the computer generates a score for each fragment using a particular criterion or set of criteria, and discards the fragments having scores that do not satisfy a threshold requirement.

Next, the computer begins an iterative process in which the computer attempts to split unsplit words of the backup dictionary by generating new word fragments. To begin an iteration, the computer postulates word fragments 1315 for those words in the backup dictionary 245 that could not be split using the retained word fragments (step 1710). This is similar to the original postulation of fragments except that the computer now focuses only on the unsplit words in the backup dictionary 245 and uses the word fragments kept in step 1707 as part of the active vocabulary. The computer then uses the new fragments to split unsplit words of the backup dictionary 245 (step 1715) and keeps the new word fragments having scores that satisfy a threshold requirement (step 1720). The threshold requirement initially may be set to retain a relatively large number of word fragments 1315. On the other hand, the threshold requirement initially may be set to retain a relatively small number of word fragments.

If the computer has not performed a designated number of iterations (step 1725), the computer begins another iteration by making the threshold requirement more difficult to satisfy (step 1730), and postulating a new set of word fragments (1710). In most implementations, the computer performs from 3–5 iterations. In another implementation, at step 1730, the computer may begin a next iteration by making the threshold requirement easier to satisfy. The threshold requirement may be varied in a zigzag manner, for example, first high, then low, and so forth. Iterations with the higher threshold requirement would run relatively quickly and could establish a core set of mostly useful word fragments.

Once the designated number of iterations have been performed (step 1725), the computer splits up the backup dictionary words using the word fragments, but does not include short roots in the set of word fragments used (step 1735). Generally, longer roots have more detailed acoustic models than shorter roots and, for this reason, are more likely to be correctly identified by the speech recognizer 215 than are shorter roots. Accordingly, if a word may be represented by a long root and a first set of one or more other fragments, or a short root and a second set of one or more other fragments, the word is more likely to be recognized when it is represented using the long root. For example, the word "accordingly" may be represented as "accord+ing+ly" or "ac+cord+ing+ly", with the first representation being the one more likely to result in correct recognition. By excluding short roots, such as "cord", from the first splitting step, the computer ensures that words such as "accordingly" will be represented using the preferred longer roots. The computer then includes the short roots in the set of word fragments and splits up the backup dictionary words that were not split using only long roots (step 1740).

Next, a stop list of undesirable word fragments 1315 may optionally be created (step 1745). This stop list may be based on human intervention. For example, a person familiar with the language being processed may exclude word fragments that do not make sense. If a stop list is created, the computer then splits up words in the backup dictionary into word fragments 1315 without using word fragments from the stop list (step 1750).

Postulate Fragments (Step 1700)

Postulation of fragments (step 1700) will now be discussed with reference to FIGS. 18–22. Referring to FIG. 18, the computer first postulates affixes (step 1800). In English, affixes include prefixes and suffixes. In other languages, as discussed earlier, affixes may also include infixes and separators. The following discussion assumes that the affixes include only prefixes and suffixes. However, it should be clear that other types of affixes may be generated using similar techniques. As discussed in detail below with reference to FIG. 19, the computer generates a set of prefixes and suffixes and associated spelling rules that may be used in conjunction with words of the active vocabulary to form words of the backup dictionary. In particular, for each word of the active vocabulary, the computer finds similar words in the backup dictionary and identifies affixes and associated spelling rules that may be used to map from the active word to the backup word or words.

Once the list of possible affixes is formed, the computer finds the word roots (that is, roots that are words) and true roots (that is, roots that are not words) that may be used in conjunction with the postulated prefixes and suffixes to form words of the backup dictionary (step 1805). In particular, for each backup word ending with a suffix or beginning with a prefix, the computer finds the root or roots that may be combined with the affixes to form the word. The computer then keeps the most useful of these roots.

Finally, the computer postulates a new set of prefixes and suffixes using an active vocabulary supplemented with the roots kept (step 1810). With the exception of the change to the active vocabulary, this step is identical to the original (step 1800).

Postulate Affixes (Step 1800)

Referring to FIG. 19, affixes are postulated according to a generalized procedure 1800. In the described implementation, the procedure 1800 is performed once for suffixes and once for prefixes. The discussion below references suffixes, but is equally applicable to prefixes.

Initially, and as discussed in detail below with reference to FIG. 20, the computer finds all spelling rules for suffixes (step 1900). A spelling rule indicates how a word of the active vocabulary must be modified to form a word of the backup dictionary. For example, a spelling rule for converting the active word "hop" to the backup word "hopping" might be to add "ping" to the end of "hop", an alternative rule for the same purpose would be to replace the "p" at the end of "hop" with "pping".

Once the suffix spelling rules are found, the computer groups the spelling rules together to completely define the suffixes (step 1905). Each suffix has an associated set of spelling rules that, when joined with the suffix, defines usage of that suffix in words. For example, a set of rules for the "+ing" suffix might be:

| | |
|---|---|
| −null | +ing |
| −null | +ling |
| −null | +ping |
| −l | +lling |
| −p | +pping |
| −e | +ing |
| −k | +king | where "−null" indicates that nothing is removed from the root before adding the suffix and, for example, "−p" indicates that a "p" is removed from the root before adding the suffix.

Once the suffixes are defined, the computer keeps the most useful spelling rules for each suffix (step 1910). This determination may be based on the frequency with which a spelling rule may be used to form a word, the relative frequency of the words formed by the spelling rule, or any other useful criterion. For example, the computer may determine that the spelling rule −null, +ping is redundant to the spelling rule −p, +pping, and may drop the −null, +ping rule for that reason. In general, a rule that removes one or more characters from the end of an active word is more precise than a rule that does not, which provides for more efficient processing. Furthermore, if the rule that removes one or more characters can be used to split the same set of backup words as a rule that does not remove any characters, then the rule that removes one or more characters is favored for the reason that it provides for more efficient processing. For example, only roots or words that end with "p" must be considered with the −p, +pping rule, while all roots or words must be considered with −null, +ping.

Next, the computer retains the most useful suffixes (step 1915). Identification of the most useful suffixes may be based on the frequency of suffix occurrence or any other useful criterion. In general, suffixes that map to more or more common backup words are favored over suffixes that map to fewer or less common backup words. To retain the most useful suffixes, the computer associates a score with each suffix and retains the suffixes having scores that satisfy a threshold requirement, or the best-scoring suffixes up to a designated maximum number.

After the computer has retained the most useful suffixes, it repeats the procedure 1800 for prefixes. The procedure for prefixes is the same as the procedure for suffixes.

Find Spelling Rules (Step 1900)

Figure 20:
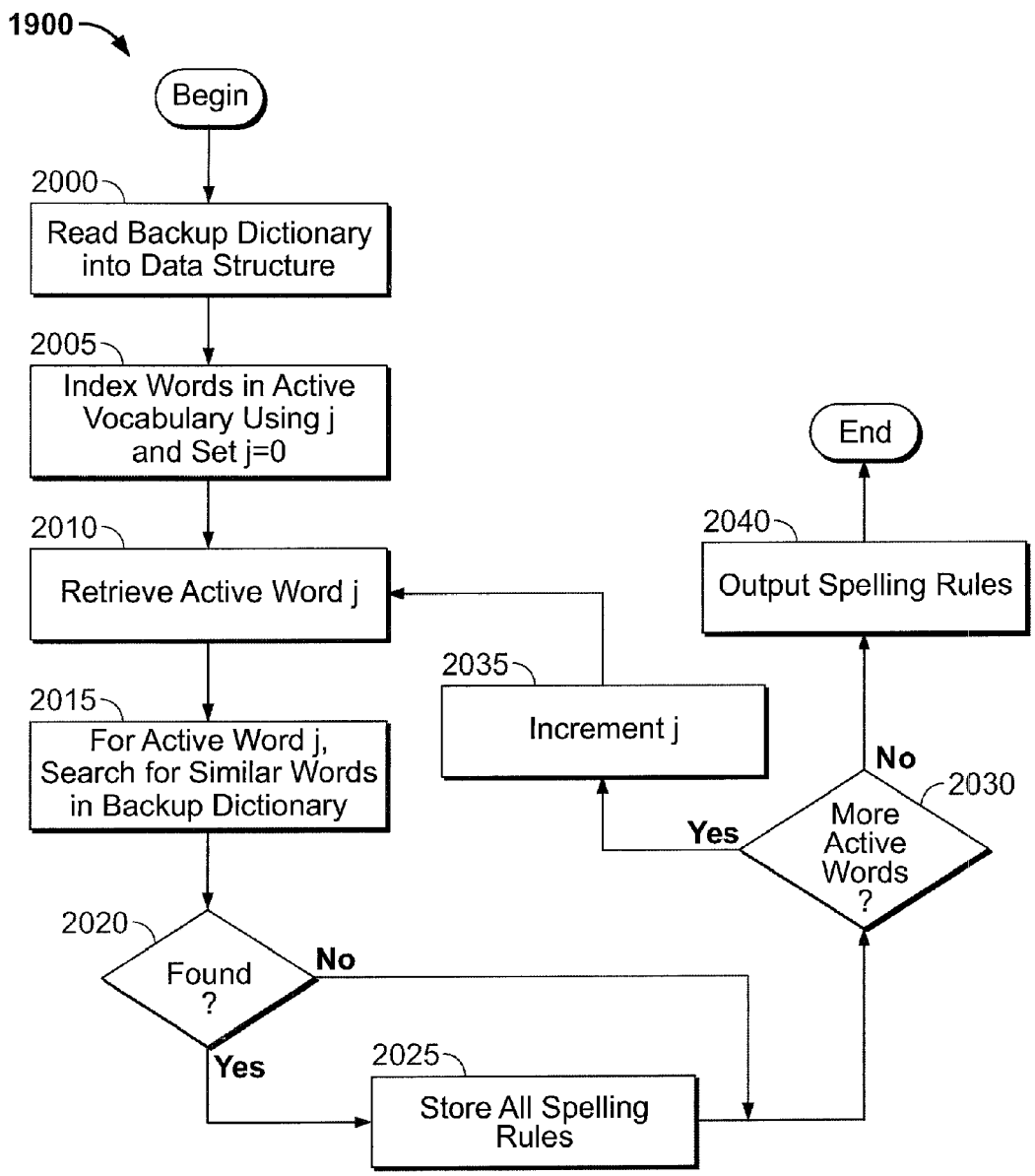
FIG. 20 is a flow chart of a procedure for finding useful spelling rules associated with the affixes as part of the procedure of FIG. 19.

Referring to FIG. 20, spelling rules are determined according to a procedure 1900. Spelling rules are used to form affixes, and are used by the speech recognition system 100 during the post-recognition processing to combine word fragments with other word fragments. A set of spelling rules is associated with each affix. To combine an affix with a root to form a word, one of the spelling rules for the affix must be followed to determine the final spelling of the word. For example, for the suffix "+ing," one associated spelling rule might be to add "ing" to the end of the root and another associated spelling rule might be to subtract "p" from the end of the root and to add "pping" to the end of the root.

First, the computer reads the whole backup dictionary 245 into a data structure, such as a Patricia (Practical Algorithm to Retrieve Information coded in Alphanumeric) Tree, to facilitate searching through the backup dictionary 245 (step 2000). A Patricia Tree is a compact representation of a tree in which all nodes with one child are merged with their parents. Such a data structure can efficiently store and search sets of data items such as word strings, where the strings may be substantially the same except for a small number of bit positions.

The computer then indexes all words in the active vocabulary (step 2005) and retrieves the first word (word j, where j=0) (step 2010). After retrieving a word, the computer searches through the data structure for words having spellings that begin in the same way as the retrieved word (step 2015).

If any similar words are found (step 2020), the computer stores all spelling rules that may be used to convert the active word to the one or more similar sounding words (step 2025). For example, for the active word "gripe", the computer might find the similar words "griped", "griping", "gripes", and "griper". Spelling rules generated for this sort of words might include "–null, +r"; "–e, +ed"; "e–. +ing'" "–pe, +ping"; "–null, +s"; "–e, +es"; and "–e, +er". In general, the computer may limit the number of spelling rules by limiting the number of rules that may be used to convert from the active word to a particular backup word, or the number of letters that may be removed from the active word in making the conversion. Thus, in the example provided above, only two rules per word and two removed letters per rule are permitted. This eliminates potential rules, such as "–pe, +ped" and "–ipe, +iping".

After storing the spelling rules for an active word (step 2025), or determining that there are no similar sounding words for the active word (step 2020), the computer determines if there are more active words to process (step 2030). If so, the computer advances to the next word in the active vocabulary by incrementing j (step 2035), retrieves that active word (step 2010), and processes the word (steps 2015–2025).

If there are no more active words, the computer outputs all stored spelling rules that meet a predefined criterion (step 2040). The criterion may be based on a frequency of occurrence. For example, the spelling rule "–pp, +ing" may occur so infrequently that it would be dropped, while the spelling rule "–e, +ed" would occur more often and would be kept.

The procedure 1900 is described above with respect to suffixes. However, the procedure would be changed little when finding prefixes. For example, for prefixes, the backup dictionary would be searched for words that end (rather than begin) similarly to the chosen active word.

For some languages, some aspects of pronunciation or spelling may need to be ignored during the procedure 1900. For example, in German, stress in pronunciation may need to be ignored and in French, vowel quality may need to be ignored. Case may be ignored for all languages.

Determine Roots (Step 1805)

Figure 21:
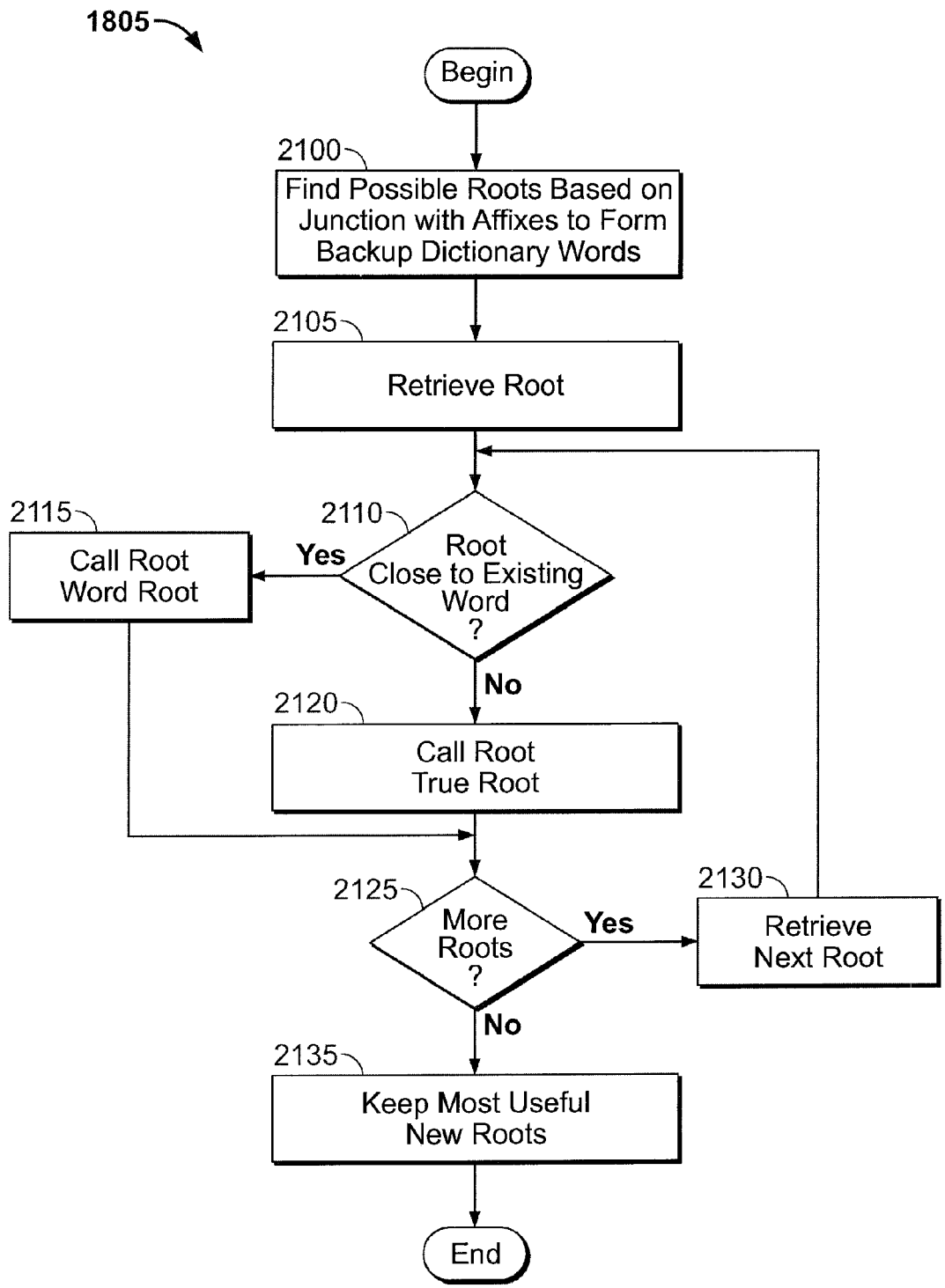
FIG. 21 is a flow chart of a procedure for estimating and tagging roots as part of the procedure of FIG. 18.
Figure 22:
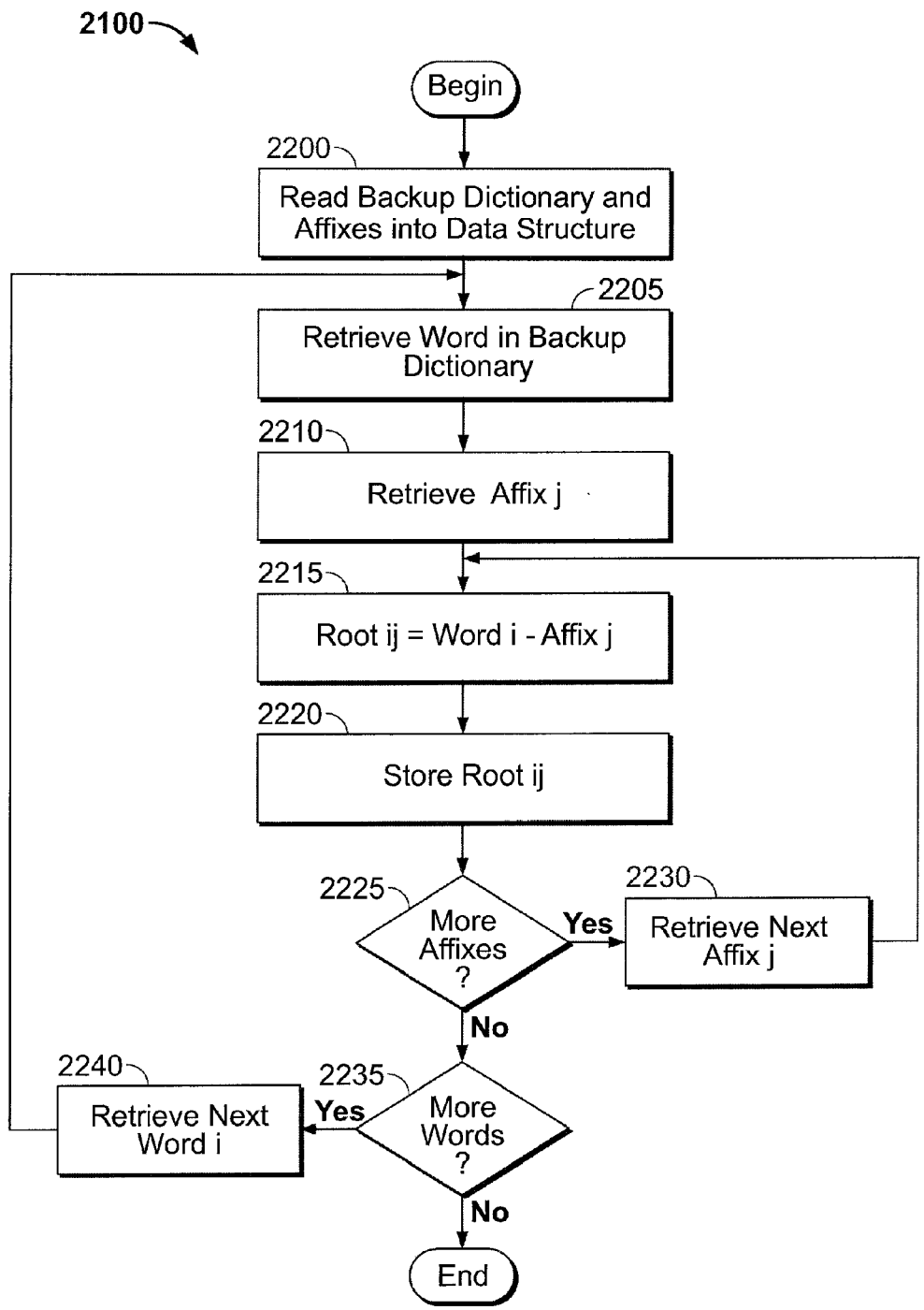
FIG. 22 is a flow chart of a procedure for forming estimated roots as part of the procedure of FIG. 21.

Referring to FIGS. 18, 21, and 22, after postulating the affixes (step 1800), the computer determines the word roots and true roots according to a procedure 1805. Initially, the computer finds all possible roots that can precede suffixes or follow prefixes to form words of the backup dictionary 245 (step 2100). This step may ignore more complicated spelling rules, and may only include rules in which the affix is added to the root.

For each root that is retrieved (step 2105), the computer determines if the root is "sufficiently close" to an existing word, where "sufficiently close" might be defined to be that all of the letters of the root and the existing word, except the last few or the first few, are identical (step 2110). If the root is sufficiently close to an existing word, then the computer tags that root as a word root (step 2115). If, on the other hand, the root is not sufficiently close to an existing word, then the computer tags that root as a true root (step 2120). Once the roots are tagged, the computer determines if there are more roots to retrieve (step 2125). If so, then the computer retrieves the next root (step 2130) and repeats steps 2110–2125. If there are no more roots to retrieve, the computer identifies and keeps the most useful new roots (step 2135). The most useful new roots may be identified based on the frequency of occurrence of the roots in words of the backup dictionary or any other appropriate criterion.

Find Possible Roots (Step 2100)

Referring to FIG. 22, the computer finds all possible roots that can precede suffixes or follow prefixes to form words according to the procedure 2100. Initially, the computer reads all words in the backup dictionary and all affixes into a searchable data structure (step 2200). A first word is retrieved from the backup dictionary (step 2205) and a first affix is retrieved from the set of affixes in the data structure based on similar spelling combinations in the retrieved word (step 2210). For example, if the retrieved backup dictionary word is "according", then a first affix that may be selected is "+ing" because this spelling combination occurs at the end of the word.

Next, the computer determines a possible root by subtracting the retrieved suffix (or prefix) from the end (or beginning) of the retrieved word (step 2215). The computer then stores the possible root for later processing (step 2220). Using the above, the retrieved suffix "+ing" is subtracted from the retrieved backup word "according" to form the possible root "accord".

After the root is stored, the computer determines if there are any other affixes that match (in spelling) any end or beginning of the retrieved backup word (step 2225). If there are more affixes, the computer retrieves the next affix (step 2230) and forms a possible root based on this affix (step 2215). If there are no more affixes associated with the retrieved backup word, the computer determines if there are anymore retrievable words in the backup dictionary (step 2235). If so, the computer retrieves the next backup word (step 2240) and repeats steps 2205–2235.

Postulate Word Fragments For Unsplit Words (Step 1710)

Figure 23:
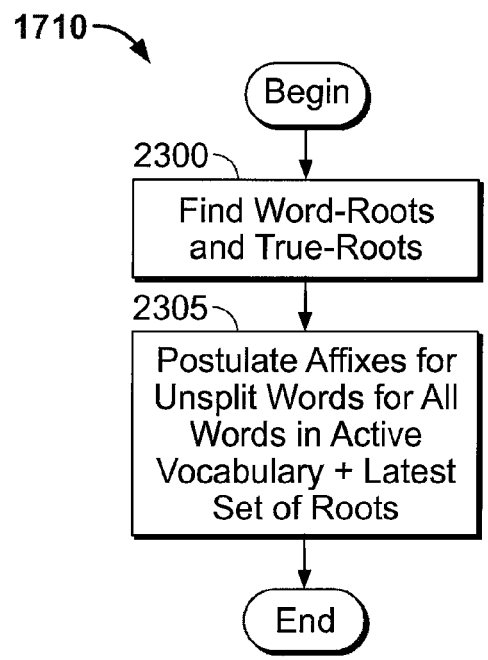
FIG. 23 is a flow chart of a procedure for estimating word fragments as part of the procedure of FIG. 17.

Referring to FIGS. 17 and 23, after splitting the words in the backup dictionary (step 1705), the computer postulates word fragments for unsplit words in the backup dictionary according to a procedure 1710. The computer initially finds word roots and true roots for unsplit words in the backup dictionary 245 (step 2300). This is similar to the original procedure for identifying roots (step 1805) and can be understood with reference to FIGS. 21 and 22. The only difference between the procedures is that is that the computer now only checks unsplit words in the backup dictionary 245 whereas the computer previously checked all words in the backup dictionary 245.

Once the word roots and true roots are determined for the unsplit words, the computer postulates the prefixes and suffixes that may be of use for splitting the unsplit words in the backup dictionary 245 (step 2305). This procedure is similar to the procedure 1800 and can be understood with reference to FIG. 19, with the difference being that the computer now supplements the active vocabulary with the roots found for the unsplit words (at step 2300).

Split Unsplit Words (Step 1715)

Figure 24:
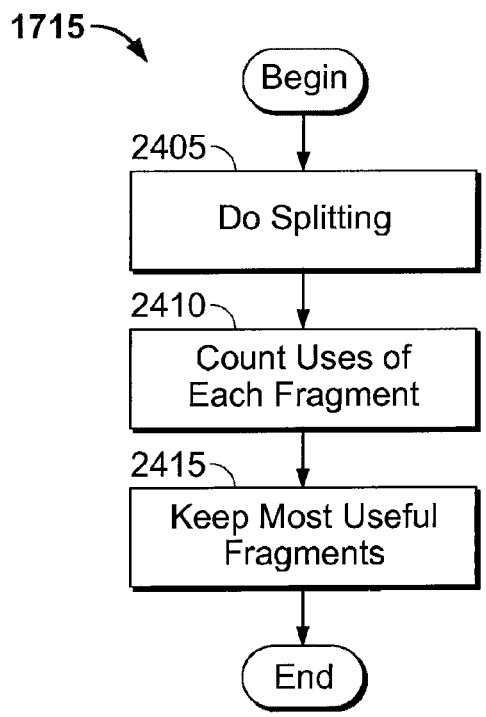
FIG. 24 is a flow chart of a procedure for splitting words into word fragments and keeping useful word fragments as part of the procedure of FIG. 17.

Referring to FIGS. 17 and 24, after the computer postulates the word fragments for unsplit words (step 1710), the computer splits unsplit words in the backup dictionary according to a procedure 1715. Initially, the computer splits all of the words into component word fragments (step 2405), as described below with reference to FIG. 25. The computer then counts the uses of each word fragment 1315 (step 2410). Finally, the computer retains the most useful word fragments (step 2415). This determination of usefulness may be based strictly on the number of uses of each word fragment, the relative frequency of the words in which they are used, or some other appropriate criterion.

Figure 25:
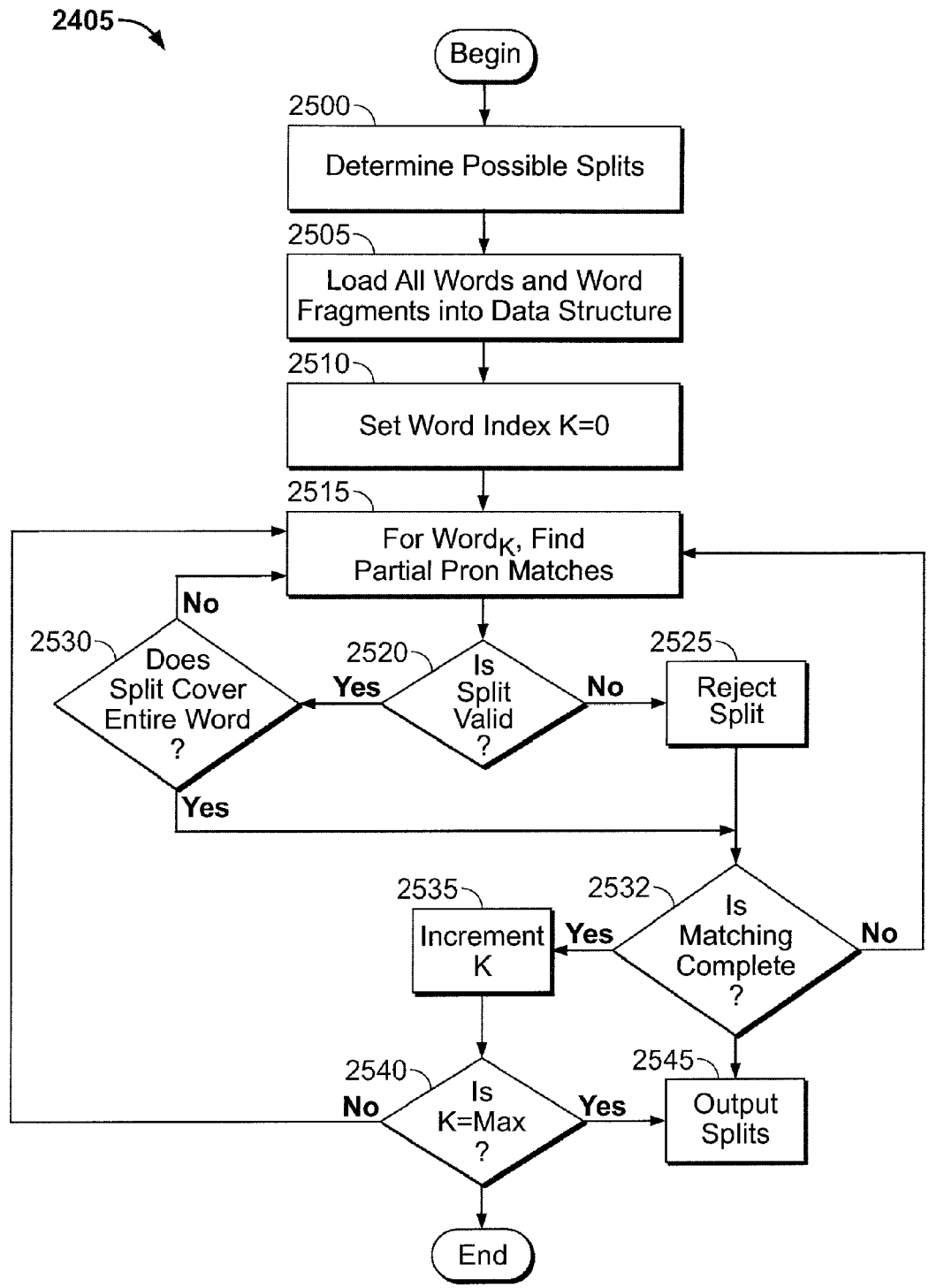
FIG. 25 is a flow chart of a procedure for splitting words as part of the procedure of FIG. 24.
Figure 26:
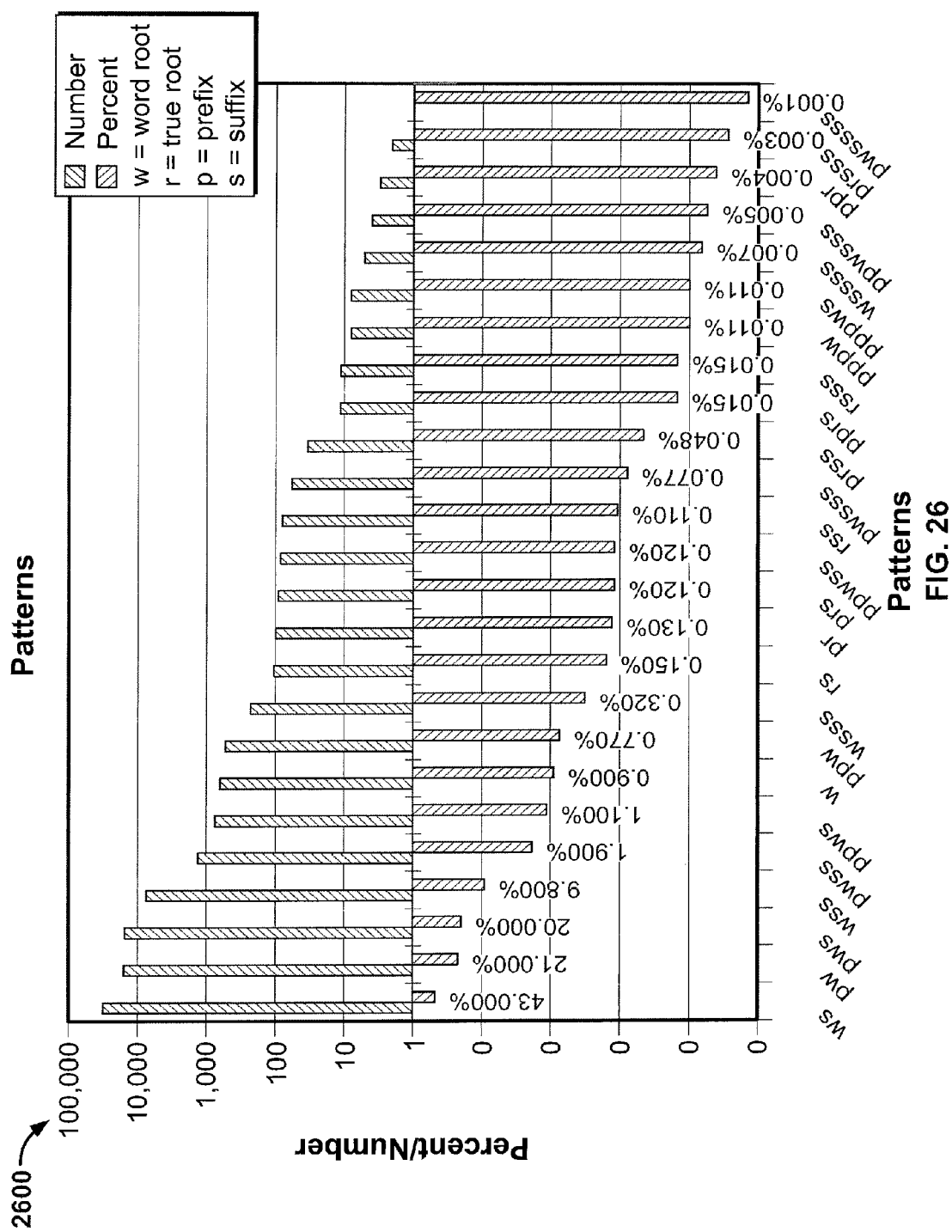
FIG. 26 is a chart of typical word fragment patterns found in splittable words.
Figure 27:
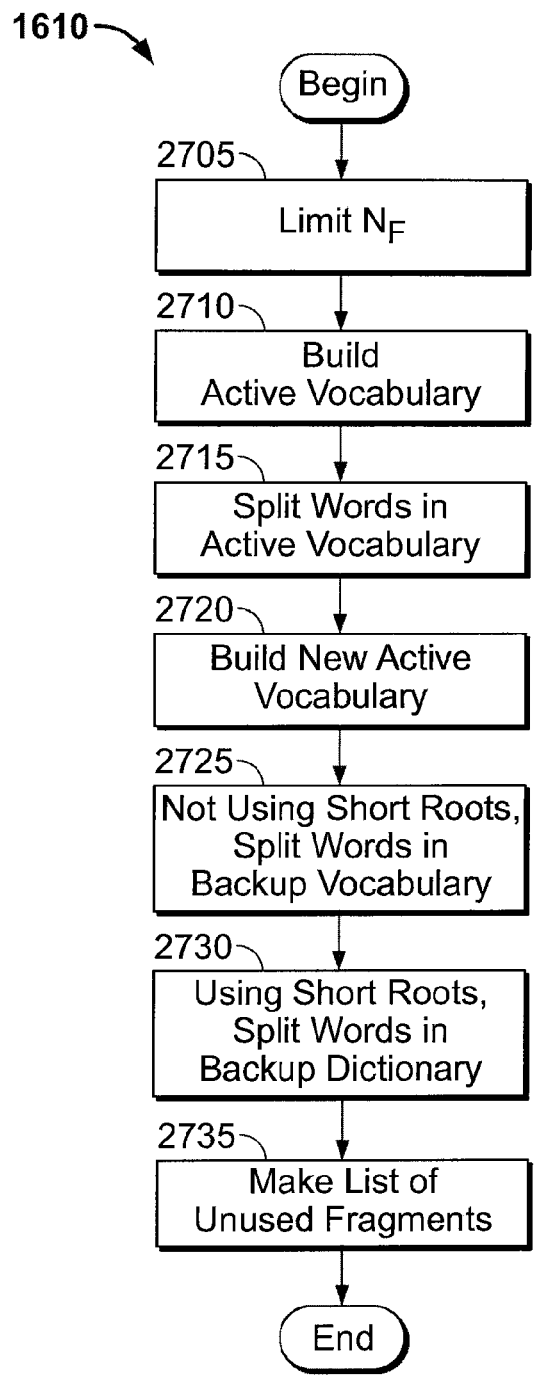
FIG. 27 is a flow chart of a procedure for generating a new active vocabulary and a new backup dictionary as part of the procedure of FIG. 16.

Referring also to FIG. 25, the computer splits words by initially determining all possible splits for each word (step 2500). Possible splits are considered for all word fragments, including word roots (w), true roots (t) and affixes (p or s). For example, possible splits may include such combinations as: ws, rs, pw, pr, or ppw. Some common combinations or patterns and the frequency with which they occur in a vocabulary for U.S. English are shown in the graph 2600 of FIG. 26. Relative numbers and percentages of these patterns are graphed for each possible pattern. Some splits of words are highly unlikely, such as the pwssss pattern, which occurs only 0.001% of the time. Also, some patterns may be disallowed, such as a ps pattern, which is not shown in FIG. 26.

After determining possible splits, the computer loads all words from the active vocabulary 230 and all word fragments 1315 into a data structure, such as a Patricia Tree (step 2505). Then, to split each word in the backup dictionary 245, the computer sets an initial word index k to zero (step 2510). The computer then begins an iterative loop in which the computer finds a word or word fragment that matches the beginning of the backup dictionary word indexed by k (step 2515). This step may be repeated several times to find an arrangement of words or word fragments that completely match the kth word. This arrangement is referred to as a split.

Each time that the computer adds a word or word fragment to the split, including when the computer adds the first word or word fragment to the split, the computer determines whether the split is valid (step 2520). That is, the computer determines whether the one or more words or word fragments that make up the split are a valid arrangement of words or word fragments. For example, an arrangement that starts with a suffix might be invalid, as might an arrangement that includes a prefix followed immediately by a suffix or a root followed by a prefix. If the computer determines that the split is not valid, then the computer rejects the split (step 2525).

If the computer determines that the split is valid, then the computer determines if the split covers the entire word (step 2530). If the split does not cover the entire word, the computer tries to add to the split a word or word fragment that matches the next portion of the kth word (step 2515).

Upon determining that the split does cover the entire word (step 2530), or upon rejecting a split (step 2525), the computer determines if all possible splits have been examined for the kth word (step 2532). If there are other possible splits, then the computer finds a further pronunciation match for the beginning of the kth word (2515) and repeats the process.

If there are no other possible splits, then the computer increments the word index k to select the next word in the backup dictionary (step 2535). The computer then checks to see whether k equals a maximum value such that all unsplit words have been split from the backup dictionary 245 (step 2540). If there are still unsplit words that can be split, then the computer finds partial pronunciation matches for the kth word (step 2515). If there are no unsplit words that can be split, then the computer outputs a set of splits (step 2545). The set of splits may be all of the splits generated or may be a best-scoring subset of the set of splits.

Generate New Complete Dictation Vocabulary (Step 1610)

Referring again to FIG. 16A, after identifying the word fragments (step 1605), the computer generates the new active vocabulary and the new backup dictionary (step 1610). The new active vocabulary and the new backup dictionary are generated according to a procedure 1610 illustrated in FIG. 27.

Initially, depending on the language that is modelled, the computer may limit a total number of word fragments, $N_F$, that may be added to the active vocabulary (step 2705). Typically, $N_F$ is around a few thousand (4000) and therefore is much smaller than the size of the active dictionary, which is around 40,000. Next, the computer creates a temporary active vocabulary that includes the original active vocabulary, the $N_F$ word fragments, and a set of word roots (around a few thousand) that are in the backup dictionary (step 2710). The computer then splits the words in this temporary active vocabulary and identifies as many of the splittable words as are necessary to reduce the size of the active vocabulary to a desired level (step 2715). Thus, if the temporary active vocabulary has 47,000 elements, then 7,000 splittable words may be identified to reduce the temporary active vocabulary to 40,000 elements.

Once the computer identifies these splittable words, it trims the temporary active vocabulary by keeping word fragments and moving a set of splittable words into the backup dictionary 245 (step 2720). For example, if "cook", "cooks", "cooker", "cookie", "book", "books", "booker", "bookie", "+s", "+er", and "+ie" were in the temporary active vocabulary, then the splittable words "cooks", "cooker", "cookie", "books", "booker", and "bookie" could be moved into the backup dictionary 245 and the words and word fragments "cook", "book", "+s", "+er", and "+ie" would be retained in the active vocabulary. The set of words and word fragments remaining after the size of the temporary active vocabulary is reduced to the desired level is designated as the new active vocabulary.

After the active vocabulary is generated (step 2720), the computer splits words in the backup dictionary 245 without using short roots (step 2725). Then the computer splits unsplit words in the backup dictionary 245 using short roots (step 2730). During these steps, for each splittable word that has more than a single pronunciation, the computer may choose a single pronunciation to split. Once each word has a single pronunciation and all splittable words in the backup dictionary are split, the computer makes a list of word fragments 1315 that have not been used in the splitting (step 2735). This list may be used when the language model is created (step 1615).

Create Language Model (Step 1615)

Figure 28A:
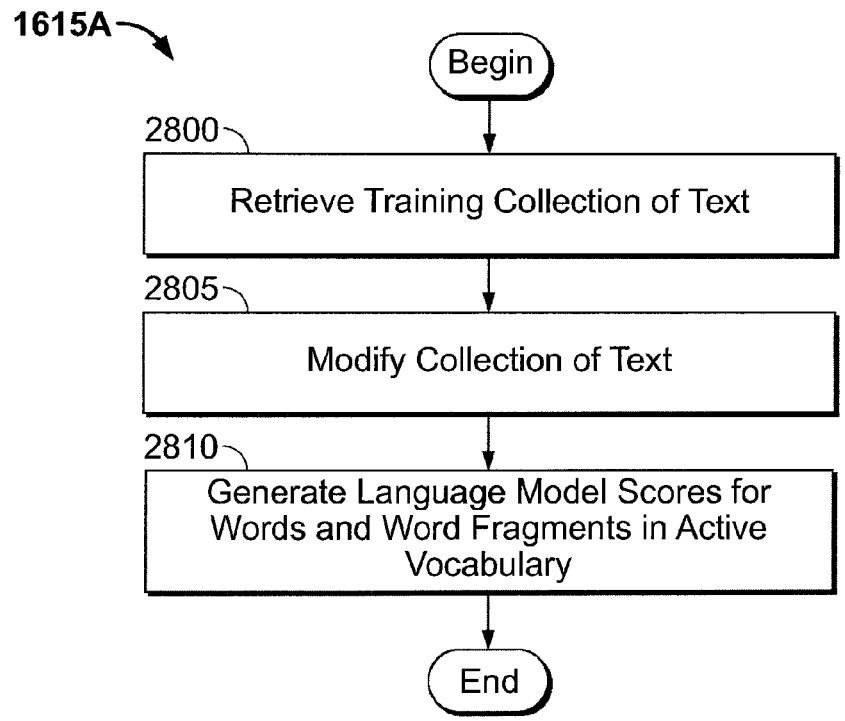
FIGS. 28A and 28B are flow charts of procedures for creating language models as part of the procedure of FIG. 16.

Referring to FIG. 28A, in one implementation, the computer creates the language model associated with the active vocabulary according to a procedure 1615A. Initially, the computer retrieves a training set of data, such as a collection of text (step 2800). The training collection of text includes words from the backup dictionary and words from the active vocabulary. The computer modifies the collection of text by replacing any splittable backup dictionary words with their corresponding words and word fragments (step 2805). The computer then generates language model scores for all elements of the active vocabulary—including words and word fragments—using the modified collection of text (step 2810). For example, to produce a unigram language model, the computer counts the number of occurrences of each word or word fragment in the training collection of text and generates the language model scores based on these counts. Similarly, to produce a bigram language model, the computer counts the number of occurrences of each consecutive pair of words or word fragments in the training collection of text and generates the language model scores based on these counts.

Figure 28B:
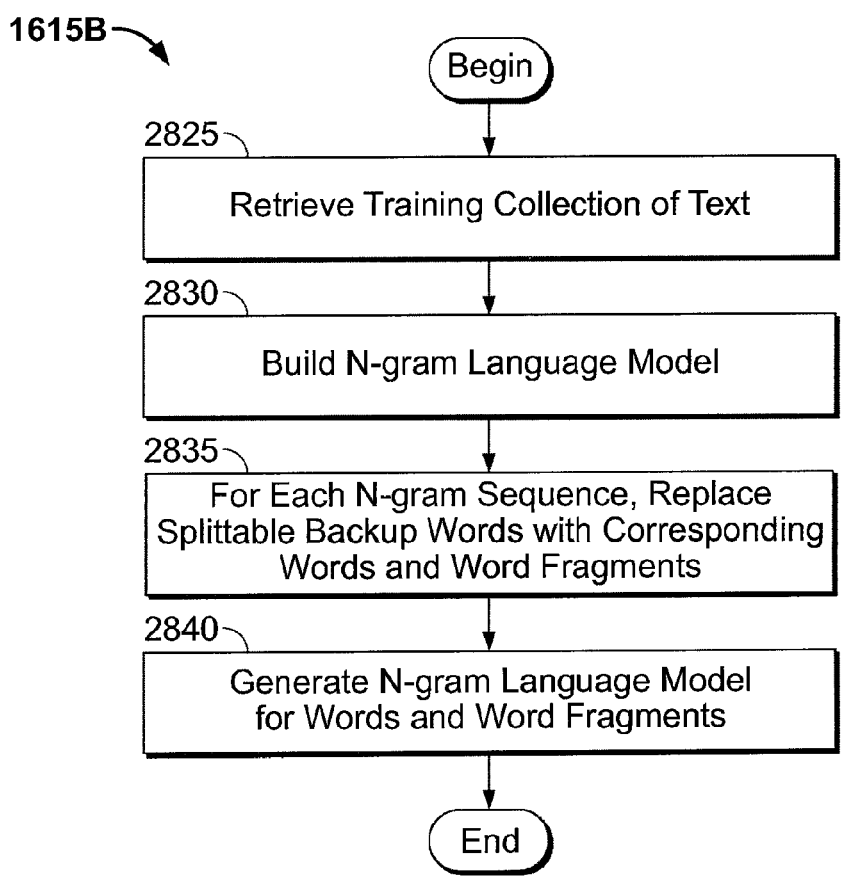

Referring to FIG. 28B, in another implementation, the computer creates the language model associated with the active vocabulary according to a procedure 1615B. As in the procedure 1615A, the computer first retrieves the training collection of text (step 2825). The computer then builds an N-gram language model, such as a unigram, bigram, or trigram model, using the retrieved training collection of text (step 2830). The computer builds the N-gram language model based on how often each sequence of "N" words, referred to as an N-gram sequence, appears in the training collection of text.

Next, for each N-gram sequence that includes one or more splittable backup words, the computer replaces any splittable backup words with their corresponding words and word fragments (step 2835). This creates new N-gram sequences. For example, when the bigram "urgently go" is split into the sequence "urgent+ly go", two new bigrams ("urgent+ly" and "+ly go") are created. As discussed in more detail below, the computer generates language model scores for the new N-grams based on the language model scores for the N-grams from which they were generated (step 2840). When splitting an N-gram results in an N-gram that exists already, the language model score for the existing N-gram is modified based on the language model score for the N-gram that was split. In general, the language model score for an N-gram is related to the probability that the N-gram will occur.

Figure 28C:
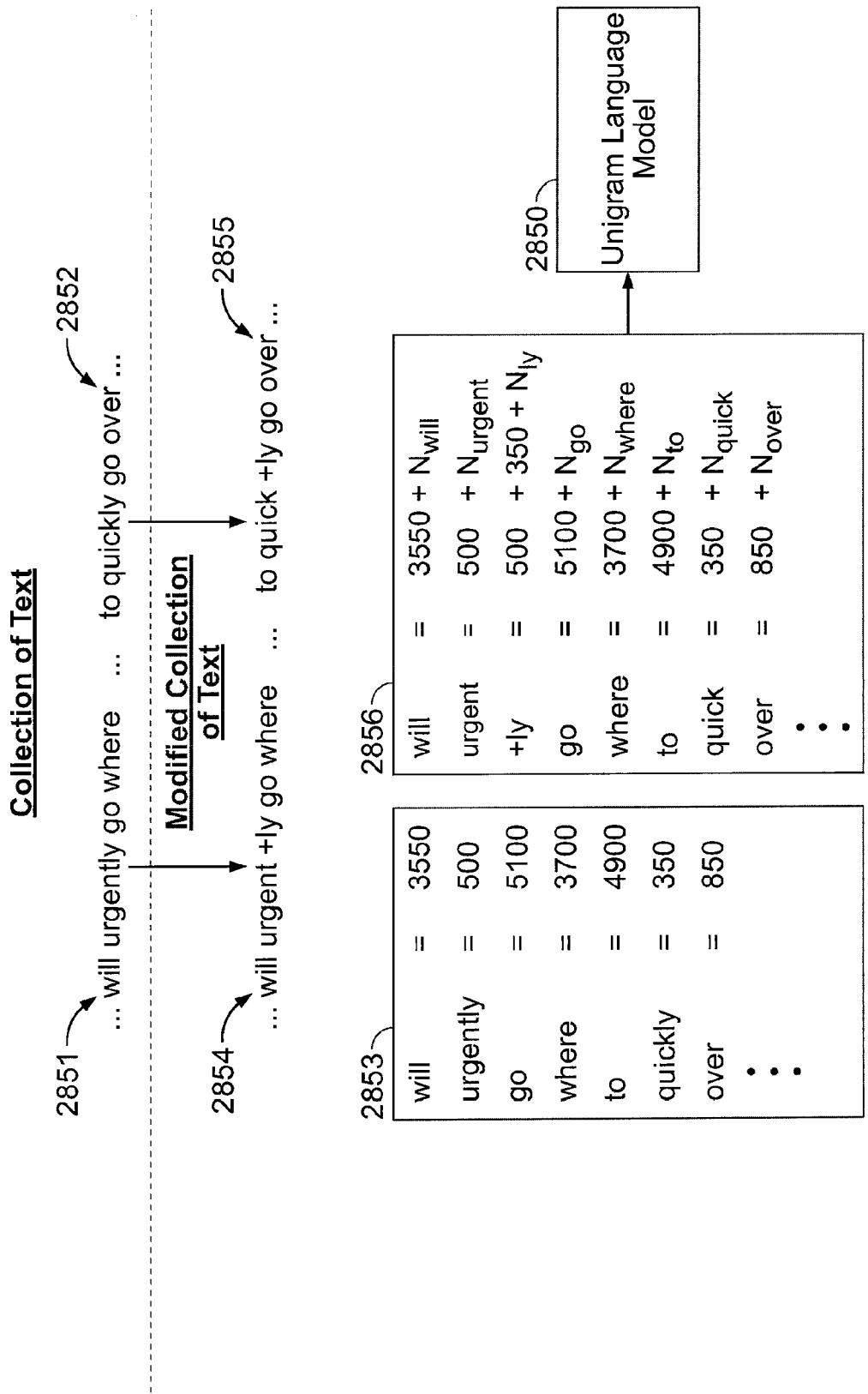

FIG. 28C shows an example of creating a unigram language model 2850. Two sample text segments that occur in the training collection of text are shown. A first segment 2851 is "will urgently go where" and a second segment 2852 is "to quickly go over". The count 2853 of the number of times that each unigram appears in the training text is also shown. In the sample text segments, two words may be split: "urgently" can be split into the word "urgent" and the suffix "+ly", and "quickly" can be split into the word "quick" and the suffix "+ly" to form split text segments 2854 and 2855.

Splitting of the sample text segments may result in a new count 2856 for each word or word fragment. For words, the count 2856 will reflect the previous count for the word plus the count of any additional instances of the word resulting from splitting another word. For example, the count 2856 for the word "will" equals the count 2853 for the word "will" (3550) plus $N_{will}$, where $N_{will}$ represents the total number of times that the word "will" occurs in a splittable word. For example, if the only splittable words in which the word "will" occurs are "willing", which occurs 500 times, and "willful", which occurs 250 times, then $N_{will}$ would equal 750.

For word fragments, the count 2856 will reflect the combined counts of any splittable words that include the word fragment. For example, the count 2856 for the suffix "+ly" equals the count 2853 for "urgently" (500) plus the count 2853 for "quickly" (350) plus $N_{ly}$, where $N_{ly}$ represents the number of times that the suffix "+ly" occurs in other splittable words. For example, if the only other splittable word in which the suffix "+ly" occurs is "boldly", which occurs 200 times, then Nly would equal 200.

Figure 28D:
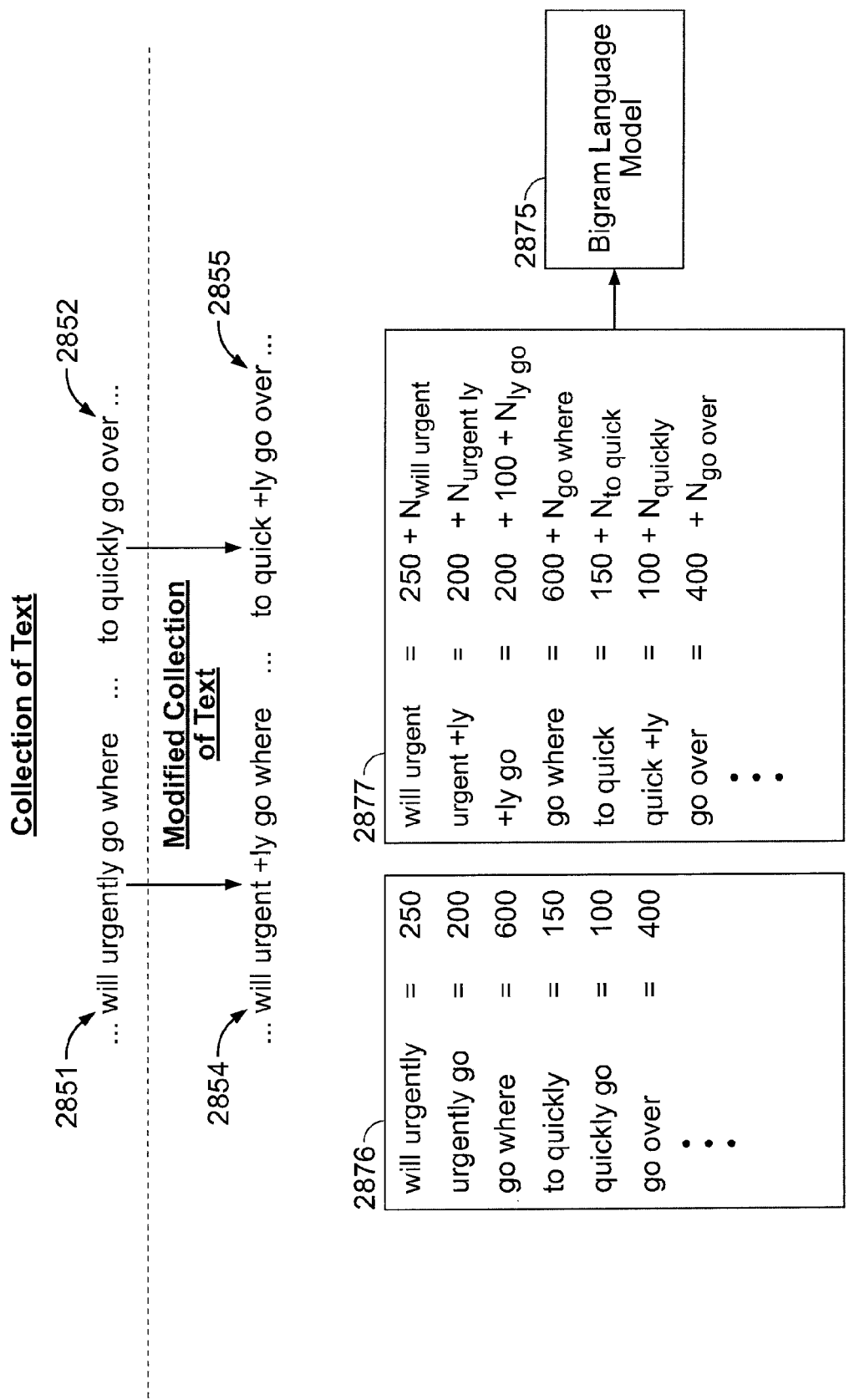

FIG. 28D shows an example of creating a bigram language model 2875 using the training collection of text that includes segments 2851 ("will urgently go where") and 2852 ("to quickly go over"). The count 2876 of the number of times that each bigram appears in the training text is also shown. As noted above, "urgently" can be split into the word "urgent" and the suffix "+ly", and "quickly" can be split into the word "quick" and the suffix "+ly" to form split text segments 2854 and 2855.

Splitting of the sample text segments may result in a new count 2877 for existing bigrams, as well as new counts for new bigrams. For existing bigrams, the count 2877 will reflect the previous count for the original bigram plus the count of any additional instances of the bigram resulting from splitting a word. For example, the count 2877 for the word "go" followed by the word "where" equals the count 2876 for the word "go" followed by the word "where" (600) plus $N_{gowhere}$, where $N_{gowhere}$ is computed from the counts of bigrams that produce the word "go" followed by the word "where" as a result of the splitting. For example, if the splittable bigram "forego where", which occurs 25 times, splits into "fore+go where", and is the only splittable bigram that produces the word "go" followed by the word "where", then $N_{gowhere}$ would equal 25.

For new bigrams, the count 2877 will reflect the combined counts of any splittable bigrams that include the new bigram. For example, the count 2877 for the suffix "+ly" followed by the word "go" equals the count 2876 for "urgently go" (200) plus the count 2876 for "quickly go" (100) plus $N_{lygo}$, where $N_{lygo}$ is computed from the counts of bigrams that produce the suffix "+ly" followed by the word "go" as a result of the splitting.

The method for computing the contribution of counts arising from the splitting of original bigrams to the counts for modified bigrams is as follows. The count for an original bigram is added to the count for a modified bigram if the modified bigram appears in the sequence of words and word fragments generated in the splitting of the original bigram, and the modified bigram contains all or part of the first word in the original bigram.

For example, if the original bigram "urgently go" has a count of 200, and it splits into the sequence "urgent+ly go", then this original bigram contributes 200 to the counts of the modified bigrams "urgent+ly" and "+ly go", because both of these modified bigrams appear in the sequence generated by splitting "urgently go", and both contain a piece of the original first word ("urgently").

As another example, if the original bigram "to quickly" has a count of 150, and it splits into the sequence "to quick+ly", then this original bigram contributes 150 to the count of the modified bigram "to quick", because "to quick" appears in the sequence generated by splitting "to quickly" and contains the original first word ("to"). However, no counts are contributed to the modified bigram "quick+ly", because even though it appears in the sequence generated by splitting "to quickly", it does not contain any piece of the original first word. This method of computing the contribution of original bigram counts to the counts of modified bigrams avoids excessive counting of modified bigrams.

The devised method of counting bigrams may be generalized to the counting of modified n-grams from original n-grams as follows. The count for an original n-gram is added to the count for a modified n-gram if the modified n-gram appears in the sequence of words and word fragments generated in the splitting of the original n-gram, and the modified n-gram contains all or part of the first word in the original n-gram.

Shown in FIG. 28E is a complete, but rather tiny, sample training collection of text that consists of 87 words. Generally, however, the training collection of text contains orders of magnitude more words than the sample training collection of text shown in FIG. 28E contains.

In this training collection of text, the unigram word sequence "whenever" occurs four times, the unigram word sequence "involuntarily" occurs once, the unigram word sequence "knocking" occurs once. FIG. 28F shows new counts 2880 for unigram word and word fragment sequences in the modified collection of text in FIG. 28E. The unigram word fragment "+ly" appears four times in the modified collection because it derived from the four splittable backup dictionary words that each appeared once in the training collection of text—namely, "drizzly", "especially", "deliberately", and "methodically". The word "my" appears four times in the modified collection because it derived from the splittable backup dictionary word "myself" and from the unsplittable word "my" that each appeared twice in the training collection of text.

Using these new counts, new N-gram probabilities are calculated. The language model probabilities for the active vocabulary elements are used to form a language model for the complete dictation vocabulary, including the word fragments from the active vocabulary.

Perform Speech Recognition (Step 1655)

Referring again to FIG. 16B, the speech recognition system 100 performs speech recognition using the updated language model and the new active vocabulary (step 1655). During speech recognition, word fragments are treated like normal words, and the speech recognizer 215 operates according to the procedure 1200 illustrated in FIG. 12 and discussed above. As noted above, when the recognizer 215 determines that there are no more speech frames to process, it provides the most likely hypotheses for the utterance to the control/interface module 220 as a list of recognition candidates (step 1285). A particular recognition candidate may include word fragments in addition to words from the active vocabulary.

Perform Post-Recognition Processing (Step 1660)

Figure 29:
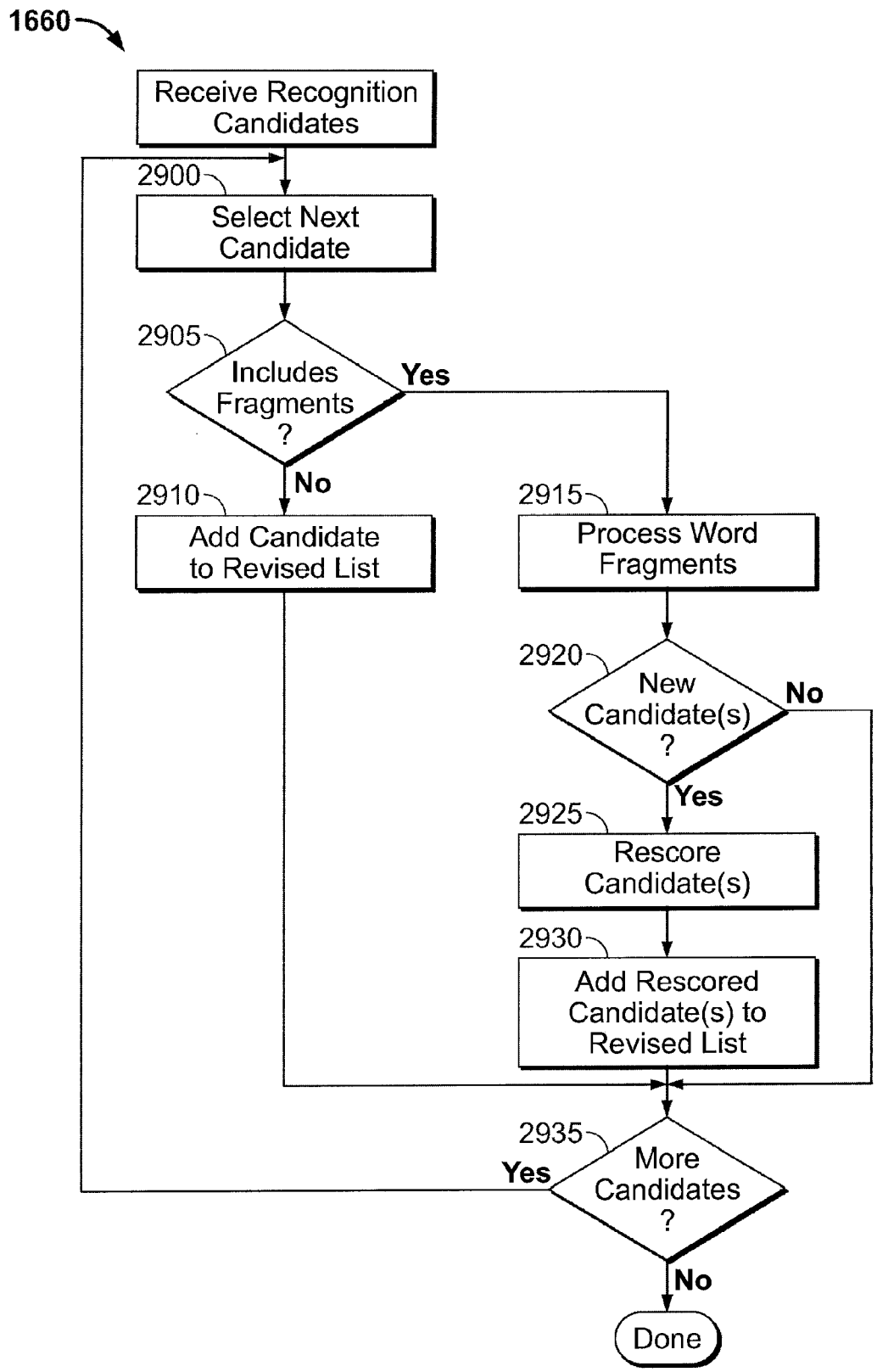
FIG. 29 is a flow chart of a procedure for revising a recognition candidate list as part of the procedure of FIG. 16.

Once the speech recognizer 215 outputs the list of recognition candidates, the speech recognition system 100 performs the post-recognition procedure 1660 illustrated in FIG. 29. In general, the system 100 substitutes words from the backup dictionary or accepted by some set of rules for word fragments in a recognition candidate and rescores the recognition candidate in view of the substitution. Rescored candidates are placed on a revised candidate list. Candidates that do not include word fragments are transferred directly to the revised candidate list. Thus, the revised list may include both recognition candidates from the original list and rescored recognition candidates.

To begin the process, the system 100 retrieves a recognition candidate from the original list of candidates (step 2900). If there are no word fragments in the recognition candidate (step 2905), the system 100 transfers the original recognition candidate to the revised list of candidates (step 2910).

If there are word fragments in the recognition candidate (step 2905), then the system 100 processes the word fragments (step 2915). If any new recognition candidates were formed during the word fragment processing (step 2920), the system rescores those recognition candidates (step 2925). The system then adds any rescored candidates to the revised list (step 2930). After the system adds a rescored or original candidate to the revised list, or determines that no new candidates were formed in the word fragment processing, the system checks for more recognition candidates in the original list (step 2935). If there are more recognition candidates in the original list, then the system selects the next recognition candidate from the list (step 2900) and processes that candidate (steps 2905–2930).

Process Word Fragments (Step 2915)

Figure 30:
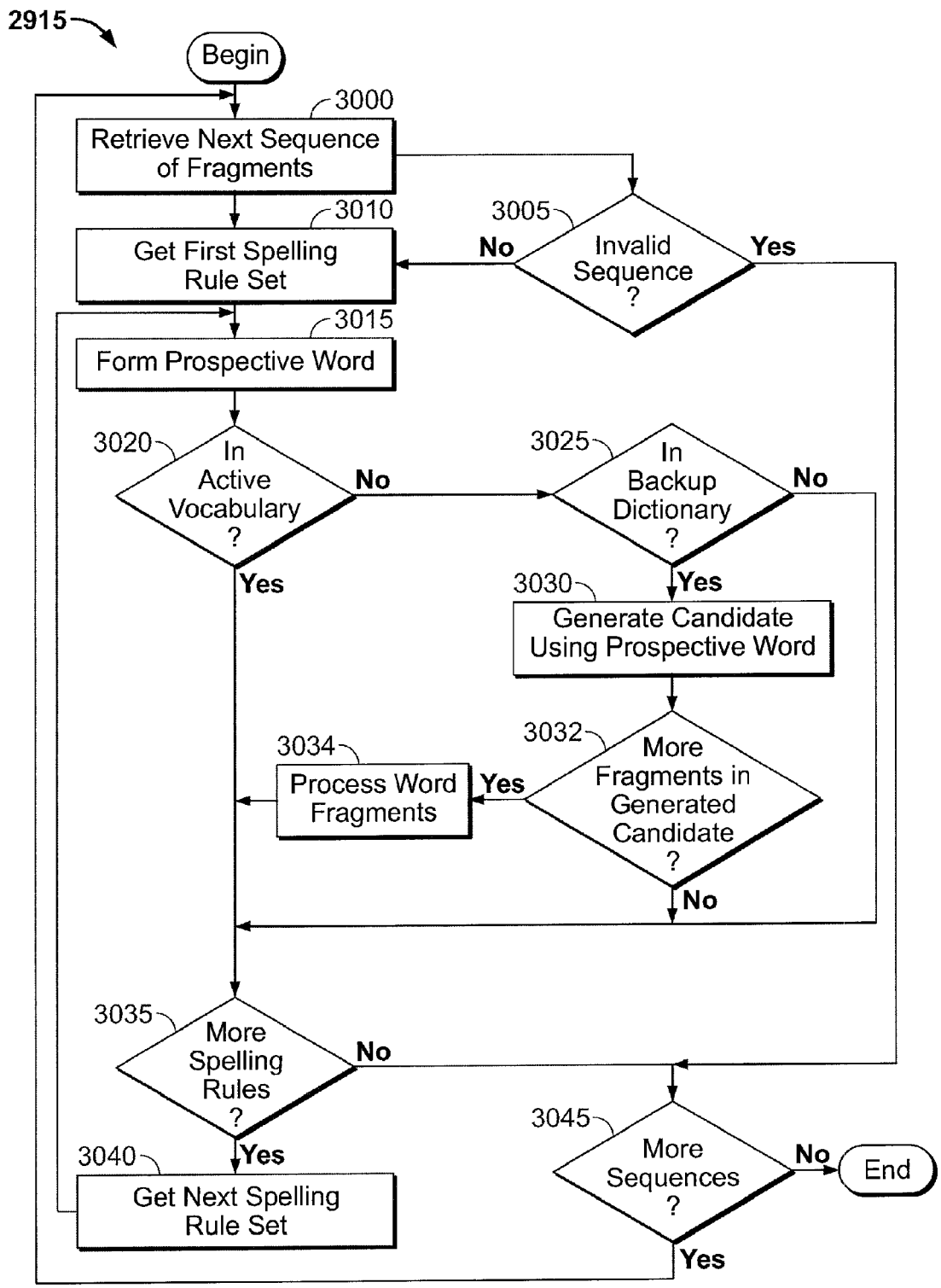
FIG. 30 is a flow chart of a procedure for generating new recognition candidates as part of the procedure of FIG. 29.

Referring also to FIG. 30, word fragments are processed according to the procedure 2915. Initially, the system retrieves a first sequence of word fragments or word fragments and words from the recognition candidate (step 3000). Using an earlier example, suppose that "accord+ing+ly" is a recognition candidate. Then a sequence of words and/or word fragments may be "accord+ing". Likewise, other sequences of words and/or word fragments for this recognition candidate may be "+ing+ly", or "accord+ing+ly".

Next, the system 100 determines whether the sequence is an invalid sequence (step 3005). The system 100 checks for an invalid sequence by looking for blatantly incorrect adjacent combinations, such as suffix/suffix, root/prefix, suffix/root, suffix/prefix, or prefix/suffix. Some combinations, such as suffix/prefix may not be valid for the particular sequence, but may be valid when separated and used in other sequences. On the other hand, some combinations, such as prefix/suffix are never valid whether taken alone or separated and included in other sequences. When such an inherently invalid sequence is encountered, the system may abort processing of the recognition candidate and proceed to the next candidate. Other conditions that may cause processing of a recognition to be aborted are a candidate that begins with a suffix or ends with a prefix.

Once the system 100 determines that a sequence is valid, the system 100 then retrieves the spelling rules associated with each affix in the sequence and forms an initial set of spelling rules that includes one spelling rule for each affix in the sequence (step 3010). For example, if the sequence is "accord+ing", then each possible spelling rule set includes a single spelling rule corresponding to the suffix "+ing". Likewise, if the sequence is "accord+ing+ly", then each possible spelling rule set includes a spelling rule corresponding to the suffix "+ing" and a spelling rule corresponding to the suffix "+ly".

The system 100 uses the spelling rule set to form a prospective word (step 3015). For example, if the sequence is "accord+ing", and the spelling rule "–null, +ling" is applied, then the system 100 forms the prospective word "accordling". Likewise, if the spelling rule "–null, +ing" is applied, then the system 100 forms the prospective word "according".

If the prospective word is in the active vocabulary (step 3020), then the recognizer should have found the word upon initial recognition, which indicates that the combination of word fragments and/or words to form the word may be an error. Accordingly, the system may not further process the prospective word.

If the prospective word is not found in the active vocabulary (step 3020), but is found in the backup dictionary or accepted by a set of rules (step 3025), then the system generates a candidate using the prospective word (step 3030). If the generated candidate includes additional word fragments (step 3032), the system processes the generated candidate using a recursive procedure comparable to the procedure 2915 (step 3034).

After generating the candidate using the prospective word, after determining that the prospective word is not in the backup dictionary, or after determining that the prospective word is in the active vocabulary, and there are more spelling rules associated with the affixes in the sequence (step 3035), then the system gets the next set of spelling rules (step 3040) and, using the next spelling rule set, forms a prospective word (step 3015).

If there are no more spelling rules associated with the affixes in the retrieved sequence (step 3035), or if the retrieved sequence is invalid (step 3005), and there are other possible sequences in the recognition candidate (step 3045), then the system retrieves the next sequence (step 3000) and proceeds as discussed above.

Other embodiments are within the scope of the following claims. For example, the techniques described here are not limited to any particular hardware or software configuration; they may find applicability in any computing or processing environment that may be used for speech recognition. The techniques may be implemented in hardware or software, or a combination of the two. Preferably, the techniques are implemented in computer programs executing on programmable computers that each include a processor, a storage medium readable by the processor (including volatile and non-volatile memory and/or storage elements), at least one input device, and at least one output device. Program code is applied to data entered using the input device to perform the functions described and to generate output information. The output information is applied to one or more output devices.

Each program is preferably implemented in a high level procedural or object oriented programming language to communicate with a computer system. However, the programs can be implemented in assembly or machine language, if desired. In any case, the language may be a compiled or interpreted language.

Each such computer program is preferably stored on a storage medium or device (for example, CD-ROM, hard disk or magnetic diskette) that is readable by a general or special purpose programmable computer for configuring and operating the computer when the storage medium or device is read by the computer to perform the procedures described in this document. The system may also be considered to be implemented as a computer-readable storage medium, configured with a computer program, where the storage medium so configured causes a computer to operate in a specific and predefined manner.

Generation and use of word fragments (procedure 1600) may include updating acoustic models in addition to updating language models.

Hidden Markov models (HMMs) may be used to automatically split the pronunciation of all active words (or alternatively, all those words in the backup dictionary) into fragments or pieces, using, for example, a Baum-Welch training algorithm. This method may permit a complete bypass of the spelling rules if words are looked up in the dictation vocabulary using pronunciation rather than spelling. Because of this, pronunciations must be aligned with the spellings to determine the spelling rules.

When the lookups are based on spelling rules, then recognition speed may be slowed down for long strings of roots and affixes. For example, each affix has a number of spelling rules that are combined with spelling rules for other affixes to form a large number of spelling rule sets. Speech recognition speed may be increased by reducing the number of lookups during recognition and post-recognition processing.

One way of doing this is to perform lookups using pronunciation of word fragments rather than spelling rules. Since each affix has only one pronunciation, each set of word fragments will result in only one lookup per root pronunciation.

A second way would be for the computer running the speech recognition to keep a record of recent lookups (for example, in a hash table). Because most lookups are unsuccessful, it might be useful to keep only the unsuccessful lookups, rather than the successful lookups.

A third way may employ an existential dictionary that includes a hash table having entries that are either zero or one depending on whether a word has been used. One may hash the backup words once or several times into this structure. If a generated word is hashed into word fragments, and if any of the word fragments are not found in the existential dictionary, it is certain that the word is not in the backup dictionary. Existential dictionaries are usually used for applications such as spell-checkers in which there is a very small chance that a lookup will produce a false positive because it is important that the spell-checker not overlook a word which is spelled incorrectly. When the existential dictionary is used in the speech recognition application to reduce lookups, it does not matter if there are a substantial number of words which it incorrectly says may be in the backup dictionary because it is only important to reduce the number of lookups.

After the computer identifies the splittable words (step 2715), the computer may move extra words into the backup dictionary (step 2720). The size of the active dictionary may be reduced at step 2720. Alternatively, splittable words may be retained in the temporary active vocabulary, that is, the temporary active vocabulary may not be trimmed.

In another implementation, during generation of the complete dictation vocabulary (step 1610), the computer may split words in more than one way. For example, the word "unerring" can be split either "un+err+ing" or "unerr+ing", with each split representing a different pronunciation of the word.

In a further implementation, recognition candidates output by either the speech recognition or post-recognition processing may be represented as a "net" rather than a list, to avoid redundant processing.

In another implementation, during the splitting procedure 1715, the computer may apply different spelling rules to determine which types of splits are valid. For example, a valid split may include up to eight words or word fragments, including exactly one word root or true root. As another example, recognition speed may be increased by permitting a maximum of three words or word fragments in a split. Furthermore, depending on the language, certain combinations may be allowed or disallowed. For example, in the Germanic languages, the combination of a true root adjacent to a word root might be a valid combination.

During post-recognition processing (step 1660), the system 100 may skip the step of checking for the prospective word in the active vocabulary (step 3020). The system 100 may also (or alternatively) skip the step of checking for the prospective word in the backup dictionary (step 3025). Likewise, the prospective word may be accepted or rejected based on other rules or based on no rules.

Although a backup dictionary may be used to look up prospective words in the preferred embodiment, it is also possible to use a set of rules to determine what patterns of root and endings constitute a valid word. The set of rules may use part-of-speech constraints (in addition to other constraints described with respect to the preferred embodiment). For example, the prefix re+attaches to a verb, the prefix un+attaches to an adjective, and the prefix super+ attaches to a noun. Likewise, the suffix+er transforms a verb into a noun, the suffix+tion transforms a verb into a noun, the suffix+able transforms a verb into an adjective, and the suffix+ize transforms an adjective into a noun. Thus, "unrealizable"=un+real+ize+able (plus a spelling rule) is a valid prospective word, while "unrealtional", "reconfusion", and "superrealizable" would be disallowed.

Prospective words that are checked in the backup dictionary may be constrained based on a pronunciation of the prospective word. For example, if the recognized words and word fragments include+rob+followed by +ing, then two prospective words, namely "robing" and "robbing" are possible. If pronunciation is checked, in addition to spelling, then one of the words would be eliminated from rescoring.

Likewise, prospective words checked in the backup dictionary may be constrained based on matching a number of phonemes associated with the prospective word with words in the backup dictionary.

In another implementation, the constituent components or word fragments 1315 may include syllables. A syllable is a unit of spoken language consisting of a single uninterrupted sound formed by a vowel or diphthong alone, of a syllabic consonant alone, or of either with one or more consonants. Generally, a syllable includes a vowel and one or more consonants clustered around the vowel.

To generate the syllables, it is necessary to relax the restriction that word fragments are actually in the dictation vocabulary. The syllables may be generated either using rules for concatenation or by hand coding. Furthermore, syllables must be marked to distinguish them from words. The active vocabulary may include both words, syllable-words (that is, syllables that are words, such as "foot"), and true-syllables (that is, syllables that are not words, such as "tion".

During speech recognition, if a syllable is detected, then that syllable is combined with an adjacent syllable or word to form the prospective word. Then, the prospective word may be looked up in the backup dictionary. In one implementation, there may be about 10,000 syllables in the active vocabulary along with the words in the active vocabulary.

For example, the word "wrapper" may be represented as a combination of the syllable •wrap• and the syllable •er• or as a combination of the syllable •wra• and the syllable •per•. In this case, it is preferable to use the former syllable combination because the syllable •er• is included in many words. As another example, the word "relativistic" may be represented as a combination of the following syllables in sequence: •rel• •a• •tiv• •is• •tic•. Because syllables are defined to be an uninterrupted sound, they may be freely concatenated, that is, without using spelling rules. This is in contrast to word fragments such as affixes, that require spelling rules to be concatenated. For example, splitting the above example of "wrapper" into roots and affixes requires the spelling rules that combine the word root "wrap" with the suffix "+er", such as –p and +pper or –nil and +per.

The invention claimed is:

1. A method of expanding an effective active vocabulary of a speech recognition system, the method comprising:
   receiving an input user utterance
   using a speech recognizer to perform speech recognition on said user utterance to produce one or more recognition candidates, the speech recognition comprising comparing digital values representative of the user utterance to a set of acoustic models representative of an active vocabulary of the system, the set of acoustic models including models of words and models of word fragments,
   receiving the recognition candidates from the speech recognizer, and
   when a received recognition candidate includes a word fragment:
      determining whether the word fragment may be combined with one or more adjacent word fragments or words to form a proposed word included in a backup dictionary of the speech recognition system, wherein forming the proposed word includes using a spelling rule associated with the word fragment that causes the spelling of the proposed word to differ from a spelling that would result from merely concatenating the particular word fragment with the one or more adjacent word fragments or words;
      if the word fragment may be combined with one or more adjacent word fragments or words to form a proposed word included in a backup dictionary of the speech recognition system, modifying the recognition candidate to substitute the proposed word for the word fragment and the one or more adjacent word fragments or words used to form the proposed word; and
      if the word fragment may not be combined with one or more adjacent word fragments or words to form a proposed word included in a backup dictionary of the speech recognition system, discarding the recognition candidate.

2. The method of claim 1, wherein the expanded effective vocabulary comprises words from the backup dictionary that are formed from a combination of words and word fragments or word fragments and word fragments from an active vocabulary that includes words and word fragments, and words from the active vocabulary.

3. The method of claim 1, wherein word fragments comprise suffixes, prefixes, and roots that are not words.

4. The method of claim 3, wherein:
   one or more spelling rules are associated with each prefix and each suffix,
   determining whether the word fragment may be combined with one or more adjacent word fragments or words to form a proposed word comprises using a prefix or suffix as the particular word fragment and using an associated spelling rule in forming the proposed word, and
   as a result of using the associated spelling rule, a spelling of the proposed word differs from a spelling that would result from merely concatenating the particular word fragment with the one or more adjacent word fragments or words.

5. The method of claim 4, wherein determining whether the word fragment may be combined with one or more adjacent word fragments or words to form a proposed word comprises:
   retrieving from the received recognition candidate a sequence that includes the particular word fragment and adjacent word fragments or words; and
   determining if the sequence is a valid sequence.

6. The method of claim 5, wherein a valid sequence includes only one or more allowed adjacent combinations of word fragments and words.

7. The method of claim 6, wherein allowed adjacent combinations comprise one or more prefixes, followed by a root or a word, followed by one or more suffixes; a root or a word followed by one or more suffixes; and one or more prefixes followed by a root or a word.

8. The method of claim 6, wherein allowed adjacent combinations comprise one or more prefixes, followed by one or more roots or words, followed by one or more suffixes; one or more roots or words followed by one or more suffixes; and one or more prefixes followed by one or more roots or words.

9. The method of claim 4, further comprising combining the particular word fragment with the one or more adjacent word fragments or words to form a second proposed word that differs from the first proposed word by using a second associated spelling rule in forming the proposed word.

10. The method of claim 1, wherein determining whether the word fragment may be combined with one or more adjacent word fragments or words to form a proposed word included in a backup dictionary of the speech recognition system comprises searching the backup dictionary for the proposed word.

11. The method of claim 1, wherein modifying the recognition candidate comprises:
    forming a prospective recognition candidate by modifying the recognition candidate to substitute the proposed word for the word fragment and the one or more adjacent word fragments or words used to form the proposed word; and
    if the prospective recognition candidate includes an additional word fragment:
        further processing the prospective recognition candidate to generate an additional word using the additional word fragment and one or more adjacent words or word fragments, and
        forming a final recognition candidate by replacing the additional word fragment and the one or more adjacent words with the additional word.

12. The method of claim 1, wherein a score is associated with the received recognition candidate, the method further comprising producing a score associated with the modified recognition candidate by rescoring the modified recognition candidate.

13. The method of claim 12, wherein:
    the score associated with the received recognition candidate includes an acoustic component and a language model component, and
    rescoring the modified recognition candidate comprises generating a language model score for the modified recognition candidate.

14. The method of claim 13, wherein producing the score associated with the modified recognition candidate comprises combining the acoustic component of the score for the received recognition candidate with the language model score generated for the modified recognition candidate.

15. The method of claim 13, wherein rescoring the modified recognition candidate comprises generating an acoustic model score for the modified recognition candidate and producing the score associated with the modified recognition candidate comprises combining the acoustic model score generated for the modified recognition candidate with the language model score generated for the modified recognition candidate.

16. The method of claim 13, wherein:
    the score associated with the received recognition candidate includes an acoustic component and a language model component; and
    rescoring the modified recognition candidate comprises generating an acoustic score for the modified recognition candidate.

17. The method of claim 16, wherein producing the score associated with the modified recognition candidate comprises combining the language model component of the score for the received recognition candidate with the acoustic score generated for the modified recognition candidate.

18. The method of claim 1, further comprising generating the acoustic model of a word fragment by:
    comparing a word of the active vocabulary to a similar word of a backup dictionary to identify a word fragment that may be used to convert the word of the active vocabulary to the word of the backup dictionary, and
    generating the acoustic model of the word fragment using a portion of an acoustic model of the word of the backup dictionary that is not included in an acoustic model of the word of the active vocabulary.

19. The method of claim 18, wherein comparing a word of the active vocabulary to a similar word of a backup dictionary comprises comparing spellings of the two words.

20. The method of claim 1, further comprising generating the acoustic models of word fragments by:
    comparing words of the active vocabulary to similar words of a backup dictionary to identify spelling rules that may be used to convert the words of the active vocabulary to words of the backup dictionary; and
    employing the spelling rules in identifying word fragments.

21. The method of claim 20, wherein employing the spelling rules in identifying the word fragments comprises:
    grouping spelling rules together to form possible affixes, the affixes including prefixes and suffixes; and
    analyzing words of the backup dictionary using the affixes to identify roots that may be combined with the affixes to produce words of the backup dictionary.

22. The method of claim 21, further comprising generating acoustic models for the roots using portions of acoustic models of the words of the backup dictionary that are not included in acoustic models of the affixes.

23. The method of claim 21, further comprising adding affixes and roots to the active vocabulary as word fragments.

24. The method of claim 23, further comprising storing a set of spelling rules in association with an affix in the active vocabulary.

25. The method of claim 23, further comprising creating a language model associated with the active vocabulary.

26. The method of claim 25, wherein creating the language model comprises:
    retrieving a training collection of text, the training collection of text comprising words from the backup dictionary and words from the active vocabulary;
    modifying the training collection of text by replacing any splittable backup dictionary words with their corresponding words and word fragments; and
    generating language model scores for words and word fragments of the active vocabulary using the modified collection of text.

27. The method of claim 25, wherein creating the language model comprises creating an N-gram language model.

28. The method of claim 27, wherein creating the N-gram language model comprises:
    retrieving a training collection of text, the training collection of text comprising words from the backup dictionary and words from the active vocabulary;
    determining a frequency of each N-gram word sequence that appears in the training collection of text;
    modifying the N-gram word sequences by replacing any splittable backup dictionary words with their corresponding words and word fragments;
    based on the N-gram word sequence frequencies, determining a frequency of each modified N-gram sequence that includes words, word fragments, or words and word fragments; and based on the N-gram word and word fragment sequence frequencies, generating an N-gram language model for the words and word fragments of the active vocabulary.

29. The method of claim 1, wherein word fragments comprise syllables, and each syllable includes a unit of spoken language.

30. The method of claim 29, wherein the unit of spoken language comprises a single uninterrupted sound formed by a vowel or diphthong alone, of a syllabic consonant alone, or of either with one or more consonants.

31. The method of claim 29, wherein a syllable comprises a vowel and one or more consonants clustered around the vowel.

32. The method of claim 1, wherein determining whether the word fragment may be combined with one or more adjacent word fragments or words to form a proposed word included in the backup dictionary of the speech recognition system comprises searching the backup dictionary for the proposed word based on a pronunciation of the proposed word.

33. A method of recognizing speech, the method comprising: receiving an input user utterance
using a speech recognizer to perform speech recognition on said user utterance to produce a set of one or more recognition candidates, the speech recognition comprising comparing digital values representative of the user utterance to a set of acoustic models representative of an active vocabulary of the system, the set of acoustic models including models of words, models of roots that are not words, and models of affixes that are not words, the affixes including prefixes and suffixes,
receiving the recognition candidates from the speech recognizer, and
when a received recognition candidate includes an affix:
combining the affix with one or more adjacent words, roots, or other affixes to form a new word, wherein forming the new word includes using a spelling rule associated with the affix that causes the spelling of the new word to differ from a spelling that would result from merely concatenating the affix with the one or more adjacent words, roots, or other affixes; and
modifying the recognition candidate to substitute the new word for the affix and the one or more adjacent words, roots, or other affixes used to form the new word.

34. A computer-implemented speech recognition system that uses an expanded effective active vocabulary, the system comprising:
a storage device configured to store an active vocabulary that includes multiple entries corresponding to words, commands, and word fragments; and
a processor configured to:
receive data representing a user utterance,
produce one or more recognition candidates, by comparing digital values representative of the user utterance to a set of acoustic models representative of the active vocabulary of the system, the set of acoustic models including models of words and models of word fragments,
when a produced recognition candidate includes a word fragment:
determine whether the word fragment may be combined with one or more adjacent word fragments or words to form a proposed word included in a backup dictionary of the speech recognition system, wherein forming the proposed word includes using a spelling rule associated with the word fragment that causes the spelling of the proposed word to differ from a spelling that would result from merely concatenating the particular word fragment with the one or more adjacent word fragments or words;
if the word fragment may be combined with one or more adjacent word fragments or words to form a proposed word included in a backup dictionary, modify the recognition candidate to substitute the proposed word for the word fragment and the one or more adjacent word fragments or words used to form the proposed word; and
if the word fragment may not be combined with one or more adjacent word fragments or words to form a proposed word included in a backup dictionary of the speech recognition system, discard the recognition candidate.

35. The system of claim 34, wherein the expanded effective active vocabulary comprises words from the backup dictionary that are formed from a combination of words and word fragments or word fragments and word fragments from an active vocabulary that includes words and word fragments, and words from the active vocabulary.

36. The system of claim 34, wherein the processor determines whether the word fragment may be combined with one or more adjacent word fragments or words to form a proposed word included in the backup dictionary by searching the backup dictionary for the proposed word.

37. The system of claim 34, wherein the processor modifies the recognition candidate by:
forming a prospective recognition candidate by modifying the recognition candidate to substitute the proposed word for the word fragment and the one or more adjacent word fragments or words used to form the proposed word; and
if the prospective recognition candidate includes an additional word fragment:
further processing the prospective recognition candidate to generate an additional word using the additional word fragment and one or more adjacent words or word fragments, and
forming a final recognition candidate by replacing the additional word fragment and the one or more adjacent words with the additional word.

38. The system of claim 34, wherein a score is associated with the received recognition candidate, and the processor is further configured to produce a score associated with the modified recognition candidate by rescoring the modified recognition candidate.

39. Computer software, residing on a computer readable medium, for a speech recognition system that uses an expanded effective active vocabulary to recognize words, and commands, the computer software comprising instructions for causing a computer to perform the following operations:
receive data representing a user utterance,
produce one or more recognition candidates, by comparing digital values representative of the user utterance to a set of acoustic models representative of an active vocabulary of the system, the set of acoustic models including models of words and models of word fragments,
when a produced recognition candidate includes a word fragment:
determine whether the word fragment may be combined with one or more adjacent word fragments or words to form a proposed word included in a backup dictionary of the speech recognition system, wherein forming the proposed word includes using a spelling rule associated with the word fragment that causes the spelling of the proposed word to differ from a spelling that would result from merely concatenating the particular word fragment with the one or more adjacent word fragments or words;

if the word fragment may be combined with one or more adjacent word fragments or words to form a proposed word included in a backup dictionary, modify the recognition candidate to substitute the proposed word for the word fragment and the one or more adjacent word fragments or words used to form the proposed word; and if the word fragment may not be combined with one or more adjacent word fragments or words to form a proposed word included in a backup dictionary of the speech recognition system, discard the recognition candidate.

40. The computer software of claim 39, wherein the expanded effective active vocabulary comprises words from the backup dictionary that are formed from a combination of words and word fragments or word fragments and word fragments from an active vocabulary that includes words and word fragments, and words from the active vocabulary.

41. The computer software of claim 39, wherein determining whether the word fragment may be combined with one or more adjacent word fragments or words to form a proposed word included in the backup dictionary comprises searching the backup dictionary for the proposed word.

42. The computer software of claim 39, wherein modifying the recognition candidate comprises:

forming a prospective recognition candidate by modifying the recognition candidate to substitute the proposed word for the word fragment and the one or more adjacent word fragments or words used to form the proposed word; and if the prospective recognition candidate includes an additional word fragment:

further processing the prospective recognition candidate to generate an additional word using the additional word fragment and one or more adjacent words or word fragments, and forming a final recognition candidate by replacing the additional word fragment and the one or more adjacent words with the additional word.

43. The computer software of claim 39, wherein a score is associated with the received recognition candidate, the computer software comprising instructions for causing the computer to produce a score associated with the modified recognition candidate by rescoring the modified recognition candidate.

* * * * *